United States Patent [19]
Maulsby et al.

[11] Patent Number: 5,710,894
[45] Date of Patent: Jan. 20, 1998

[54] DYNAMIC CLASSES AND GRAPHICAL USER INTERFACE FOR SAME

[75] Inventors: David L. Maulsby, Boston, Mass.; G. Allen Cypher, Palo Alto; Enio Ohmaye, Sunnyvale, both of Calif.

[73] Assignee: Apple Computer, Inc., Cupertino, Calif.

[21] Appl. No.: 416,332

[22] Filed: Apr. 4, 1995

[51] Int. Cl.⁶ .................................................. G09B 19/04
[52] U.S. Cl. ........................................ 395/326; 395/173
[58] Field of Search ................................ 395/152, 155, 395/161, 154, 173, 326, 174, 806, 807

[56] References Cited

U.S. PATENT DOCUMENTS

5,111,409  5/1992  Gasper et al. .................... 395/152

OTHER PUBLICATIONS

"Visual Programming in a Visual Domain: A Case Study of Cognitive Dimensions", Francesmary Modugno, T.R.G. Green & Brad Myers, Proc. Human–Computer Interation '94, People and Computers. Glasgow. Aug. 1994, pp. 90–107.

"Programming Agents Without a Programming Language", D.C. Smith, A. Cypher, J. Spohrer, Communications of the ACM, 37(7), Jul. 1994, pp. 55–67.

*Primary Examiner*—Phu K. Nguyen
*Assistant Examiner*—Cliff N. Vo
*Attorney, Agent, or Firm*—Blakely, Sokoloff, Taylor & Zafman

[57] ABSTRACT

A method and apparatus for providing dynamic classification of objects. The system provides for dynamic classification of objects within a simulator environment and also contains a graphical user interface related to the simulator environment. The apparatus includes a display, a processor, and an input device. A processor generates a simulation environment on a display screen and a user interfaces to the system with a user input device. Objects within a simulation take on user specified rules and properties that define their behavior. A graphical representation is provided for categorizing classes of objects. A graphical representation of a jar provides a label for defining the identity of the jar and a first region into which items (e.g., icons representing instances or classes of objects) can be dragged and dropped. These items become members of the dynamic class defined by the jar. A second region of the jar defines items that are specifically excluded from the set of items defined by the contents of the first region. Items can be dragged and dropped into the second region. Since scope of the contents of a jar is wide, jars allow a user to define and redefine a class of unrelated objects without being confined to a hierarchical data structure. Behavior can be defined with respect to items categorized by a particular jar. Further, jar membership is inherited in that any instances having an ancestor class occurring in the jar belong to the jar themselves.

31 Claims, 36 Drawing Sheets

DYNAMIC CLASSES AND GRAPHICAL USER INTERFACE FOR SAME

FIELD OF THE INVENTION

The present invention relates to visual programming, and more specifically, to a method and apparatus for constructing dynamic classes of objects.

BACKGROUND OF THE INVENTION

Computer simulations are a powerful educational tool. In a computer simulation, groups of objects having predefined properties or characteristics typically interact according to corresponding object behavior rules that have been programmed by the creators of the simulation. Interactions between objects generate one or more corresponding predefined results or consequences according to the hard-programmed behavior rules. A user can selectively place objects in a simulation and observe their resulting interactions on a display. The results generated by a given interaction can initiate further interactions between objects, resulting in a chain of events. Computer simulations thus allow complex situations to be created and modeled.

An example of a popular computer simulation is SimCity, in which a user is responsible for the construction, maintenance, and expansion of a computer-generated city. Objects used in SimCity include roads, railroads, police stations, hospitals, and various types of buildings. Object interactions produce results such as growth, revenue, crime, traffic congestion, and pollution.

Most computer simulations do not allow the predefined object characteristics and behavior rules to be modified. As a result, the simulation is predictable and inflexible, thereby limiting its capabilities as an education tool. For example, currently in SimCity the addition of a railroad at a given location results in the elimination of pollution problems in the vicinity of the railroad. While the addition of a railroad might aid in the reduction of pollution problems, particularly if it were used for public transportation purposes, the complete elimination of pollution problems in this example is an unrealistic scenario.

Computer simulation designers have realized that simulations are much more useful and versatile if the user is allowed to modify object properties and behavior rules. Modification of object properties and behavior rules to any significant degree, however, involves computer programming. The typical computer simulation user does not possess the specialized skills and knowledge required for computer programming. In particular, knowledge of computer program constructs and syntax are learning barriers that are difficult for children and non-technical people to overcome. Therefore, computer simulation designers have attempted to provide simulation users with a simplified means for programming the simulation.

Simplified "English-like" programming languages are one approach to take to simplify simulation programming for users. One example of this approach is the HyperTalk programming language. While such a programming language that resembles a user's native language can be easier for the user to learn, writing programs is still an abstract process. There is a conceptual gulf between what the user wants to happen in the simulation, and what he or she has to write even in these "English-like" programming languages. For example, to move an object on the simulation display, in HyperTalk the user must deal with x and y coordinates. As a result, this approach towards simplifying simulation programming has been unsuccessful.

Another approach taken to simplify simulation programming for simulation users is programming by demonstration. In programming by demonstration, a user directly manipulates objects to indicate a sequence of actions to be performed. A sequence of computer program steps that will perform each required action in this sequence is then automatically generated. While this simplifies the creation of the computer program steps for the user, a listing of such computer program steps requires specialized knowledge to understand. Because the typical simulation user does not posses such knowledge, the simulation user does not understand the relationships between demonstrated object actions, and their corresponding computer program steps. Prior art programming by demonstration systems and methods are therefore ineffective for teaching the typical simulation user about computer programming concepts.

A common construct encountered in computer programming is the conditional statement A conditional statement specifies that if a predetermined condition holds true, then a corresponding sequence of computer program steps are to be executed. One form of the conditional statement is a Before-After rule. A Before-After rule deals with simulation states. Each Before-After rule has two parts: a "before" part and an "after" part. Each part represents a possible state of the simulation. Whenever the "before" part matches the current state of the simulation, the simulation is transformed into the state specified by the "after" part. Before-After rules are widely used in the branch of Artificial Intelligence known as "expert systems." A graphical Before-After rule is referred to herein as a Graphical Rewrite Rule (GRR). When a graphical condition or picture matches the "before" portion of the GRR, a sequence of computer program steps is executed that produces the graphical condition indicated by the "after" portion of the GRR.

For each simulation object, the simulation user creates a GRR for each possible simulation state of interest. Even in relatively simple simulations, each simulation object can participate in a large number of distinct simulation states. Therefore, an undesirably large number of GRR definitions must be made for each object. This drawback has limited the use of Graphical Rewrite Rules as a means for simplifying simulation programming.

In the definition of a GRR, the user graphically specifies the corresponding "before" and "after" portions of the GRR. The sequence of computer program steps that results in the graphical transformation of the "before" portion into the "after" portion is generated automatically, thereby greatly simplifying simulation programming for the user. Some systems and methods have tried to have the computer infer how to arrive at the after state from the before state. However, this is currently an unsolved problem in computer science, and such systems and methods have not succeeded.

During the execution of a simulation, one or more characteristics or properties of an object may change according to one or more applicable rules. The set of properties corresponding to an object represents its internal state. An object's internal state can influence the object's behavior. For example, an object representing a living creature may have a property corresponding to hunger. If the creature's hunger exceeds a certain level, the creature may subsequently search for food rather than initiate another behavior. In general, changes to an object's internal state in prior art simulation systems and methods occur without a user's knowledge. That is, they occur invisibly during the execution of a simulation without user interaction. In addition, the simulation user cannot define or modify an object's internal state after simulation execution has begun. When the user's knowledge of and access to each object's internal state is limited, the simulation again becomes less effective as an education tool.

Therefore, there is a need for a means of providing simulation users with flexible control over simulation information and simulation behavior without requiring specialized programming knowledge.

Within such simulation environments, often objects are categorized within classes of objects. In prior art techniques, the categorization involves a hierarchy of different classes and subclasses which eventually lead to objects or instances within them. When attributed to a specific class, objects in such environment inherit certain properties that are associated with parent classes, under a hierarchical approach. This approach is used in prior art artificial intelligence (AI) and certain "object oriented" programming languages (e.g., such as C++) to attempt to solve the problem of knowledge representation.

However, representation of objects and their properties within a hierarchical or "tree" structure of classes and subclasses has drawbacks. These drawbacks are particularly problematic within a simulation program or system that offers flexible control over simulation environments. A first problem with the prior art hierarchical approach is that it becomes too complicated for certain target users (e.g., young students). It is complicated because of the large number of layers that can exist between classes and subclasses and objects or instances categorized therein. It is also complicated to provide an effective user-interface for manipulation and selection of objects and classes within a potentially large hierarchy. Further, with large hierarchical data structures, it becomes difficult to assign behaviors to particular, select, groups of objects because the objects are very interrelated within the data structure.

Also, these prior art information structures are typically static in that they are inflexible to change or easy re-categorization under user (e.g., not programmer) control. They are also static in that it is very difficult to add subclasses within the tree structure if an important distinction or categorization needs to be added (e.g., within the middle of the structure) after the structure is partially defined. In effect, under the prior art categorization, the entire categorization of objects and properties needs to be correctly created the first time the hierarchy is defined since modification is problematic.

Another problem occurs within a hierarchical structure in that no matter how a class and subclass structure is defined, there are always exceptions to the structure. Hierarchical structures classify items in an "intensional" manner in that membership in a particular class means that each member shares a common trait or attribute of the class. In effect, it is often desired to create an "orthogonal" class of objects having properties that transcend different classes (e.g., classes that have no common attribute or property between other classes) and such a class is not easily or readily formulated within a hierarchical, intensional, structure. Since it is difficult to create "orthogonal" classifications in a hierarchical structure, it is difficult to assign behaviors to such class.

Therefore, what is needed is a system that can utilize an approach for classifying objects that is easy to learn, use, and recognize and that is dynamic in that a user can readily re-categorize objects. The present invention provides such advantages over the prior art.

SUMMARY OF THE INVENTION

A method and apparatus for providing dynamic classification of objects is described. The system provides for dynamic classification of objects within a simulator environment and also contains a graphical user interface related to the simulator environment. The apparatus includes a display, a processor, and an input device. A processor generates a simulation environment on a display screen and a user interfaces with the system with a user input device. Objects within a simulation take on user specified rules and properties that define the behavior of the objects. A graphical representation is provided for effectively categorizing classes of objects in an "extensional" manner. A graphical representation of a jar provides a label for defining the name of the jar and a first region into which items (e.g., icons representing instances or classes of objects) can be dragged and dropped. These items become members of the dynamic class defined by the jar. A second region surrounding the jar defines items that are specifically excluded from the set of items defined by the contents of the first region. Items can be dragged and dropped into the second region. Since scope of the contents of a jar is wide, jars allow a user to define and redefine a class of unrelated objects without being confined to a hierarchical data structure. Items placed within a jar do not need to share any common traits or attributes; in effect, the jar is defined by its individual members (e.g., in an extensional manner). Behavior can be defined with respect to items categorized by a particular jar. Further, jar membership is inherited in that any instance having an ancestor class occurring in the jar belong to the jar itself provided no nearer ancestor (nor the instance itself) is present in the second region of the jar.

Specifically, embodiments of the present invention include, in a computerized simulation system, a method of defining dynamic object classes, the method including the computer implemented steps of: displaying a fast region for storing contents included within the dynamic object class; displaying a second region for storing exclusions from the contents of the dynamic object class; displaying a label region for naming the dynamic object class; selecting and dragging items from a given area into the first region to add items into the contents; selecting and dragging items from a given area into the second region to exclude items from the contents; generating a membership of the dynamic object class based on the items within the first region and excluding the items within the second region wherein the membership does not necessarily contain any attributes or characteristics in common between individual members. Further embodiments include the above and wherein the items include object instances, object classes or other defined dynamic object classes and wherein the label region and the first region, in union, comprise a graphical representation of a jar.

Embodiments of the present invention include the above and further include the steps of: selecting and removing a particular item of the first region; and updating the membership of the dynamic object class based on items remaining in the first region and the items within the second region; and selecting and removing a particular item of the second region; and updating the membership of the dynamic object class based on the items within the fast region and items remaining in the second region; selecting and adding a particular item to the fast region; and updating the membership of the dynamic object class based on items in the first region and the items within the second region; and selecting and adding a particular item to the second region; and updating the membership of the dynamic object class based on the items within the fast region and items within the second region.

Embodiments of the present invention include a computer system including: a processor coupled to the bus for executing instructions and processing information; a display unit coupled to the bus for displaying information; a user interface coupled to the bus for receiving user input; a memory coupled to said bus for storing instructions and information; wherein the memory in combination with the processor further comprises: logic for displaying a first region for storing contents included within the dynamic object class; logic for displaying a second region for storing exclusions from the contents of the dynamic object class; logic for allowing items from a given area to be added within the first region to add items to contents of the dynamic object class; logic for allowing items from a given area to be added within the second region to exclude items from the contents; logic for generating a membership of the dynamic object class based on the items within the first region and excluding the items within the second region wherein the membership does not necessarily contain any attributes or characteristics in common between individual members; logic for generating a graphical representation of a simulated environment and graphical representations of objects for placement therein; logic for defining a rule of behavior by user interaction with the graphical representation of the simulated environment and with the graphical representations of the objects; and logic for assigning the rule of behavior to each member of the membership of the dynamic object class. Embodiment include the above and wherein the items include object instances, object classes or other defined dynamic object classes and wherein the label region and the first region, in union, comprise a graphical representation of a jar.

Embodiments of the present invention include the above and wherein the memory in combination with the processor further comprises logic for selecting and removing a particular item of the fast or second region; logic for generating an updated membership the membership of the dynamic object class based on items remaining in the fast region and items remaining within the second region; and logic for assigning the rule of behavior to each member of the updated membership. Embodiments of the present invention include the above and wherein the memory in combination with the processor further comprises: logic for selecting and adding a particular item of the first or second region; logic for generating an updated membership of the dynamic object class based on the items within the first region and items within the second region; and logic for copying the rule of behavior to each member of the updated membership.

BRIEF DESCRIPTION OF THE DRAWINGS

The present invention is illustrated by way of example, and not by way of limitation, in the below listed figures of the accompanying drawings and in which like reference numerals refer to similar elements.

DETAILED DESCRIPTION OF THE PREFERRED EMBODIMENT

I. Simulation System

Overview of Simulation System

Figure 1:
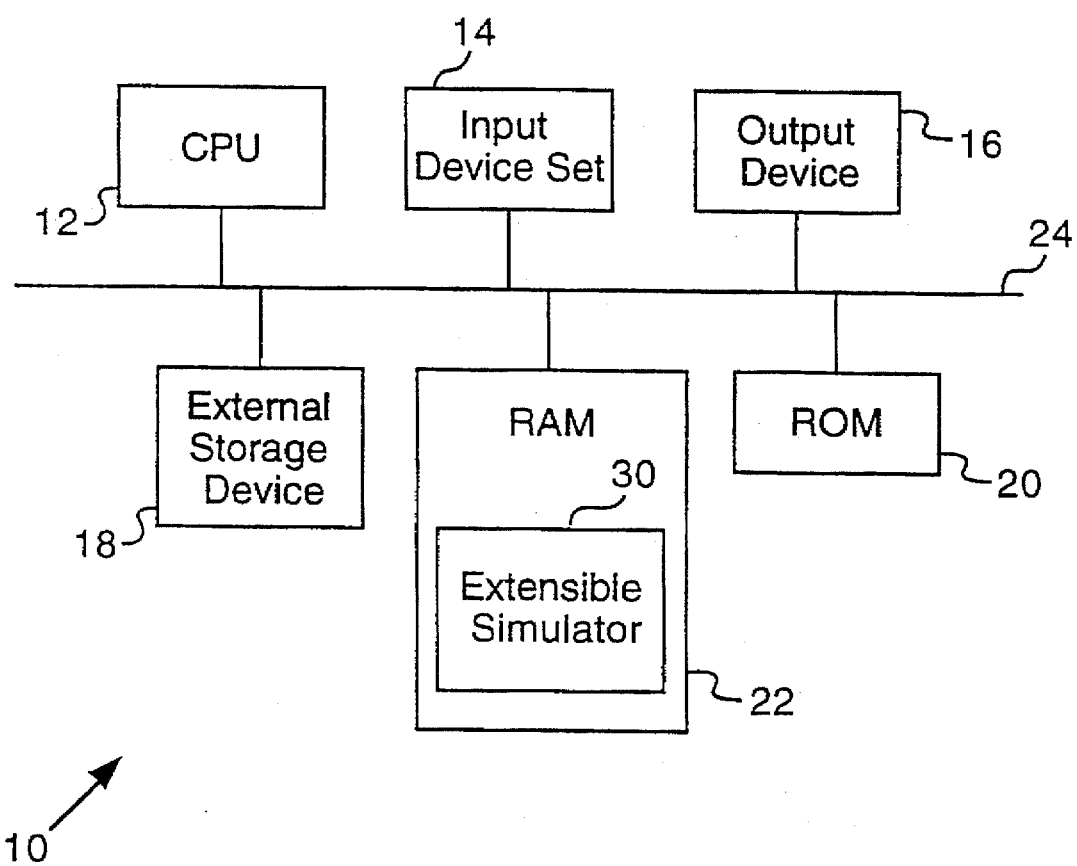
FIG. 1 is a block diagram of a preferred embodiment of an extensible simulation system constructed in accordance with the present invention.

Referring now to FIG. 1, a preferred embodiment of an extensible simulation system 10 constructed in accordance with the present invention is shown. The system 10 preferably comprises a Central Processing Unit (CPU) 12, an input device 14, an output device 16, an external storage device 18, and predetermined amounts of Read-Only Memory (ROM) 20 and Random Access Memory (RAM) 22. In the preferred embodiment of the system 10, an extensible simulator 30 resides in RAM 22. Each element of the system 10 has an input and an output coupled to a common system bus 24. In an exemplary embodiment, the system 10 of the present invention is an Apple Macintosh computer system having a Motorola MC68030 (or MC68040 or similar) CPU, a keyboard and a mouse-type controller (although a host of similar user interface devices can be utilized, such as a trackball, stylus and pad, etc.), a color graphics monitor, 8 Mb of RAM, a 20 Mb or larger hard disk drive, and the simulator 30 of the present invention.

Figure 2:
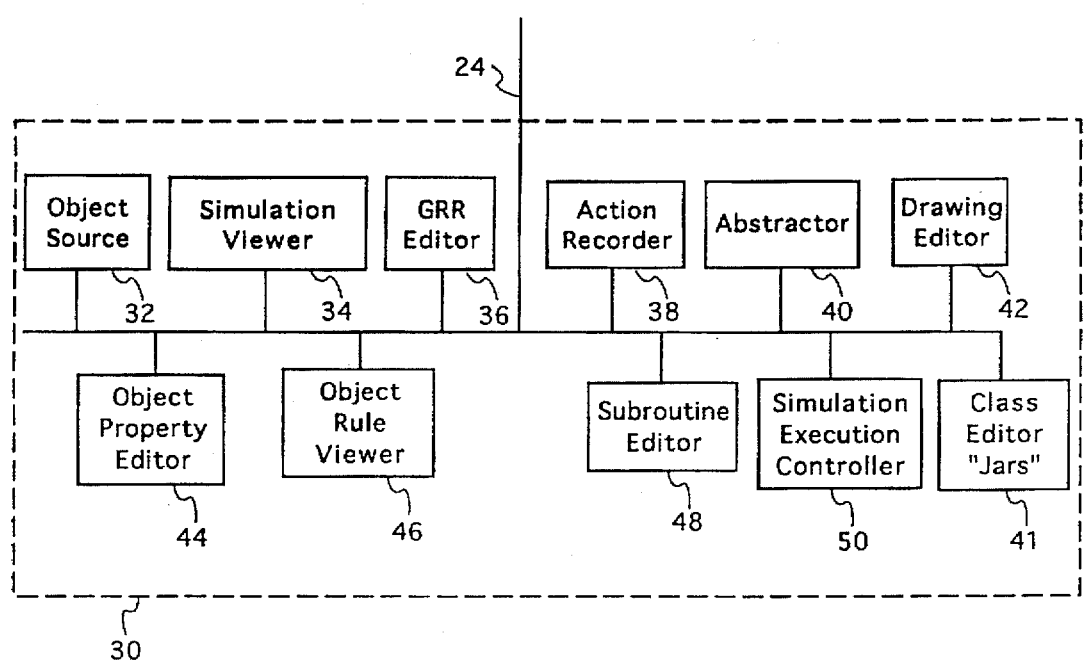
FIG. 2 is a block diagram of a preferred embodiment of a simulator of the present invention.

Referring now to FIG. 2, a block diagram of a preferred embodiment of the extensible simulator 30 (e.g., simulator 30) of the present invention is shown. The simulator 30 preferably comprises an object source 32, a simulation viewer 34, a Graphical Rewrite Rule (GRR) editor 36, an action recorder 38, an abstractor 40, a drawing editor 42, an object property editor 44, an object role viewer 46, a subroutine editor 48, a simulation execution controller 50 and a class editor 41 which allows dynamic classifications to be defined and modified under user control based on a graphical user interface referred to herein as "jars." These components of the simulator 30 have an input and an output coupled to the common system bus 24. In the preferred embodiment, each element of the simulator 30 is a computer program step sequence stored in RAM 22, which selectively controls the operation of the CPU 12.

In the present invention, a simulation is a group of objects exhibiting user-defined behaviors. In the simulation, each object occupies a position within a set of simulation grid elements. The simulator 30 enables a simulation user to define and modify the possible behaviors the objects can exhibit during the simulation's execution. The simulator 30 also allows the simulation user to define properties or characteristics associated with each object, to selectively modify property values, and to specify how one or more properties will influence the object's behavior.

In the preferred embodiment of the present invention, individual possible behaviors of a given object are determined by a corresponding user-defined Graphical Rewrite Rule (GRR). Each GRR has a "before" portion and an "after" portion. The "before" portion graphically represents a state associated with the object that can occur during simulation execution. The "after" portion graphically represents the state the object is to transition to when the state indicated by the "before" portion occurs. In other words, the "after" portion shows what is to happen to the object following the "before" portion's occurrence during simulation execution.

Objects take on a user defined object class (also called "object type" or "predetermined class") and can also be grouped together in dynamic classes within the present invention. With respect to the items that a rule (GRR) can be defined to interact with or upon, these items can be assigned to a dynamic class. A user defined dynamic class within the present invention does not necessarily need to have any common attribute or characteristic among its members. A predetermined class might be "fish" or "trout" or "boats" while a particular object within a predetermined class is referred to as an "instance." For example, a particular fish within the object class "tuna" is "Charlie the tuna" and in such case, "Charlie the tuna" is an instance of the object class "tuna."

Further, a group of any classes can be assigned to a particular dynamic class by the class editor 41 (FIG. 2) and can be represented by a graphical rendition of a "jar." This process will be discussed further below. An end product of this dynamic class might be a jar called "tasty fish" which defines a dynamic class including the classes "trout," "tuna," and "snapper" but excluding the instance of "Charlie the tuna." It is appreciated that within the present invention, dynamic classes (e.g., represented by "jars") can be manipulated by the simulator 30 in an analogous fashion as an object instance or an object class. It is appreciated further that unlike a hierarchical dam structure, although the exemplary dynamic class "tasty fish" includes object classes having a similar trait (e.g., tuna, snapper, and trout are tasty), there is absolutely no requirement within the present invention that the members of a dynamic class be related in any way or by any attribute or trait. A dynamic class does not define its members, rather, the members define the dynamic class under the present invention.

Programming By Demonstration

The simulation user defines a GRR corresponding to a given object through programming by demonstration. During programming by demonstration, the user graphically indicates actions that are to be performed by or upon the given object or one or more associated objects. The user indicates each action with the input device 14 by dragging and dropping a selected object or by selecting a predetermined user interface element displayed on the output device 16. The actions indicate the manner in which the object is to transition between the states shown by the GRR's "before" and "after" portions. In the preferred embodiment, the performance of an action during simulation execution can affect an object in one of three possible ways, namely 1) by moving the object from one location to another in the simulation; 2) by changing one or more object properties; or 3) by altering the objects appearance. Those skilled in the art will recognize that in an alternate embodiment, an object could be affected in other ways. The simulator 30 records and stores each action as a portion of a recording. Once a recording has been created, the simulator 30 analyzes the recording and creates a corresponding generalized sequence of computer program steps. The set of computer program steps created for a given GRR are referred to herein as the GRR's program.

The combination of Graphical Rewrite Rules and programming by demonstration in the present invention enable the ordinary simulation user to program a simulation without requiring specialized knowledge of computer programming languages or concepts.

The User Interface

Figure 3A:
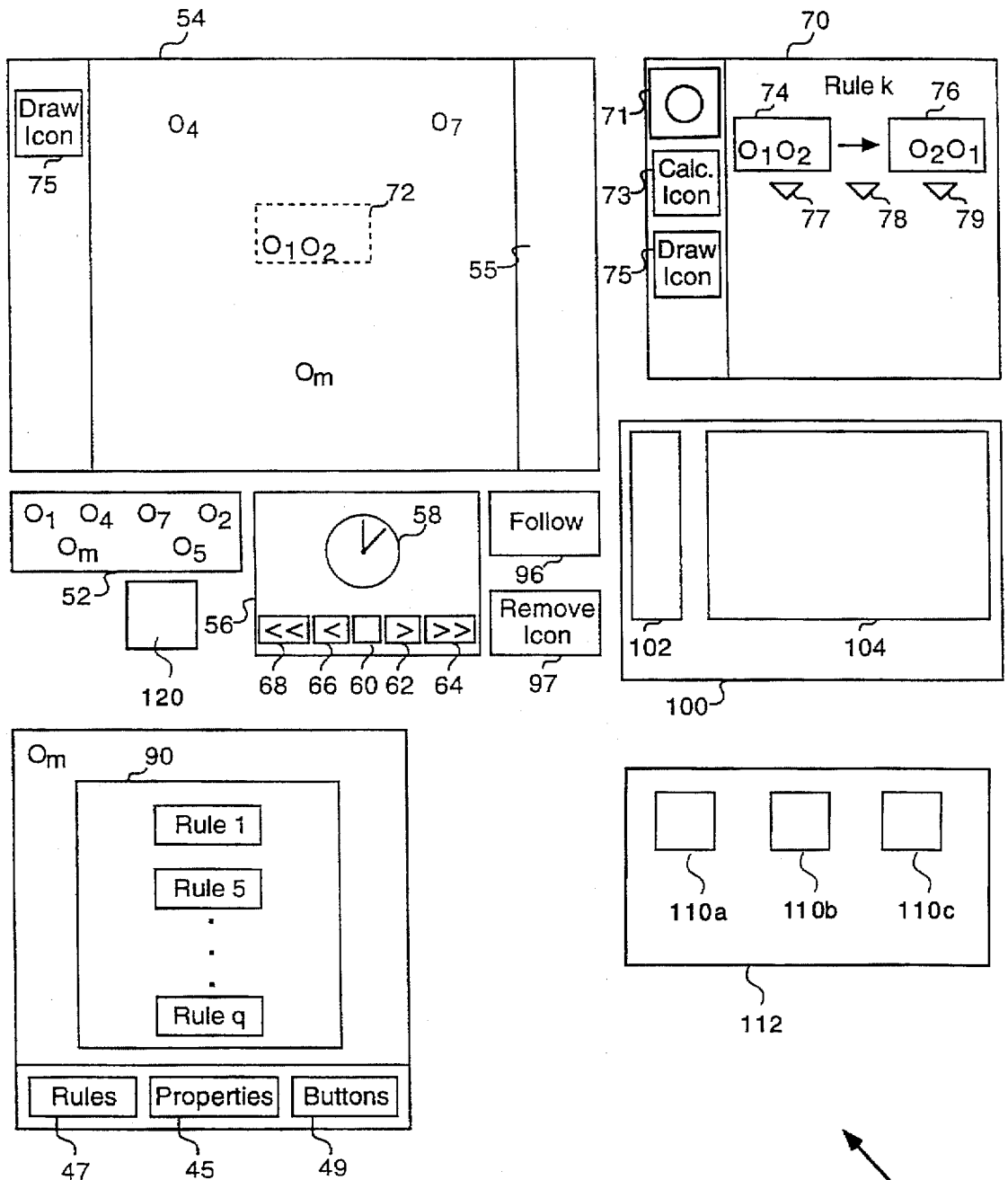
FIGS. 3A, 3B, and 3C are block diagrams showing a preferred embodiment of a user interface of the present invention.
Figure 3B:
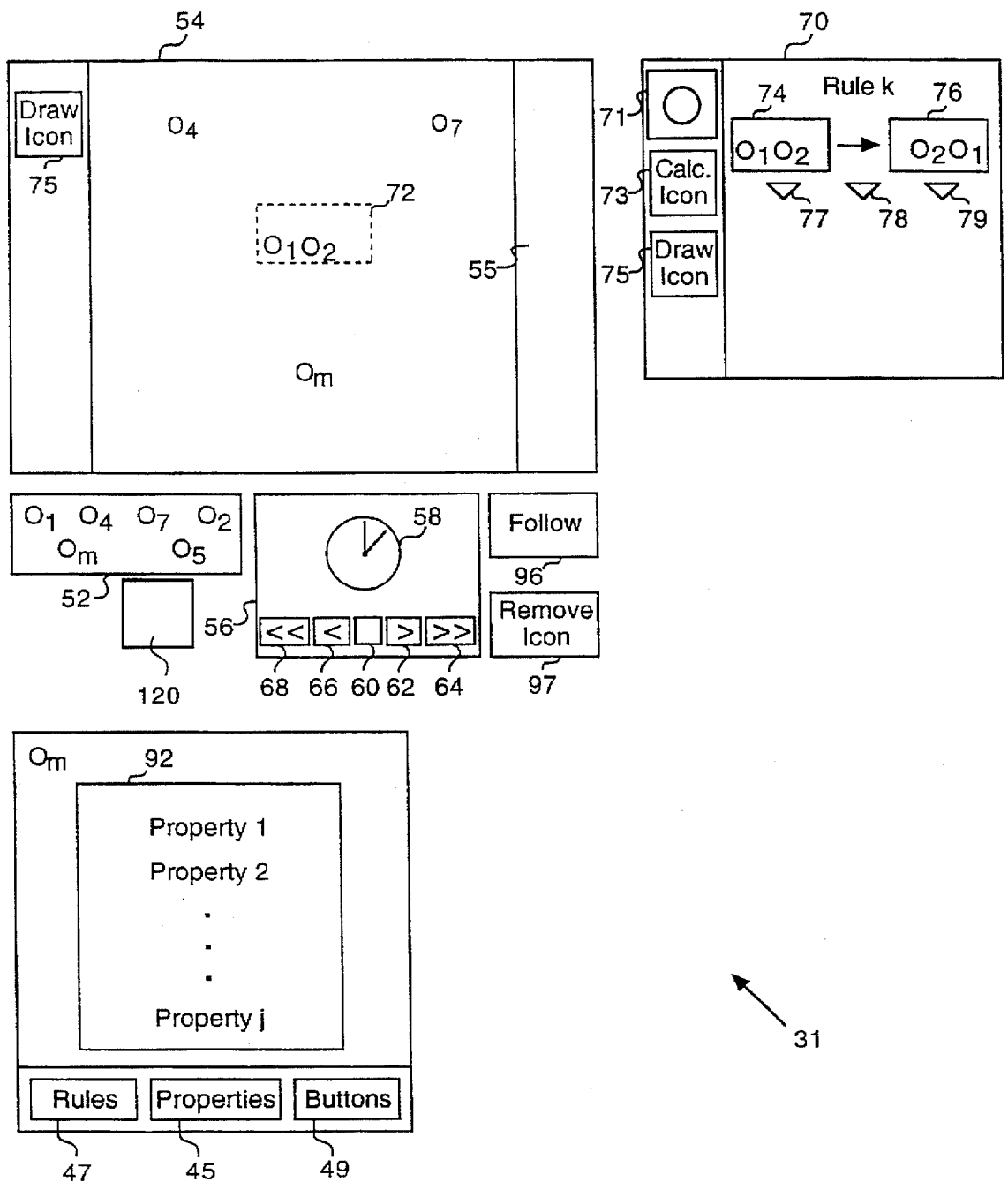
Figure 3C:
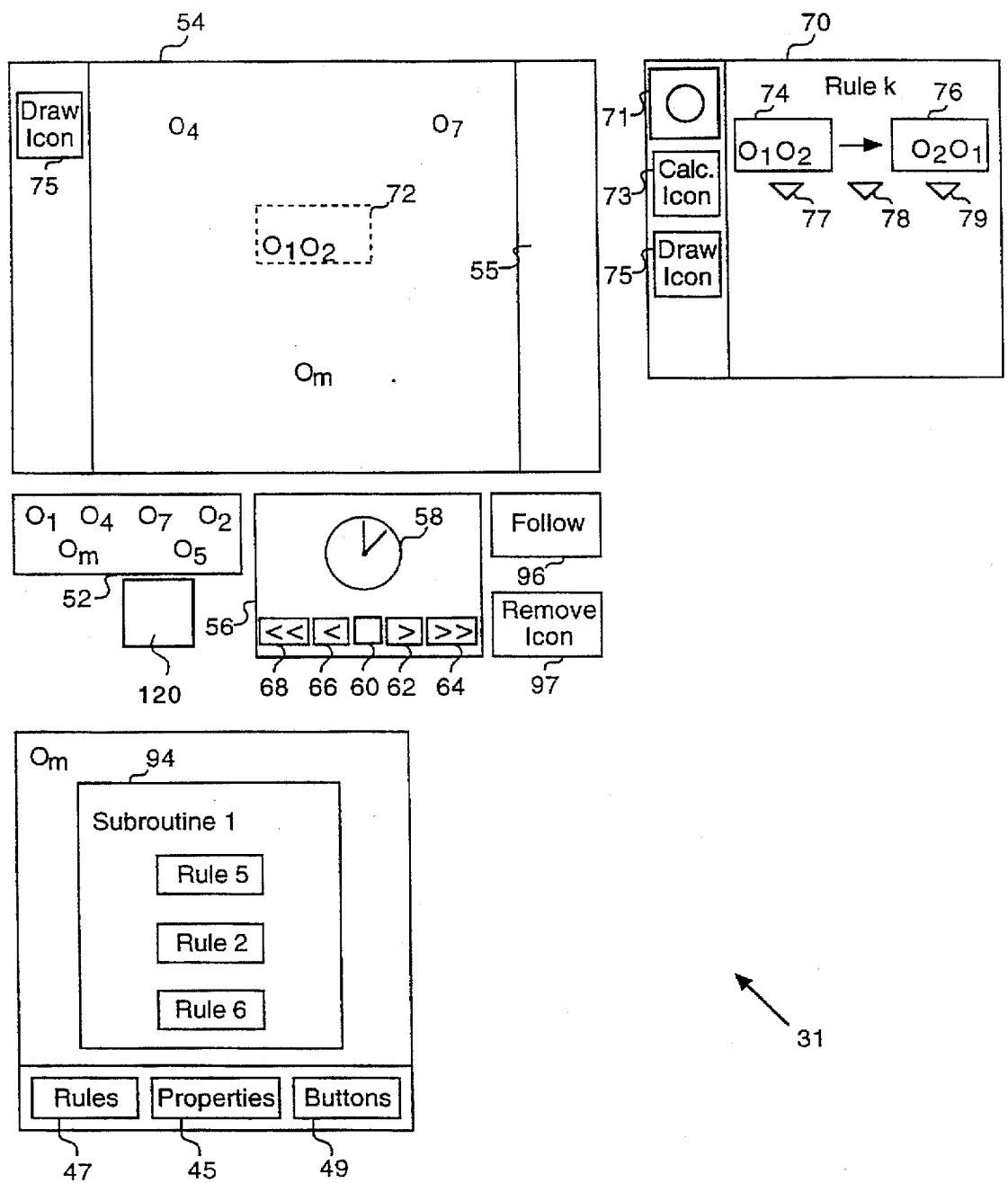

Referring to FIGS. 3A, 3B, and 3C, a set of block diagrams showing a preferred embodiment of the user interface 31 for the simulator 30 of the present invention is shown. The user interface 31 preferably comprises an object source menu 52 (e.g., a copy box), a simulation viewer window 54 (e.g., a game board), an execution control window 56, a GRR editor window 70, an object rule viewer window 90 (FIG. 3A), an object property editor window 92 (FIG. 3B), a subroutine editor window 94 (FIG. 3C), an object follower window 96, an object remove icon 97, a drawing editor window 100, and a dynamic class window 112 (e.g., a jar window or jar shelf). Those skilled in the art will recognize that additional or fewer graphical windows, menus, icons, affordances, or other user interface techniques could be present in an alternate embodiment of the user interface 31. The output device 16 (e.g., display screen) typically possesses a limited area upon which information can be displayed. Therefore, in the preferred embodiment, predetermined regions on the output device 16 can be used to selectively display multiple graphical windows or menus. In addition, "pop-up" or temporary graphical windows are used to selectively display simulation information that the simulation user may require only occasionally. For example, the drawing editor window 100 or the jar shelf 112 are temporary windows that are displayed only when required by the user (e.g., by appropriate control of the input device set 14). The user is allowed to resize or selectively position elements of the user interface 31 on the output device 16. In FIGS. 3A, 3B, and 3C, the object rule viewer window 90, the object property editor window 92, the jar shelf 112, and the subroutine editor window 94, respectively, are selectively displayed in the same region on the output device 16, thereby conserving display space while providing the simulation user with easy access to desired information.

The Object Source

The object source 32 (FIG. 2) provides the user with simulation objects that can be selected for inclusion in the simulation. For each class of an object, the object source 32 maintains a picture, an object name, a set of object properties, a set of corresponding Graphical Rewrite Rules in RAM 22, and indications of the dynamic classes, if any, of which the instance is a member (e.g., which jars). The object source 32 creates and maintains a unique pointer to each instance of a given object present in a simulation. The object source 32 also generates and displays the object source menu 52. Within the object source menu 52, the object source 32 displays the picture of each object that is available to the simulation user. In the preferred embodiment, the user selects and places one or more instances of a given object into this simulation by moving or "dragging" the object's picture from within the object source menu 52 to a desired location in the simulation viewer window 54.

The Simulation Viewer

The simulation viewer 34 (FIG. 2) represents a simulation as the set of simulation grid elements and the location of each object contained therein. An object in the simulation occupies a predetermined number of simulation grid elements, and can move from one location to another within the set of simulation grid elements according to its corresponding Graphical Rewrite Rules during simulation execution. When the user adds an object to the simulation, the simulation viewer 34 records the object's location in an object location list stored in RAM 22. The simulation viewer 34 presents the simulation to the user as a scene displayed in the simulation viewer window 54 (e.g., game board). Each scene is a portion or a subset of all the simulation grid elements forming the simulation. In the preferred embodiment, each simulation grid element is preferably a grid square having predetermined graphical characteristics. During simulation execution, the simulation viewer 34 scans the object location list, and displays the picture of each object present in the displayed scene at its proper location. In the simulation viewer window 54 of FIGS. 3A, 3B, and 3C, exemplary objects $O_1$, $O_2$, $O_4$, $O_7$, and $O_m$ are present.

Within the simulation viewer window 54, the simulation viewer 34 also maintains a "time-out" region 55. The simulation viewer 34 allows the user to move or drag a selected object displayed in the simulation viewer window 54 into the time-out region 55 if the user desires to temporarily remove the selected object from the simulation. When the user moves an object into the time-out region 55, the simulation viewer 34 deletes the object's location from the object location list. While the object is in the time-out region 55, no actions are performed by or upon the object. In other words, the object's state is preserved while it is in the time-out region 55. The user can place the object back in the simulation when desired by moving the object from the time-out region 55 into the simulation viewer window 54. This in turn causes the simulation viewer 34 to insert the object's new location into the object location list, and resumes the object's participation in the simulation.

The Remove Icon

The remove icon 97 enables the simulation user to delete an object from the simulation viewer window 54 or from the object source 32. In the preferred embodiment, the user deletes a selected object by dragging the selected object from the simulation viewer window 54 or the object source window 52 to the remove icon 97. The remove icon 97 also allows the user to delete a given GRR displayed in the object role viewer window 90 in an analogous manner. The remove icon 97 functions in a manner similar to the trash icon in the Macintosh user interface produced by the Apple Computer, Inc., but provides a generalized delete capability. Additional items that can be deleted via the remove icon 97 include object properties and user-defined calculations.

The Drawing Editor

The drawing editor 42 (FIG. 2) provides the user with the ability to edit an object's picture, thereby changing the object's appearance. The drawing editor 42 also allows the user to create one or more animated transitions corresponding to object actions during GRR definition or editing. The user selectively causes the drawing editor 42 to display the drawing editor window 100 by selecting a drawing editor icon 75 displayed on the user interface 31. In the preferred embodiment, two instances of the drawing editor icon 75 are displayed. The drawing editor 42 signals the simulation viewer 34 to display a first instance of the drawing editor icon 75 in the simulation viewer window 54, and the drawing editor 42 signals the GRR editor 36 to display a second instance of the drawing editor icon 75 in the GRR editor window 70. Preferably, when the first drawing editor icon 75 instance is selected, the user can modify a selected object's picture. The second drawing editor icon 75 instance is preferably selected during GRR creation when the user desires to create an animated transition. In the preferred embodiment, the drawing editor 42 functions in a manner similar to conventional paint programs. The drawing editor 42 generates and displays an editing palette 102 that allows the user to select an editing tool such as a paintbrush or an eraser using the input device 14. The drawing editor 42 also generates a picture window 104, wherein the drawing editor 42 displays a selected object's picture as it is modified or as an animated transition is created.

The Property Editor

A property is a name-value pair associated with an object. Each property includes a property name and a property value. The object property editor 44 allows the simulation user to define object properties as desired. For example, a property descriptor defined for an object representing an oak tree might be "height," with a corresponding property value of "5 meters." The object property editor 44 (FIG. 2) displays a selected object's properties via the object property editor window 92 as shown in FIG. 3B. In the preferred embodiment, the object property editor 44 is activated and its corresponding window is displayed when the user selects a properties button 45. The object property editor 44 enables the simulation user to utilize the input device 14 within the object property editor window 92 to define or modify properties corresponding to the selected object or that can be copied to objects or instances of a selected dynamic class (e.g., corresponding to a particular jar). In FIG. 3B, the object property editor window 92 indicates a set of object properties including Property 1, Property 2, and Property j for object $O_m$. As discussed further below, a property can be copied to all members of a selected dynamic class ("jar") by dragging and dropping the property onto the jar.

The Object Rule Viewer

The object rule viewer 46 (FIG. 2) is activated when the user selects a rules button 47. The object rule viewer 46 generates and displays the object rule viewer window 90. When the object rule viewer 46 is active and the user selects an object, the object rule viewer 46 preferably displays in miniature form the "before" and "after" portions of each GRR associated with the selected object as shown in FIG. 3A. Multiple object rule viewer windows 90 can be in use simultaneously. The user can copy a rule displayed in a rule viewer window 90 associated with a given object into a rule viewer window 90 associated with another object or to members of a dynamic class by dragging the rule to the jar, thereby copying the rule from the given object's GRR set into the other object's GRR set. In FIG. 3A, the object rule viewer window 90 shows that the Graphical Rewrite Rules for object $O_m$ include Rule 1, Rule 5, and Rule q as shown in FIG. 3A. Rules like properties can be defined for a selected object, as discussed above, and can be copied to the members of a selected dynamic class as will be discussed further below.

The simulation user can combine rules through the use of subroutines. The subroutine editor 48 allows the user to define a subroutine for an object by selecting and ordering one or more rules in the object's GRR set. According to one embodiment, the user activates the subroutine editor 48 by selecting a subroutine button (not shown) from within the object rule viewer window 90. The user interacts with the subroutine editor 48 by using the input device 14 within the subroutine editor window 94 as shown in FIG. 3C. Each subroutine defined for an object is itself listed in the object's GRR set. In FIG. 3C, the subroutine editor window 94 shows that Subroutine 1 for object $O_m$ contains Rule 5, Rule 2, and Rule 6. Subroutines will be described in greater detail below.

The Class Editor

The Class Editor 41 (FIG. 2) enables the user to define a group of objects as a dynamic class. The objects thus grouped can themselves represent individual instances or predefined classes or dynamic classes. The Class Editor 41 generates a dynamic class window 112 or (jar shelf) when activated, refer to FIG. 3A. The window 112 displays each dynamic class 110b and 110c that has been previously defined and displays an empty jar 110a. The Class Editor 41 is initiated upon user selection of a prototype jar icon 120 which can be displayed within window 52 or any other readily accessible portion of the user interface 31. Upon selection of the prototype jar icon 120, window 112 opens and displays existing jars (if any) and also displays at least one empty jar 110a for creating new dynamic classes. The user can either (1) place items into the representation of the empty jar (e.g., to create a new dynamic class) or (2) modify an existing dynamic class (e.g., 110b, 110c) within window 112. If a new jar is created from the empty jar 110a, a new empty jar is made available for use. Once defined, rules and properties can dropped onto a dynamic class and will then be copied into all object types covered by the dynamic class. Further, when defining a rule, a user can select a particular dynamic class to be an abstraction The Class Editor 41 will be described further below.

The GRR Editor

The GRR editor 36 (FIG. 2) enables the user to create and modify Graphical Rewrite Rules through programming by demonstration and direct manipulation. When a GRR is created, the GRR editor 36 stores its "before" and "after" portions in RAM 22. Information exchange between the user and the GRR editor 36 occurs via the GRR editor window 70. Within the GRR editor window 70, the GRR editor 36 generates and displays a "before" portion window 74, an "after" portion window 76, a completion button 71, a calculator icon 73, the second drawing editor icon 75, a property condition button 77, a view program button 78, and a property modification button 79. In addition, the GRR editor 36 signals the simulation viewer 34 to maintain a simulation context indicator 72 in the simulation viewer window 54 during GRR creation or editing.

Refer to FIG. 3A. Within a particular rule (e.g., rule k) there is an object that is taking action. This object is called the "self" object of the rule and the rule is defined or attributed to this object. In rule k, the "self" object is object $O_1$. The object that the self object takes action upon is object $O_2$. As shown in rule k, object $O_1$ "jumps" over object $O_2$. Object $O_2$ is the object on which action is taken with respect to rule k.

Under user control, each "self" object in the "before" portion of a GRR can correspond to a selected object instance (e.g., "Charlie the tuna"), a selected object class (e.g., "tuna") or to any object. Each other—than—"self" object of a GRR can be abstracted to correspond to a selected object instance, a selected object class, or to a selected dynamic class. For each GRR, the user defines a simulation context by positioning the simulation context indicator 72 in the simulation viewer window 54. During GRR creation or editing, the simulation viewer 34 preferably delineates each simulation grid element in the scene displayed in the simulation viewer window 54. In the preferred embodiment, the simulation viewer 34 displays the simulation context indicator 72 as an outlined box surrounding one or more simulation grid elements. The simulation context interrelates the selected object, a subset of simulation grid elements containing the selected object, and any other objects contained therein according to their relative positions, simulation grid element occupancy, a set of dynamic object classes, and a set of property conditions. The simulation context is a simulation state that can occur during the simulation's execution. The initially defined simulation context defines the "before" portion of the GRR. In FIGS. 3A, 3B, and 3C, the simulation context indicator 72 contains objects $O_1$ and $O_2$. The "before" portion window 74 displays the "before" portion of the GRR to the user. Similarly, the "after" portion window 76 displays the GRR's "after" portion. In the definition of a new GRR, the "after" portion is initially identical to its "before" portion. In the preferred embodiment, the completion button 71 allows the user to indicate when GRR definition or editing has been completed.

Referring also now to FIGS. 4A, 4B, 4C, 4D, and 4E, a sequence of block diagrams presenting portions of the user interface 31 during an exemplary GRR definition for object $O_1$ and a corresponding symbolic GRR program created through programming by demonstration is shown. In the exemplary GRR definition, object $O_2$ is adjacent to object $O_1$ as shown.

Figure 4A:
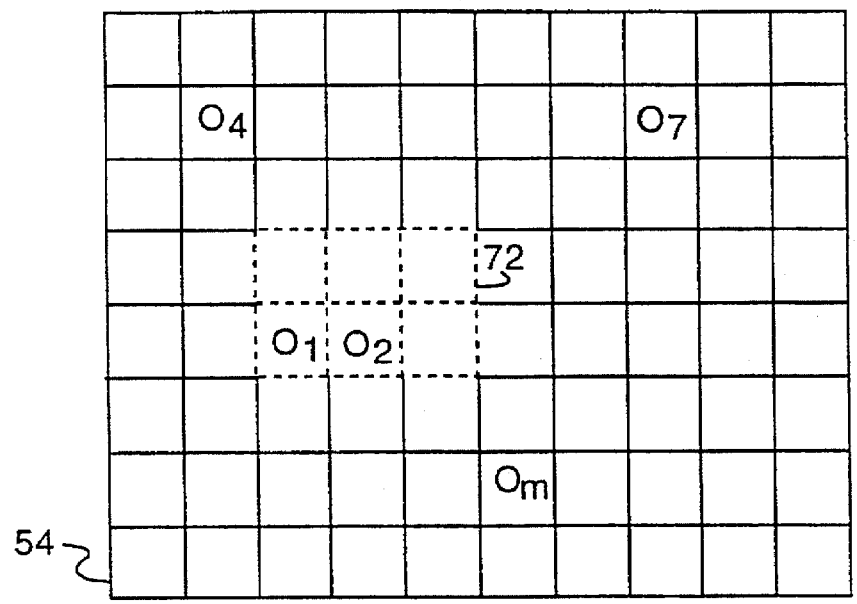
FIGS. 4A, 4B, 4C, 4D, and 4E are a sequence of block diagrams showing a portion of the user interface during an exemplary graphical rewrite rule definition through programming by demonstration.
Figure 4B:
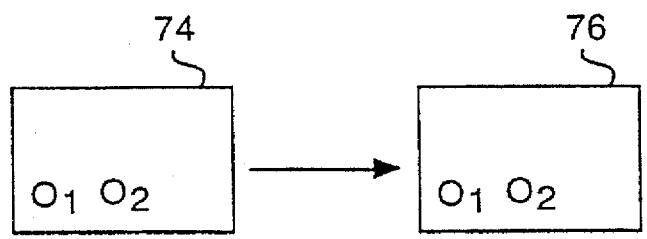
Figure 4C:
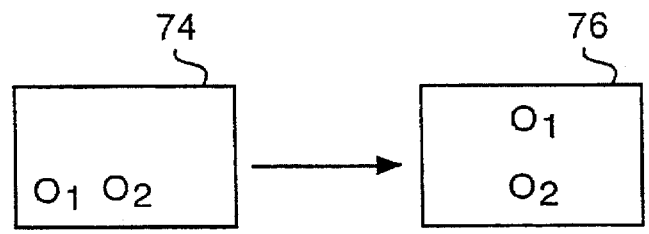
Figure 4D:
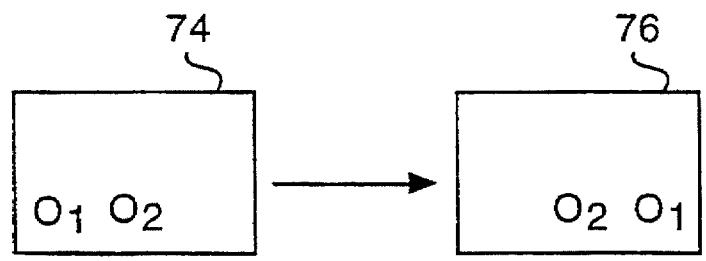

In the creation of a new GRR, the user first identifies an object to which the new GRR will apply. This is the "self" object of the rule as discussed above or the "subject" performing the action. The items that the "self" performs "on" can be selected among a several grouping, including a dynamic class. In the preferred embodiment, the user then selects a GRR definition button (not shown) from within the object rule viewer window 90. When an existing GRR is to be edited, the user selects the GRR from a selected object's GRR set. In the preferred embodiment, the GRR editor 36 signals the simulation viewer 34 to delineate or outline the subset of simulation grid elements in the scene displayed in the simulation viewer window 54 during GRR creation or editing as shown in FIG. 4A. The GRR editor 36 then signals the simulation viewer 34 to display the simulation context indicator 72 in the simulation viewer window 54. When a GRR is initially being defined, the simulation context indicator 72 encloses only the selected object and the simulation grid elements the selected object occupies. In the preferred embodiment, a previously-defined GRR can be edited only when the simulation state to which it corresponds appears in the scene currently displayed in the simulation viewer window 54. The simulation context indicator 72 can be advantageously adjusted by the user to span any subset of simulation grid elements containing the selected object, thereby defining the "before" portion of the GRR. This can be done by allowing the user to drag an drop graphical handles on each side of the simulation context indicator 72. As the simulation context indicator 72 is adjusted, the simulation viewer window 54, the "before" portion window 74, and the "after" portion window 76 are simultaneously updated.

The "before" portion of a GRR shows the selected object, a subset of simulation grid elements surrounding the selected objects, and any additional objects contained therein. The GRR's "before" portion maintains the positions of each additional object and each simulation grid element in the subset relative to the selected object, the occupancy of each simulation grid element in the subset, plus a set of dynamic object classifications and a set of property conditions for the objects in the subset.

In the example considered herein, object $O_1$ has been defined as the selected object or "self," and the simulation context indicator 72 has been adjusted to span the six simulation grid elements indicated by dashed lines in FIG. 4A. Within the six simulation grid elements spanned by the simulation context indicator 72, object $O_2$ is adjacent to object $O_1$ as shown. The "before" portion of the exemplary new GRR identified by the simulation context indicator 72 in FIG. 4A and its initial "after" portion are shown in the "before" portion window 74 and "after" portion window 76, respectively, in FIG. 4B.

In the definition of the GRR through programming by demonstration, the GRR editor 36 enables the user to demonstrate or define a corresponding sequence of actions to be performed by or to be performed upon one or more objects. Each action occurs within the subset of simulation grid elements identified by the simulation context indicator 72. In the preferred embodiment, the user can define object motion actions and property modification actions. An object motion action is defined by moving a selected object from either the object some menu 52 or a first simulation grid element to either the remove icon 97 or a second simulation grid element. A property modification action is defined by specifying a set of operations to be performed upon one or more object properties. Those skilled in the art will recognize that additional types of actions could also be defined. If the user uses the drawing editor 42 to change the appearance of an object during GRR editing or definition, the user can create an animated transition corresponding to an action. During simulation execution, performance of the action to which the animated transition corresponds causes one or more portions of an object's picture to be altered according to the animated transition. A single GRR may have several corresponding actions defined for the "self" object in any of the manners indicated above. Each action alters the state of the selected object in the "after" portion window 76. In the preferred embodiment, an object's state is altered when the object's position changes, when one or more of the object's property values change, or when the object's visual appearance changes. If an action involves the movement of the object from one simulation grid element to another, the user can move the object in the simulation viewer window 54, or the user can move the object in the GRR editor's "after" portion window 76. Movement of the object in the simulation viewer window 54 automatically results in corresponding movement of the object in the "after" portion window 76, and vice versa.

In the preferred embodiment, the user indicates that a property condition action is to be defined or edited by selecting the property modification button 79. When the property modification button 79 is selected, the user can drag a selected property from the object property editor window 92 into a first predetermined region in the GRR editor window 70. The GRR editor 36 then assigns the value of the selected property to a first portion of an equation. The user can also specify a complex property condition with a calculation. The calculation can include one or more constants, the values of one or more object properties, and one or more operators. If the user selects the calculator icon 73, a calculator window 81 (shown in FIG. 5B) is displayed to assist the user in definition of the calculation. Modification button 79 allows the user to view the actions stored in a rule. The equation is stored in RAM 22 after the property condition action has been defined.

The Action Recorder

For each action the user defines or demonstrates, the action recorder 38 (FIG. 2) automatically records and stores the action as a portion of a recording. Each recorded action indicates an exact operation that is to be performed by or upon a specific object The Abstractor After the action recorder 38 has recorded and stored an action, the abstractor 40 (FIG. 2) analyzes the recorded action, generalizes the recorded action, and creates a corresponding generalized computer program step sequence. The abstractor's generalization of the recorded action is referred to herein as event abstraction. In the preferred embodiment, event abstraction takes on two forms, namely, motion abstraction and property abstraction. Motion abstraction and property abstraction correspond to the generalization of object motion actions and property modification actions, respectively. During motion abstraction, exact object locations are generalized according to their relative position within the GRR's "before" portion. During property abstraction, specific property values are generalized. When executed, the generalized computer program step sequence results in the desired action being performed by or upon the In the preferred embodiment, each action demonstrated by the user falls within a predefined number of possible action types. The abstractor 40 preferably stores each generalized computer program step sequence recorded for a given GRR sequentially in RAM 22. The set of generalized computer program step sequences generated is the GRR program. In the example considered herein, a first action is defined in FIG. 4C by moving object $O_1$ to the simulation grid element directly above object $O_2$. Following definition of the first action, the action recorder 38 automatically records the action as a first portion of a recording. The abstractor 40 then analyzes the first portion of the recording, and creates a generalized computer program step sequence corresponding to the first action. A second action is defined in FIG. 4D by moving object $O_1$ to the simulation grid element directly to the right of object $O_2$. After definition of the second action, the action recorder 38 automatically records the second action as a second portion of the recording. The abstractor 40 then analyzes the second portion of the recording, and creates a generalized computer program step sequence corresponding to the second action. No further actions are defined in the current example. In the preferred embodiment, the user selects the completion button 71 when GRR definition or editing has been completed. After completion of GRR definition or editing, the GRR's "after" portion shows the state of the simulation context according to the final action the user had defined.

Figure 4E:
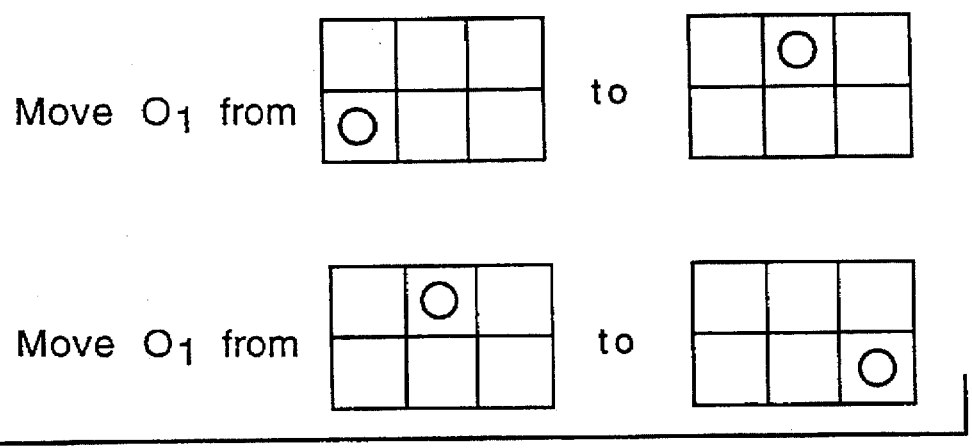

The GRR editor 36 enables the user to view in a mixed geographical and language form, the set of computer program step sequences defined for a given GRR. The GRR editor 36 of the present invention displays each computer program step sequence as a symbolic program step. In the preferred embodiment, the user selects the view program button 79 when symbolic program step display is required. Each symbolic program step provides the user with a visual indication of the object's behavior during execution of the GRR program. The symbolic program steps for the current example are shown in FIG. 4E. The first symbolic program step shows that object $O_1$ is to move from the lower-left simulation grid element in the subset to the upper-center simulation grid element. Similarly, the second symbolic program step shows that object $O_1$ is then to move from the upper-center simulation grid element in the subset to the lower-right simulation grid element. The representation of each computer program step sequence in symbolic form helps the user to understand the complete GRR program without specialized programming knowledge.

During the execution of a simulation, the simulation successively changes from one state to another as objects behave according to their corresponding Graphical Rewrite Rules. A given GRR's "before" portion matches a simulation state when the following conditions are satisfied: 1) the objects in the GRR's "before" portion occupy the same relative positions as a set of objects in the simulation state; 2) the simulation grid elements in the "before" portion are identical in number, relative position, and object occupancy to a subset of simulation grid elements surrounding the set of objects in the simulation state; 3) the objects in the GRR's "before" portion and the set of objects in the simulation state are related according to the object classifications defined for the GRR; and 4) the set of objects in the simulation state satisfy the set of property conditions defined for the objects in the GRR's "before" portion.

During the definition of a new GRR corresponding to a selected object, the abstractor 40 preferably establishes default object classifications In the preferred embodiment GRR's "before" portion. In the preferred embodiment, the default object classifications specify that each object is considered to represent its predetermined type when the GRR is tested for a match. A case in which object $O_1$ is defined as creature #5 and object $O_2$ is defined as gray rock #76 when the above exemplary GRR was defined is now considered. In this case, a first simulation state in which creature #5 and gray rock #76 occupy the lower-left and lower-center simulation grid elements, respectively, within a subset of simulation grid elements having positional and object occupancy relationships identical to those shown in the exemplary GRR's "before" portion obviously constitutes a match. A second simulation state that differs from the first simulation state in that gray rock #30 replaces gray rock #76 also constitutes a match because gray rock #76 and gray rock #30 have the same object class, namely, gray rock. Thus, as defined above, the exemplary GRR is applicable to both the first and the second simulation states.

Picture Abstraction

For each object in a given GRR's "before" portion, other than the object to which the GRR corresponds (e.g., other than the "self" object), the abstractor 40 enables the user to abstract or utilize created object classifications that must be satisfied for the GRR to match. This is referred to as picture abstraction. Dynamic object classifications are created by the Class Editor 41 as will be described further below. In picture abstraction, the abstractor 40 allows the user to utilize a given object's dynamic classification according to a jar name (representing the classification) within the set of jars defined by the user. In such way, an object can be abstracted to include all the members of the class, with respect to the role The abstractor 40 generates and displays a class menu 80 (FIG. 5A) within the GRR editor window 70 that allows the user to perform picture abstraction; this is performed during creation or editing of a particular role (e.g., the abstractor 40 operates in conjunction with the GRR Editor 36).

Figure 5A:
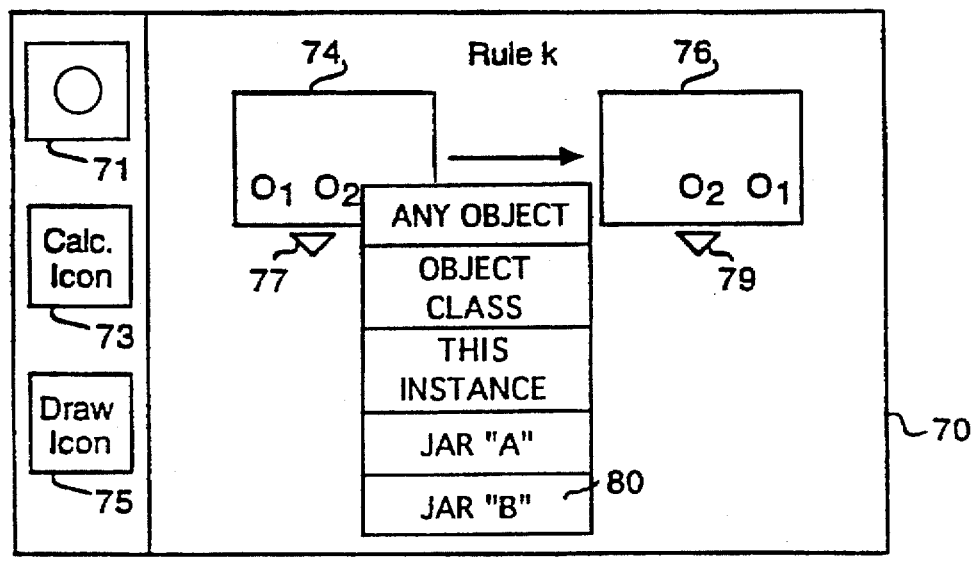
FIGS. 5A and 5B are block diagrams showing a portion of the user interface during an exemplary graphical rewrite rule abstraction.

Referring now to FIG. 5A, a block diagram of a preferred embodiment of a class menu 80 within the GRR editor window 70 is shown. The class menu 80 is associated with a user-selected object in a given GRR's "before" portion, other than the object to which the GRR corresponds. With respect to the other-than-"self" object, the class menu 80 provides the user with a list showing the selected object's name (e.g., "Charlie the tuna"), predetermined class (e.g., object class), "any object," and label names representing pertinent dynamic classes (e.g., Jar A and Jar B). The list is preferably arranged from the most specific set (e.g., object's name) to the most general sets (e.g., dynamic classes). In the preferred embodiment, the picture of the object shown in the GRR's "before" portion is changed according to the manner in which the user alters the object's classification. For example, if the object's classification is generalized, a generalized picture of the object (e.g., an icon of the selected jar) is shown in the GRR's "before" portion. This provides the user with pictorial feedback that increases the user's understanding of when the GRR can match a simulation state. In the class menu 80 of FIG. 5A the user can select whether a particular object (e.g., "this instance") or the predetermined class of the object (e.g., "object class"), respectively, will be tested for a match or whether any object within the set of objects defined by jar "A" or jar "B" will match. Jar "A" and Jar "B" being previously defined dynamic classes. In the preferred embodiment, the class menu 80 is a "pop-up" menu that appears when the user selects an object for picture abstraction. As shown above, a jar can be used for object abstraction within a GRR in this way.

The abstraction capabilities of the present invention are particularly advantageous because a single abstracted GRR can match multiple simulation states. A rule defined having an item (other-than-the "self" object) defined as a particular dynamic class is equivalent to individually copying the rule to apply with each class (and instance) of objects within the dynamic class. This greatly reduces the number of rules the user must define and track. When fewer rules are defined, the user is more likely to understand which GRR was matched at a given stage in the simulation. This in turn improves the user's understanding of objects' actions in the simulation, and enhances the simulation's flexibility and ease of use.

Property Condition Editing

The GRR editor 36 (FIG. 2) allows the user to define and modify the set of property conditions that must be satisfied for the GRR to match a simulation state. Each property condition can include one or more properties of the objects in the GRR's "before" portion. In the preferred embodiment, each property condition establishes a relationship between properties of objects in the GRR's "before" portion and/or expressions. An expression can include one or more properties of any object in the GRR's "before" portion, including the object to which the GRR corresponds; one or more constants; and one or more operators. The operators can include mathematical operators, Boolean operators, string operators, and existence operators.

Figure 5B:
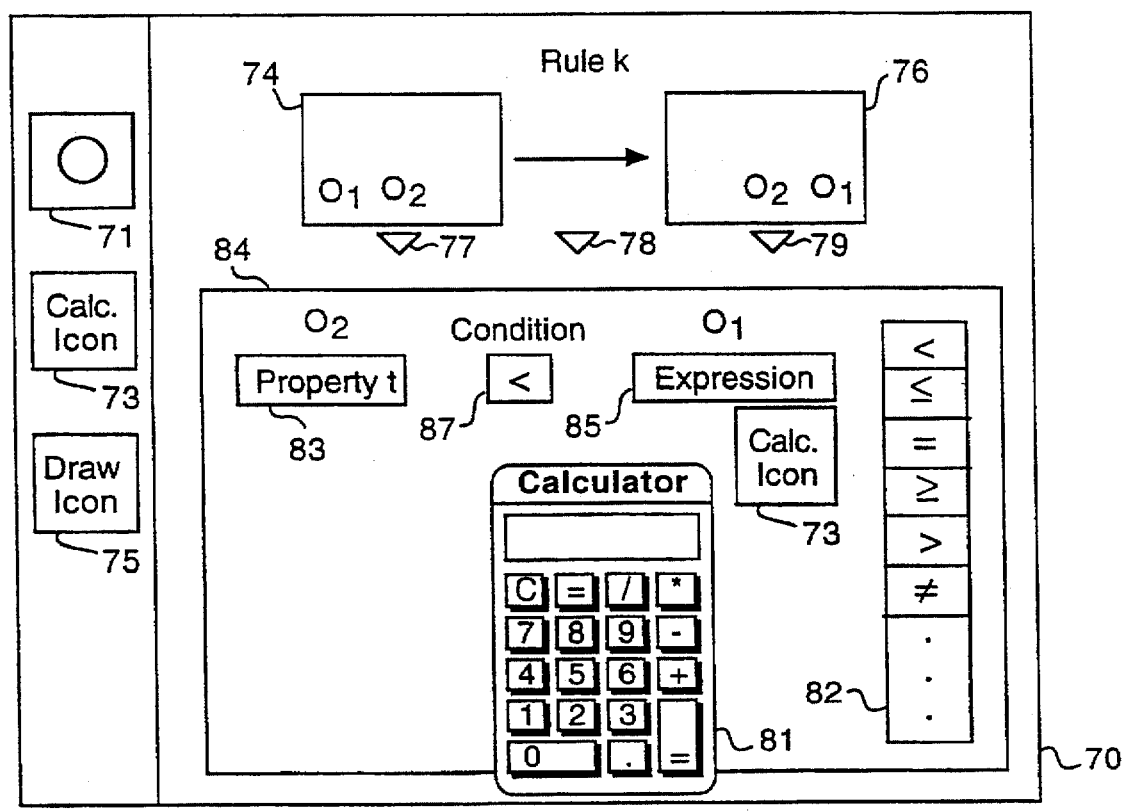

Property condition definition and editing is facilitated by a property condition window 84, a condition menu 82, a calculator window 81, a left-side box 83, a right-side box 85, a condition box 87, and a calculator icon 73 as shown in FIG. 5B. Each of these generated and displayed in the GRR editor window 70 by the GRR editor 36. The property condition window 84 allows the user to specify a property of a particular object (or the property value of the selected dynamic class or selected instance); a condition selected from the condition menu 82; and an expression as described above. The condition is preferably a mathematical relational operator such as "greater than," "greater than or equal to," "equal to," "less than or equal to," "less than," and "not equal to"; a Boolean operator such as "AND," "OR," or "NOT"; a relational string operator such as "contained in"; or an existence operator.

The GRR editor 36 preferably ensures that the selected object's property value (or the property value of the selected dynamic class or selected instance), the conditions available to the user, the operators available to the user, and the contents of the expression defined in the property condition maintain combinational and operational consistency. For example, the GRR editor 36 does not allow the user to add a floating point constant to a text value, or to operate upon a text value with a Boolean operator. The GRR editor 36 thus preferably provides the user with choices for conditions and operators based upon the property the user specifies for the selected object. It is appreciated that it is also possible to compare two properties.

The specified property can appear in either the left-side box 83 or the right-side box 85, and the selected condition appears in the condition box 87. In the preferred embodiment, the user places the specified property into either the left-side box 83 or the right-side box 85 by dragging the property from the object property editor window 92 into the desired box. After the specified property has been dragged into the desired box, the GRR editor 36 automatically places an "equals" operator in the condition box 87, and shows the current value of the specified property in the other box. The specified property, the equals operator, and the current value of the specified property serve to establish a default property condition, where the current value of the specified property is the initial expression. After the default property condition has been established, it can be modified by the user. The calculator window 81 provides the user with calculator functions during expression definition or modification. In the preferred embodiment, the calculator window 81 is displayed when the user selects the calculator icon 73. If the user has used calculator functions during expression editing, another instance of the calculator icon 73 is also displayed below the box containing the expression, as shown in FIG. 5B. In the preferred embodiment, the user initiates and terminates property condition definition or editing by selecting the property condition button 77 displayed in the GRR editor window 70. Once the user has completed property condition definition or editing, the abstractor 40 generalizes the property condition, and then stores the property condition in RAM 22.

The Simulation Execution Controller

The simulation execution controller 50 (FIG. 2) controls the execution of a simulation, and allows the user to interrupt simulation execution to perform simulation programming activities. The simulation execution controller 50 generates and displays an execution control window 56 as shown in FIGS. 3A, 3B, and 3C that allows the user to selectively control simulation execution. During the execution of a simulation, the simulation execution controller 50 sequentially tests Graphical Rewrite Rules in each object's GRR set for a match with a simulation state. For the first match detected in a given object's GRR set, the simulation execution controller 50 executes the GRR program for the matching GRR that the user has previously defined through programming by demonstration. This in turn results in the movement of one or more objects in the simulation state, the modification of one or more object properties, or both. When an object is to move from one simulation grid element to another, the simulation execution controller 50 updates the object location list stored in RAM. When a match occurs in a portion of the simulation that is currently displayed as a scene in the simulation viewer window 54, the simulation viewer 34 redisplays the scene and each object within the scene as the object location list is updated. In this manner, the user can visually follow the behavior of each object in the displayed scene. After GRR program execution has been completed, the updated portion of the simulation corresponds to the matching GRR's "after" portion.

In the preferred embodiment, the simulation execution controller 50 sequentially tests the Graphical Rewrite Rules in a given object's GRR set only until a matching GRR has been found or until each GRR in the object's GRR set has been tested. Within each GRR set, Graphical Rewrite Rules are preferably ordered in a first-to-last user-defined sequence. The simulation execution controller 50 selects each GRR for testing according to this sequence. Once the simulation execution controller 50 finds the first matching GRR, any remaining Graphical Rewrite Rules in the object's GRR set are not tested for a match. Rather, after execution of the GRR program corresponding to the matching GRR, the simulation execution controller 50 proceeds to test the Graphical Rewrite Rules in another object's GRR set.

For an object having one or more Graphical Rewrite Rules in its GRR set, the simulation execution controller 50 retrieves a first GRR from RAM 22. The GRR's "before" portion includes the set of object classifications pertinent to the object and the set of property conditions that were defined during GRR creation or during abstraction. The simulation execution controller 50 first tests the GRR for a match according to any picture abstraction that has been defined. If the objects and the simulation grid elements corresponding to the GRR match a simulation state according to any picture abstractions, the GRR is next tested for a match according to property abstractions. In the testing according to property abstractions, the simulation execution controller 50 sequentially tests each property condition in the GRR's property condition set. For each property condition, the simulation execution controller 50 calculates the value of its expression, and then compares the property specified in the property condition against the value of the expression according to the selected condition. If all comparisons are true according to each condition indicated in the set of property conditions, the GRR program is executed.

The Execution Control Menu

Through the execution control menu 56, the simulation execution controller 50 (FIG. 2) provides the simulation user with a means for controlling the sequential execution of a simulation and a means for viewing the current execution of the simulation. The execution control menu 56 comprises a simulation clock window 58, a stop button 60, a single step forward button 62, a repeated step forward button 64, a single step backward button 66, and a repeated step backward button 68. The simulation execution controller 50 maintains an internal simulation timer that is incremented as the simulation is sequentially executed. The state of the simulation timer and therefore the current execution state of the simulation is indicated by the simulation clock window 58.

The simulation execution controller 50 sequentially executes a simulation as follows: 1) the simulation execution controller 50 increments the simulation timer and updates the simulation clock window 58; 2) for each object in the simulation, Graphical Rewrite Rules in the object's GRR set are sequentially tested for matches; and 3) for the fast matching GRR in each object's GRR set, the corresponding GRR program is executed, causing the simulation viewer window 54 to be updated. If the user selects the repeated step forward button 64, steps 1 through 3 are successively repeated for forward time progression until the user selects the stop button 60. If the user selects the single step forward button 62, steps 1 through 3 above are performed only once for forward time progression.

The execution of a GRR program results in a set of actions being performed by or upon one or more objects. In the preferred embodiment, the user can initiate one or more actions during a simulation's execution by interacting with the simulation in a predetermined number of ways. For example, the user can add an object to the simulation. This causes the simulation execution controller 50 to perform a "stop" action, followed by an "add object" action, followed by a "resume" action. Similarly, the user can delete an object from the simulation, giving rise to a "stop" action, a "delete object" action, and a "resume" action. Each predetermined user interaction causes the simulation execution controller 50 to increment the simulation timer prior to performing the actions associated with the interaction.

When a given action is performed by or upon an object, the state of the object changes. In the preferred embodiment, for each possible type of action the user can define through programming by demonstration during GRR definition, a corresponding "undo" action exists. If a given action and its corresponding "undo" action are successively performed, the "undo" action returns the object to the state it was in prior to the performance of the given action.

For each increment of the simulation timer, the simulation execution controller 50 stores in an action list an account of each action that has been performed and the object to which it corresponds. In the preferred embodiment, the action list is stored in RAM 22. Through the single step backward button 66, the simulation execution controller 50 enables the user to sequentially reverse or "undo" those actions that had been performed during the previous simulation timer increment. When the user selects the single step backward button 66, the simulation execution controller 50 first decrements the simulation timer. The simulation execution controller 50 then sequentially executes in reverse order the "undo" action corresponding to each action that was entered in the action list for the current simulation timer value. If the user selects the repeated step backward button 68, the simulation execution controller 50 repeats the steps described above until the user selects the stop button 60. In this manner, the simulation execution controller 50 allows the user to run a simulation backwards to any desired point up to the beginning of execution.

When the user has selected the stop button 60, the simulation execution controller 50 completes the current simulation execution cycle. Following its completion, the user can perform functions related to GRR definition, editing, and abstraction; perform property editing functions; and manually change the set of objects in the simulation through object insertion, object deletion, and placement of objects in the time-out region 55. In addition, the user can continue simulation execution by selecting either the single step forward button 62 or the repeated step forward button 64; or reverse the simulation by selecting the single step backward button 66 or the repeated step backward button 68.

The GRR editor 36 generates and displays a buttons icon 49 as shown in FIGS. 3A, 3B, and 3C. When simulation execution has been interrupted and the user selects the buttons icon 49, the GRR editor 36 displays on a buttons page one or more rule testing buttons (not shown). The GRR editor 36 enables the user to define Graphical Rewrite Rules for each rule testing button. Thus, each rule testing button has its own set of Graphical Rewrite Rules. If the user selects a given rule testing button during simulation execution, the simulation execution controller 50 tests only those Graphical Rewrite Rules corresponding in the rule testing button's GRR set following the next simulation timer increment, rather than testing Graphical Rewrite Rules for each object in the simulation.

The Object Follower Window

In the preferred embodiment, a simulation may be defined to have a number of simulation grid elements that span an area that is larger than the simulation viewer window 54. An object can therefore move beyond one of the simulation viewer window's boundaries and out of the user's view. The simulation viewer 34 generates and displays the object follower window 96 to allow the user to continuously track or follow a selected object during simulation execution, thereby ensuring that the selected object is displayed in the simulation viewer window 54 throughout the simulation's execution. In the preferred embodiment, the user indicates that an object is to be followed by moving or "dragging" the object from the simulation viewer window 54 into the object follower window 96.

The Object Property Display

Figure 6:
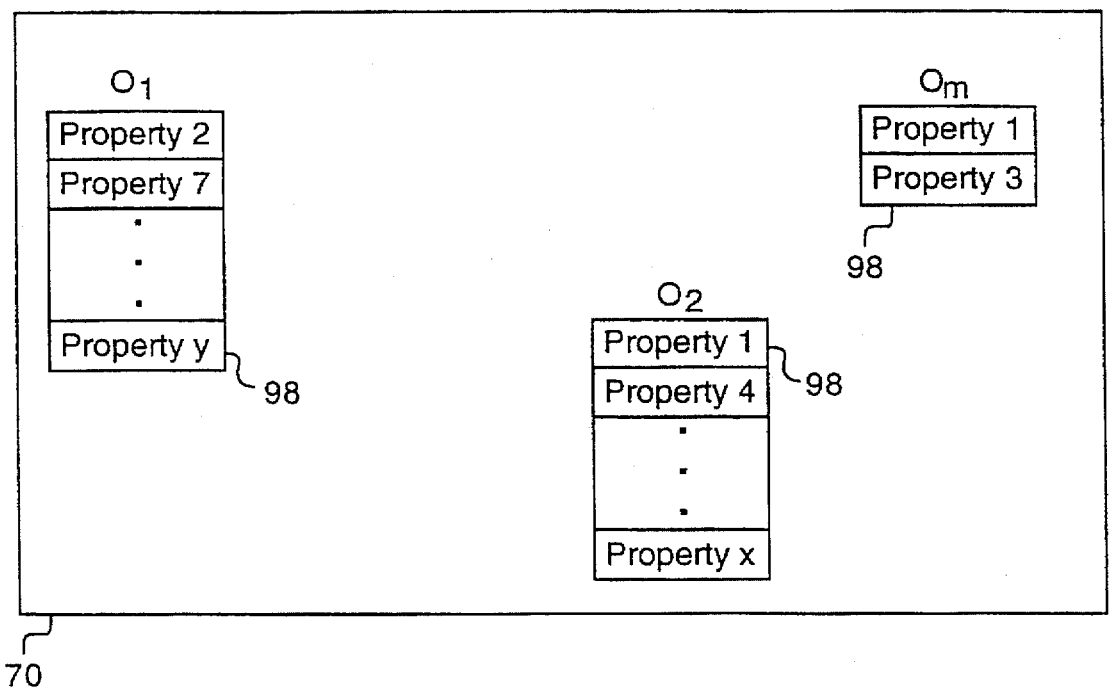
FIG. 6 illustrates a preferred embodiment of a heads-up object property display of the present invention.

During the execution of a simulation, one or more properties of a given object may be updated. The simulation viewer 34 advantageously provides the user with heads-up object property display 98 for tracking selected properties associated with one or more objects located within the scene displayed in the simulation viewer window 54. Referring now to FIG. 6, a preferred embodiment of a heads-up object property display 98 is shown. The heads-up object property display 98 comprises a pull-down graphical window containing a list of user-selected properties associated with a user-selected object. The heads-up object property display 98 allows the user to monitor the selected properties of each selected object that is present in the currently-displayed scene. The heads-up object property display 98 is particularly advantageous because its position is modified on the output device 16 with each of the object's movements such that the heads-up object property display 98 effectively follows or is attached to the object. This in turn provides the user with a better understanding of actions occurring within the simulation.

Operation Flow of General System

While the elements of the simulator 30 have been described as performing actions, those skilled in the art will recognize that each element preferably comprises computer program steps for controlling the CPU 12.

Figure 7:
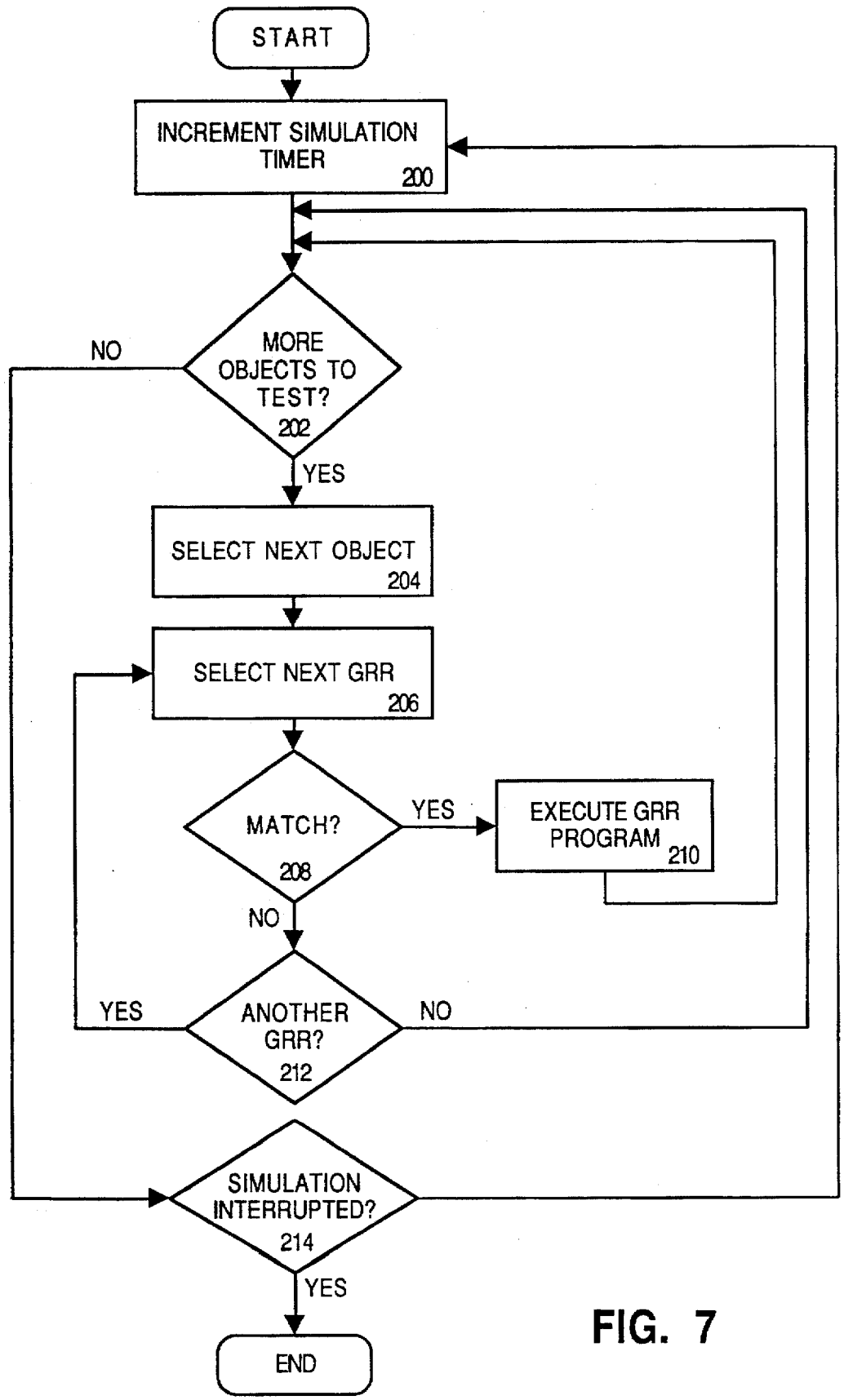
FIG. 7 is a flowchart showing a preferred simulation execution method of the present invention.

Referring now to FIG. 7, a flowchart of the logic performed by the preferred method for simulation execution is shown. The preferred method begins in step 200 with the simulation execution controller 50 incrementing the simulation timer. Next, in step 202, the simulation execution controller 50 determines whether additional objects in the simulation are to be tested for matches to a current simulation state. In the preferred embodiment, only those objects having Graphical Rewrite Rules in their corresponding GRR sets are tested. An object will have an associated GRR rule if (1) the rule was specifically assigned to the object instance, or (2) assigned to the class of the particular object or (3) the rule was copied to the object instance because of its membership to a dynamic class. Within each simulation timer increment, all objects having Graphical Rewrite Rules in their GRR sets are tested once. If in step 202 the simulation execution controller 50 determines that at least one additional object having Graphical Rewrite Rules in its GRR set remains to be tested during the current simulation timer increment, the simulation execution controller 50 selects a next object in step 204. Following step 204, the simulation execution controller 50 selects a next GRR in step 206. Within the selected object's GRR set, Graphical Rewrite Rules are preferably ordered from first-to-last in a user-defined sequence. Selection of each GRR proceeds according to this fast-to-last ordering.

After step 206, the simulation execution controller 50 determines if the selected GRR matches a current simulation state (step 208). A match to a current simulation state is defined as described above. If a match exists, the simulation execution controller 50 executes the corresponding GRR program in step 210. Following step 210, control passes back to step 202.

If at step 208 the simulation execution controller 50 determines that the selected GRR does not match a current simulation state, the preferred method determines in step 212 if another GRR in the selected object's GRR set requires testing. If so, the preferred method proceeds to step 206. If no Graphical Rewrite Rules in the selected objects GRR set require testing, the preferred method returns to step 202.

If in step 202 the simulation execution controller 50 determines that no additional objects require testing, the simulation execution controller 50 determines in step 214 whether the user has interrupted the simulation. In the preferred embodiment, simulation interruption occurs when the user selects the stop button 60. If the simulation has not been interrupted, the preferred method proceeds to step 200 to continue the execution of the simulation. If the simulation has been interrupted, the preferred method ends.

Figure 8:
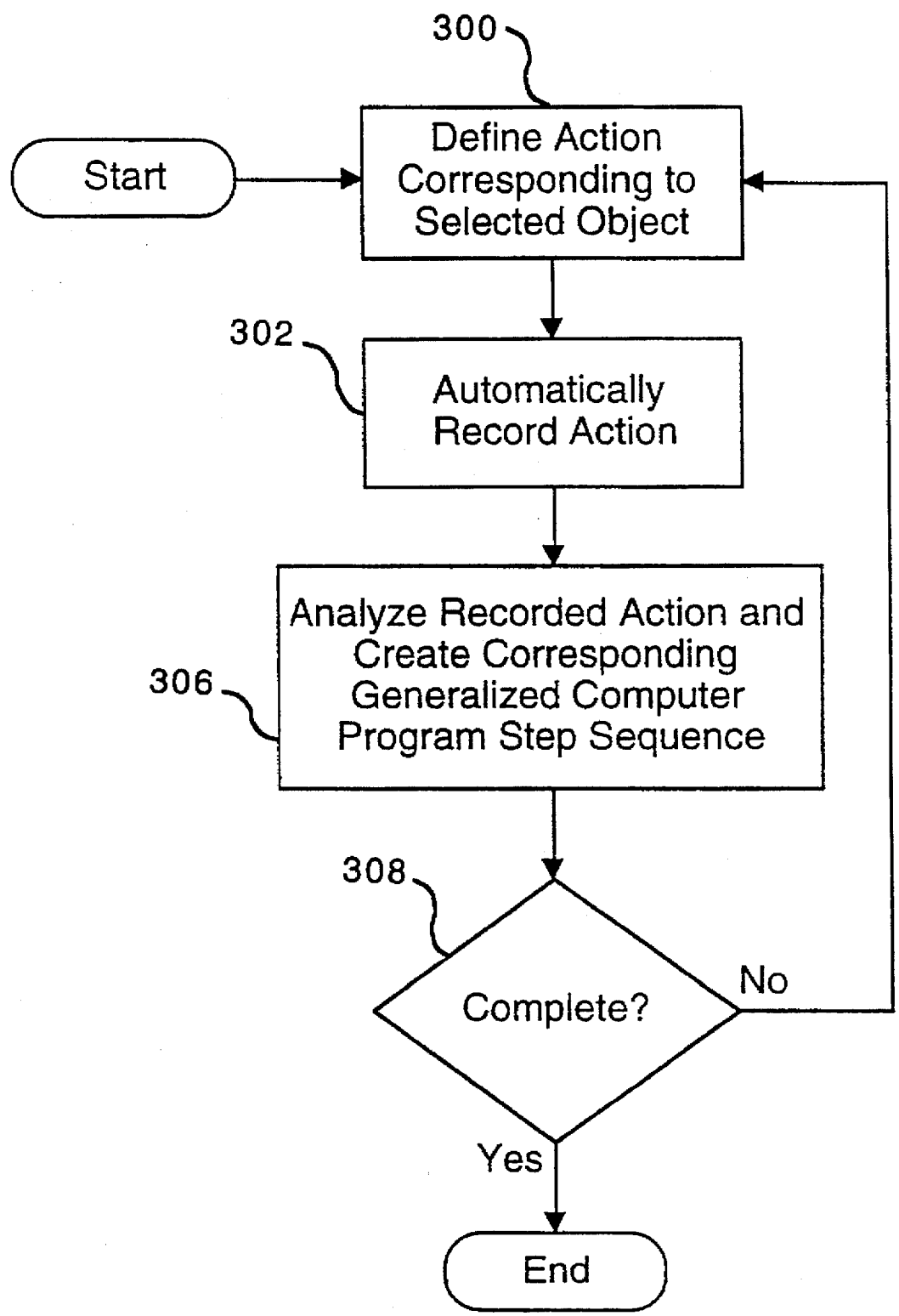
FIG. 8 is a flowchart of a preferred method for programming by demonstration in the present invention.

Referring now to FIG. 8, a flowchart of a preferred method for programming by demonstration in the present invention is shown. The preferred method begins in step 300 with the user demonstrating or defining an action corresponding to an object shown in a GRR's "before" portion. Next, in step 302, the action recorder 38 automatically records the demonstrated action as a portion of a recording. The abstractor 40 analyzes the recorded action, and creates a corresponding generalized computer program step sequence in step 306. Following step 306, the action recorder 38 determines whether the user has completed programming by definition. If not, the preferred method returns to step 300. If programming by definition has been completed, the preferred method ends.

Figure 9A:
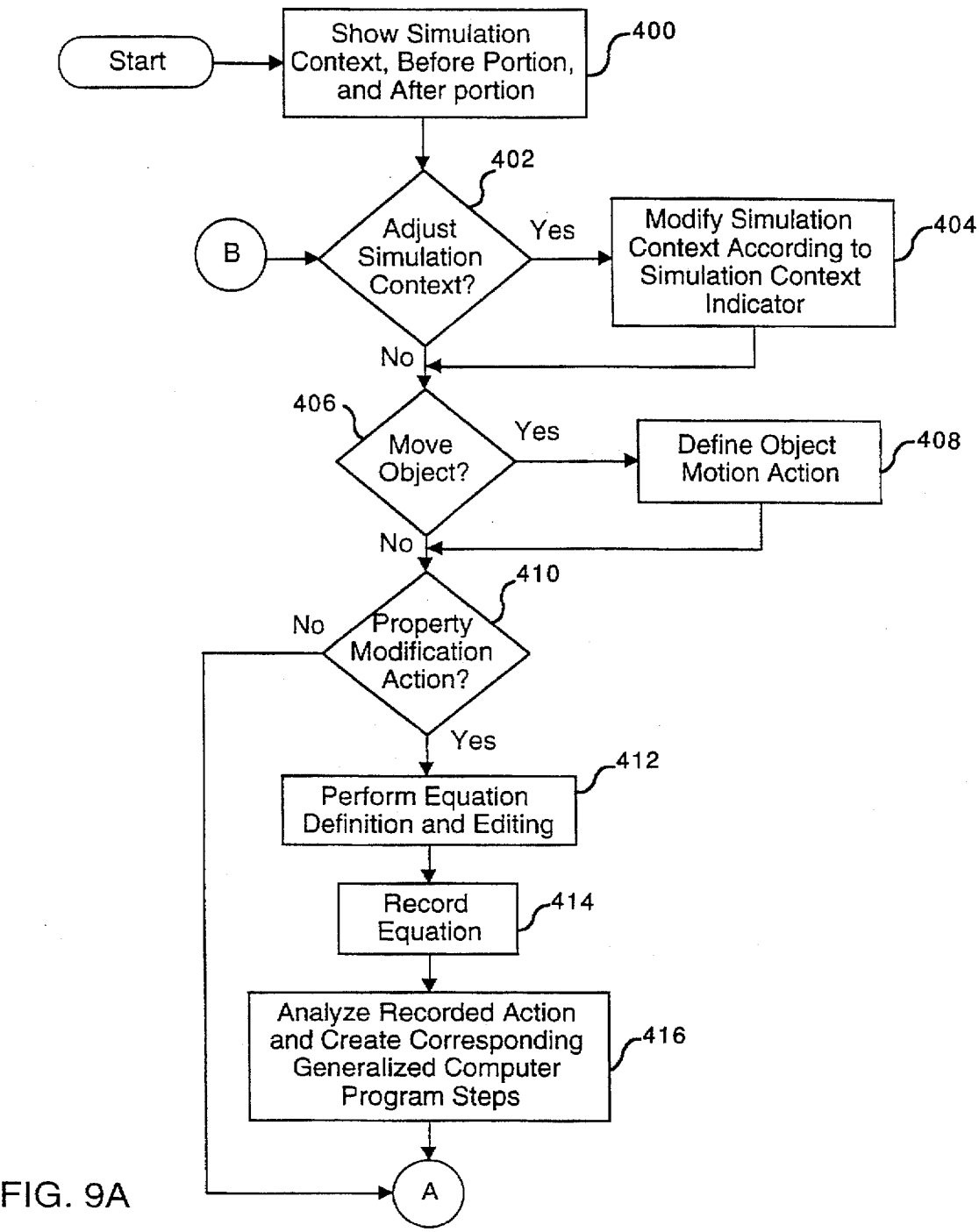
FIGS. 9A and 9B are a flowchart of a preferred graphical programming method in accordance with the present invention.
Figure 9B:
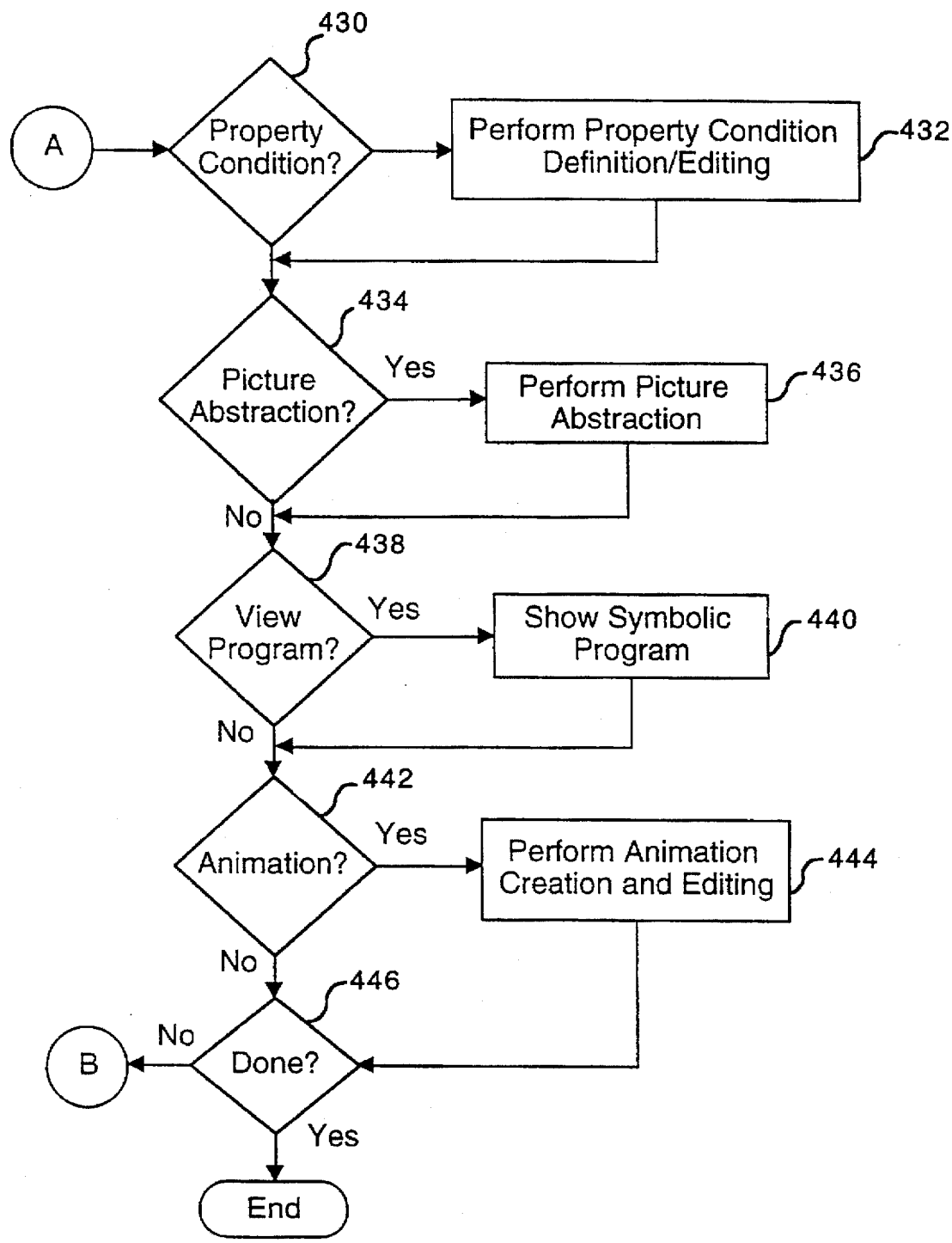

Referring now to FIGS. 9A and 9B, a flowchart of a preferred graphical programming method in accordance with the present invention is shown. The preferred method begins in step 400 of FIG. 9A with the GRR editor 36 and the simulation viewer 34 showing the simulation context, the "before" portion, and the "after" portion corresponding to a GRR in step 400. When a GRR is initially defined, its simulation context, its "before" portion, and its "after" portion show the object to which the GRR corresponds and the simulation grid elements the object occupies. Next, in step 402, the GRR editor 36 determines whether the simulation context has been adjusted. Preferably, the user adjusts the simulation context by positioning the simulation context indicator 72 in the simulation viewer window 54. If in step 402 the GRR editor 36 determines that the user has adjusted the simulation context, the GRR editor 36 sets the simulation context to the subset of simulation grid elements surrounded by the simulation context indicator 72, the selected object, and any additional objects contained therein in step 404.

In step 404, the GRR editor 36 also includes in the simulation context information specifying object occupancies in the subset of simulation grid elements, the set of object classifications of which the object belongs, and the set of property conditions. After step 404, or if the GRR editor 36 determines in step 402 that the simulation context has not been adjusted, the GRR editor 36 determines whether an object in the GRR's "before" portion or in the simulation viewer 54 has been moved in step 406. If so, the action recorder 38 and the abstractor 40 define an object motion action in step 408. If the GRR editor 36 determines that an object has not moved in step 406, or following step 408, the GRR editor 36 determines whether a property modification action is to be defined or edited in step 410. Preferably, the user indicates that a property modification action is to be defined or edited by selecting the property modification button 79. If a property modification action is to be defined or edited, the GRR editor 36 performs equation definition and editing in step 412. Following step 412, the action recorder 38 records the equation as a portion of a recording in step 414. Next, in step 416, the abstractor 40 analyzes the recorded equation and creates a corresponding generalized computer program step sequence that can implement the required property modification action.

After step 416, or following step 410 if the GRR editor 36 determines that no property modification action is to be defined or edited, the GRR editor 36 determines whether the property condition definition or editing is required in step 430. If so, the GRR editor 36 performs property condition definition or editing in step 432. If in step 430 the GRR editor 36 determines that property condition definition or editing is not required, or after step 432, the GRR editor 36 determines whether picture abstraction is required in step 434. Preferably, the user indicates that picture abstraction is required by selecting an object shown in the GRR's "before" portion. If picture abstraction is required, the abstractor 40 performs the necessary picture abstraction in step 436. At block 436, the system can utilize dynamic classes to perform picture abstraction.

If the GRR editor 36 determines in step 434 that picture abstraction is not required, or following step 436, the GRR editor 36 determines whether the GRR program is to be shown. The user preferably indicates that the GRR program is to be shown by selecting the view program button 78. If the GRR program is to be shown, the GRR editor 36 shows the symbolic program steps corresponding to the GRR program in step 440.

After step 440, or after step 438 if the GRR program is not to be shown, the GRR editor 36 determines whether an animation is to be defined or edited. Preferably, the user indicates that an animation is to be defined or edited by selecting the drawing editor icon 75 from within the GRR editor window 70. If the GRR editor 36 determines in step 442 that an animation is to be defined or edited, the drawing editor 42 performs the animation definition or editing in step 444.

If the GRR editor 36 determines that no animation is to be defined or edited in step 442, or after step 444, the GRR editor 36 determines in step 446 whether graphical programming is complete. In the preferred method, the user indicates that graphical programming is complete by selecting the completion button 71. If graphical programming is to continue, the preferred method returns to step 402. If graphical programming is complete, the preferred method ends.

Figure 10:
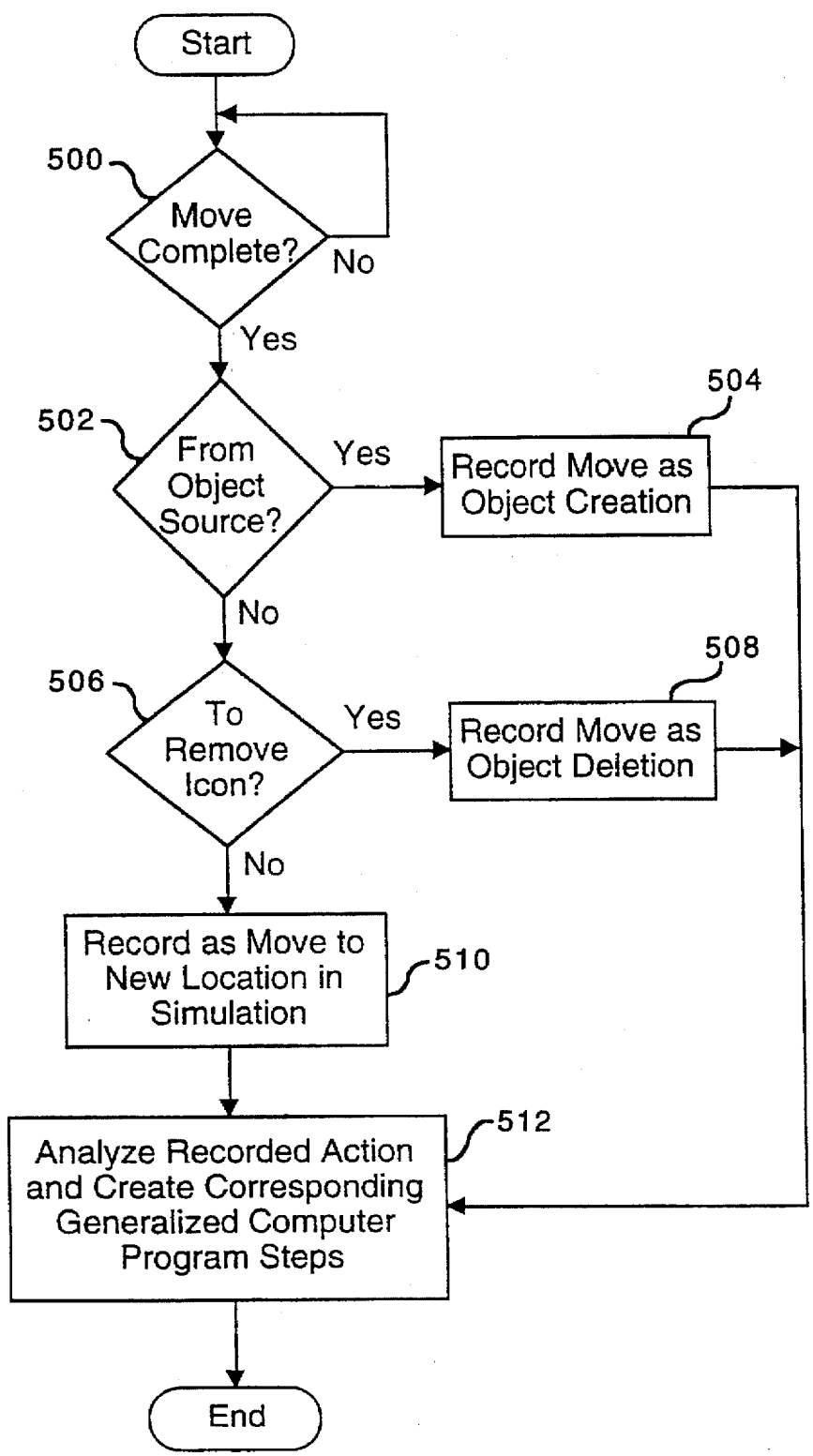
FIG. 10 is a flowchart of a preferred method for defining an object motion action in the present invention.

Referring now to FIG. 10, a flowchart of a preferred method for defining an object motion action (step 408 of FIGS. 9A and 9B) is shown. The preferred method begins in step 500 with the action recorder 38 determining whether the object motion has been completed. Preferably, object motion is completed after the user has deselected the object. If the object motion has not been completed, the preferred method remains in step 500. Once the object motion has been completed, the action recorder 38 determines whether the object has been moved from the object some to the GRR's "before" portion or to the simulation viewer window 54 in step 502. If the object has been moved in this manner, the action recorder 38 records the action as an object creation in step 504. If the action recorder 38 determines that the object has not been moved from the object some in step 502, the action recorder 38 determines whether the object has been moved to the remove icon 97 in step 506. If so, the action recorder 38 records the action as an object deletion in step 508. If the action recorder 38 determines in step 506 that the object was not removed to the remove icon 97, the action recorder 38 records the action as a move from a first simulation grid element to a second simulation grid element in step 510. After step 504, step 508, or step 510, the abstractor 40 analyzes the recorded action and creates a corresponding generalized computer program step sequence that can carry out the desired object motion action in step 512. Following step 512, the preferred method ends.

Figure 11A:
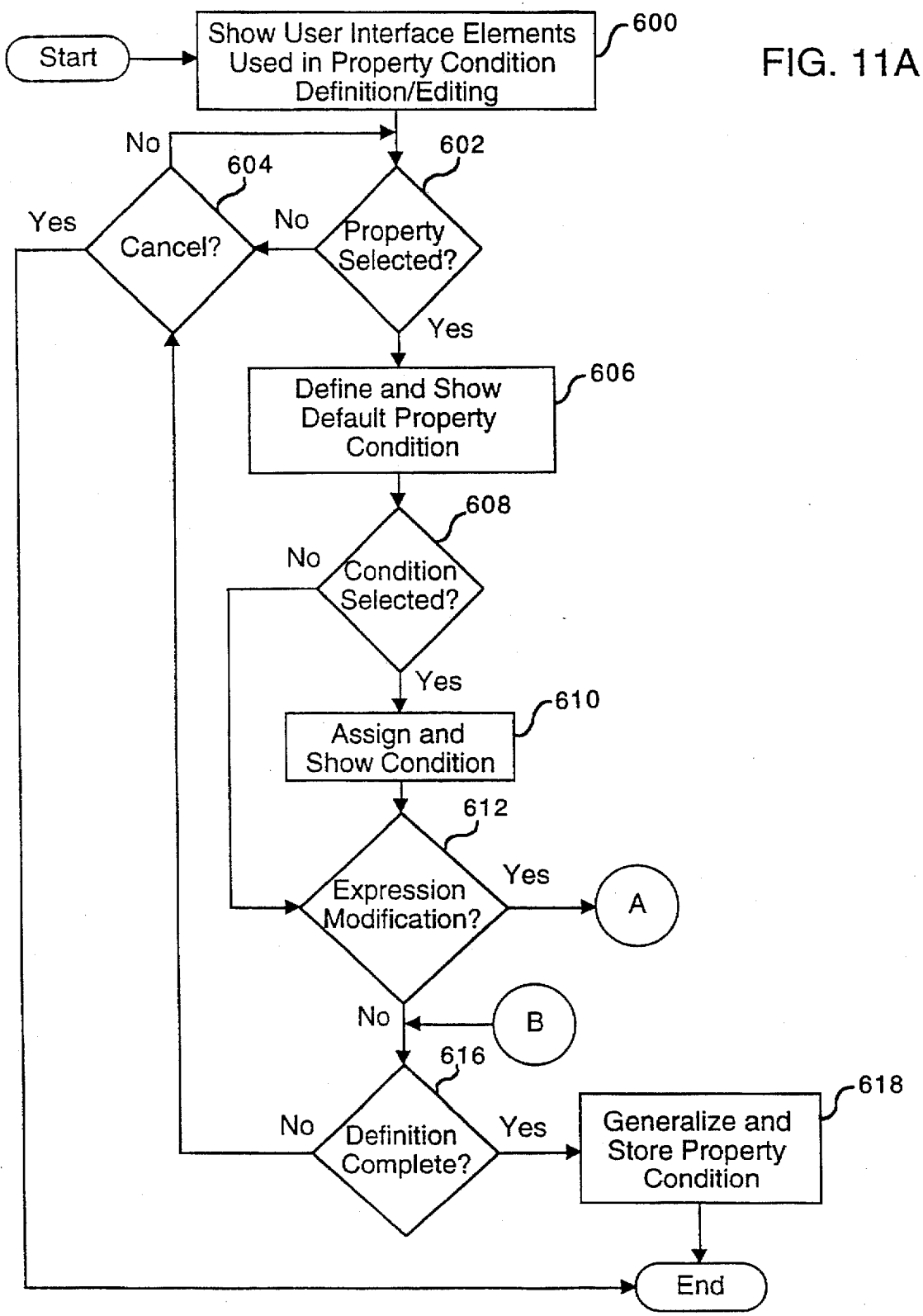
FIGS. 11A and 11B are a flowchart of a preferred method for defining or editing a property condition in the present invention.
Figure 11B:
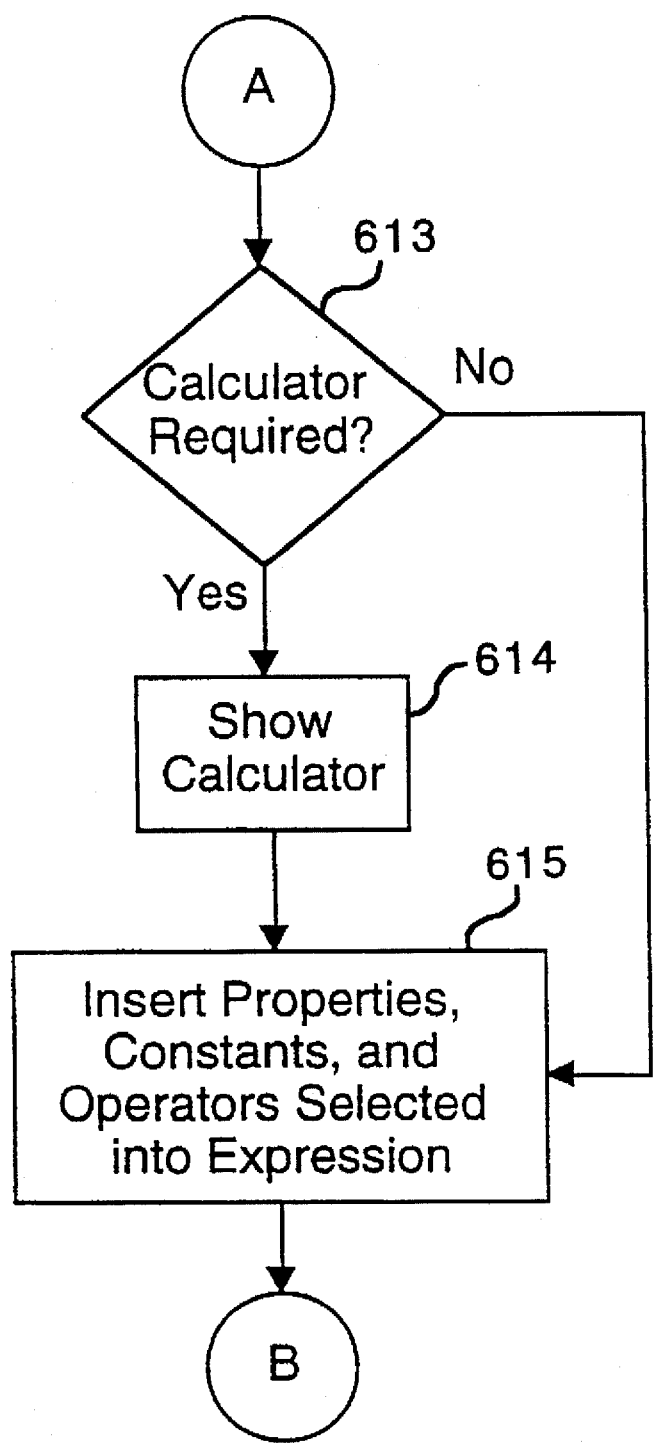

Referring now to FIGS. 11A and 11B, a flowchart of a preferred method for defining or editing a properly condition in the present invention is shown. The preferred method begins in step 600 with the GRR editor 36 displaying the user interface elements that are used in property condition definition or editing. These preferably include the property condition window 84, the condition menu 82, the calculator window 81, the left-side box 83, the right-side box 85, the condition box 87, and the calculator icon 73. In addition, the calculator window 81 is selectively displayed as described below. The GRR editor 36 then determines in step 602 whether the user has selected a property. In the preferred embodiment, the user selects a property by dragging a given object's property that is displayed in the object property editor window 92 into either the left-side box 83 or the right-side box 85. If the user has not selected a property, the GRR editor 36 determines whether property condition definition or editing is to be canceled in step 604. If property condition definition or editing is to be canceled, the preferred method ends. In the preferred embodiment, the user indicates cancellation of property condition definition or editing by selecting a cancellation button. If property condition definition or editing is to continue, the preferred method returns to step 602.

If the GRR editor 36 determines in step 602 that the user has selected a property, the GRR editor 36 defines and shows the default property condition in step 606. In the preferred embodiment, the selected property, an equals condition, and the current value of the selected property form the default property condition. The current value of the selected property is initially the property condition's expression. Following step 606, the GRR editor 36 determines in step 608 if the user has selected a condition from the condition menu 82. if so, the GRR editor 36 assigns the selected condition to the property condition in step 630. After step 630, or if the GRR editor 36 determines that the user has not editor 36 determines whether the user has editor 36 determines whether the user has begun modification of the expression in step 612. If so, the GRR editor 36 determines whether the user requires calculator functions in step 613. Preferably, the user indicates that calculator functions are required by selecting the calculator icon 73. If the GRR editor 36 determines in step 613 that the user requires calculator functions, the GRR editor 36 displays the calculator window 81 in step 614. After step 614, or if the GRR editor 36 determines in step 613 that the user does not require calculator functions, the GRR editor 36 inserts any properties, constants, or operators into the expression in step 615 as they are selected or input by the user. Following step 615, or if the GRR editor 36 determines in step 612 that the user is not modifying the expression, the GRR editor 36 determines in step 616. If definition or editing of the property condition is complete. If so, the abstractor 40 generalizes the property condition, and then stores the property condition in RAM 22 in the property condition set associated with the GRR in step 618. After step 618, the preferred method ends. If the GRR editor 36 determines that the property condition definition is not complete in step 616, the preferred method returns to step 604.

Figure 12:
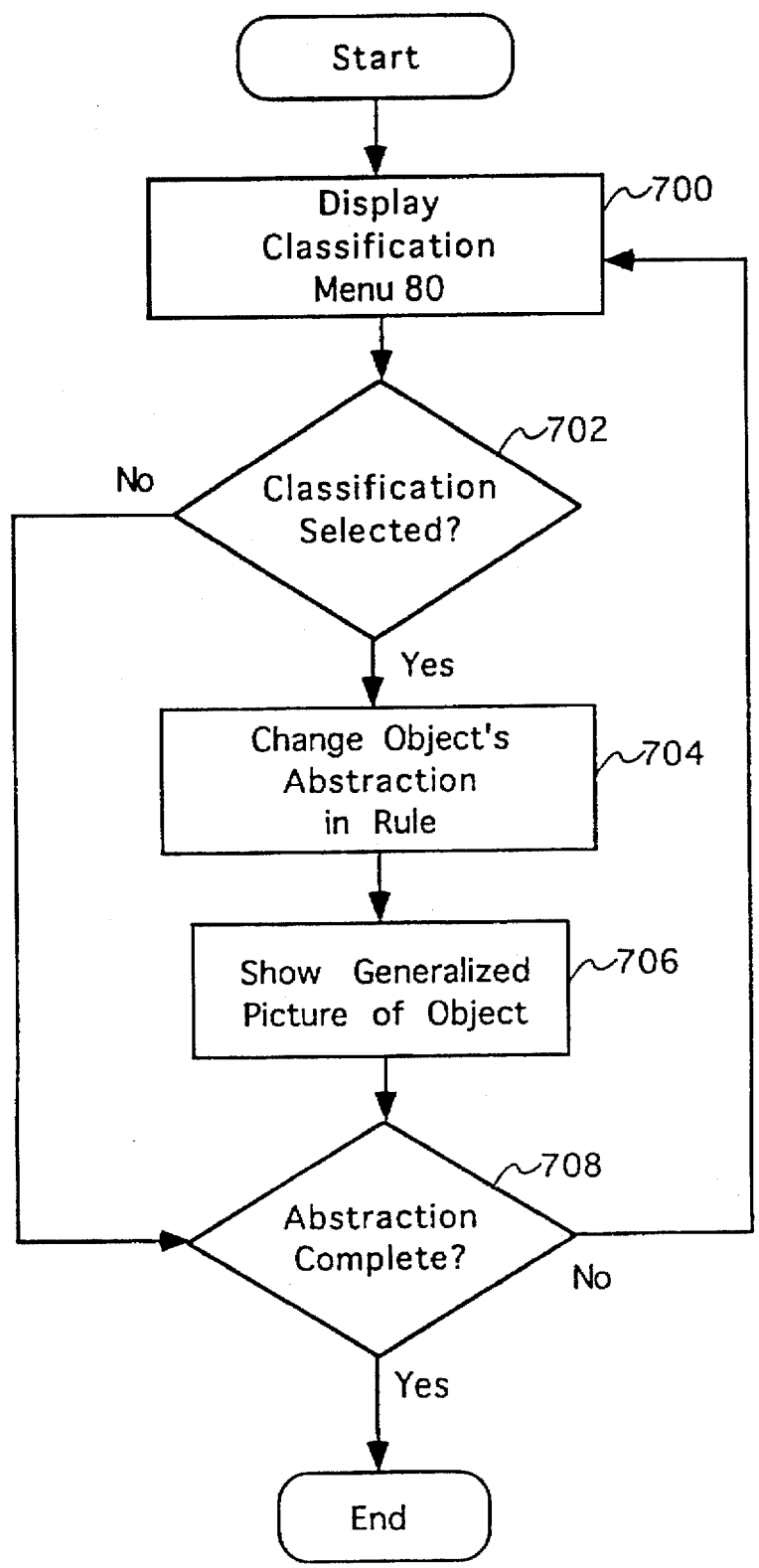
FIG. 12 is a flowchart of a preferred method for performing picture abstraction in the present invention.

Referring now to FIG. 12, a flowchart of a preferred method for performing picture abstraction (step 436 of FIG. 9) in the present invention is shown. The preferred method begins in step 700 with the abstractor 40 generating and displaying the class menu 80 corresponding to the selected other-than "self" object. The class menu 80 preferably shows the selected object's name, the object's class, "any object," and any defined dynamic classes that are pertinent to the object (e.g., that include the object instance or the object class), these are arranged in a most-specific to most-general order. In the preferred embodiment, the abstractor 40 implements the class menu 80 as a "pop-up" menu. The abstractor 40 then determines if the user has selected dynamic classification (e.g., a defined jar) from the class menu 80 in step 702. If the user selects a jar, the abstractor 40 changes the object's abstraction (e.g., object other than the "self" object) to match the selected jar. In effect, the act of selecting a dynamic classification as an object, other than the "self" object, is analogous to making a number of individual rules having the same "self" but applicable to all members of the dynamic classification in terms of what objects the rule takes action on. For example, when the GRR is tested for a match, the selected object and a corresponding object within a simulation state are tested to determine whether they are within the same classification. In one embodiment, following step 704, the abstractor 40 alters the object's picture in the GRR's "before" portion in step 706, according to the object classification the user has selected. If a more general classification has been selected, the object's picture in the GRR's "before" portion is generalized accordingly (e.g., if a jar has been selected then a image of a jar is displayed). Next, in step 708, the abstractor 40 determines if picture abstraction is complete. If picture abstraction is not complete, the preferred method returns to step 700. If the abstractor 40 determines that picture abstraction is complete in step 708, the preferred method ends. Preferably, the user indicates that picture abstraction is complete by deselecting the selected object.

II. Subroutines

In traditional programming languages, a subroutine is a named body of code, optionally accepting one or more parameters. Typically, the same subroutine can be called from many places within a program, thereby allowing programmers to reuse subroutine code. In addition, subroutines allow programmers to hide detail. For example, in the portion of the program that calls the subroutine, the multiple instructions within the subroutine are represented by a single instruction which calls the subroutine. Further, the individual functions of the instructions in subroutines typically combine to define a larger function. Therefore, the use of subroutines allows programmers to break programs up into conceptually-related modules. Finally, the use of subroutines often facilitates debugging, since many program environments allow subroutines to be debugged independently of the rest of the program.

As mentioned above, the present invention supports GRR subroutines. As will be described in greater detail hereafter, the GRR subroutines supported by the present invention provide some of the same benefits as traditional subroutines, as well as other benefits particularly useful in simulation environments.

Teminology

In the following description of GRR subroutines, terms will have the following meanings: "Subroutine" is a grouped set of one or more GRRs and subroutines. A "target object" of a particular GRR set is the simulation object whose behavior is affected by the GRR set during the performance of a simulation. The "corresponding rules" of a subroutine are the GRR rules that are implemented in the subroutine. The "visual subroutine indicator" of a subroutine is a visually displayed representation of a subroutine. A "corresponding rule indicator" is a visually displayed representation of a corresponding rule. It is appreciated that a target object can include (1) a particular instance of a class (e.g., "Charlie the tuna") or (2) an object class (e.g., "tuna") or (3) a dynamic class (e.g., "tasty fish").

Object Rule Viewer Windows

Figure 13:
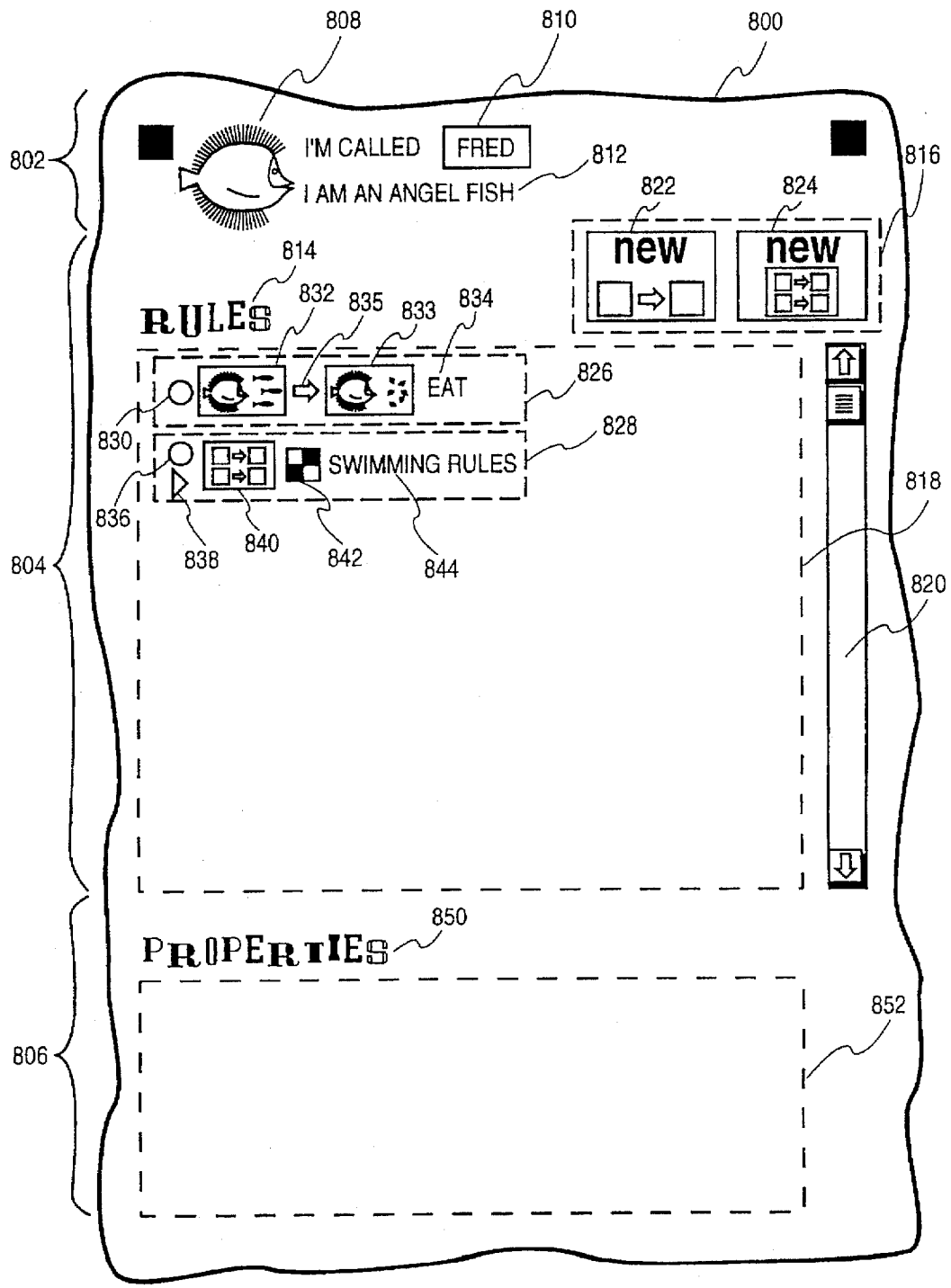
FIG. 13 illustrates an object rule viewer window that contains a visual list of subroutine indicators according to the presently preferred embodiment of the invention.

Referring to FIG. 13, it illustrates an object viewer window 800 according to the presently preferred embodiment of the invention. As explained above, a user may open an object rule viewer window for a class of simulation objects (e.g. Angelfish) or a particular instance of a simulation object (e.g. Fred the Angelfish). The object viewer window 800 includes three general sections: a header section 802, a rule section 804 and a property section 806. The header section 802, rule section 804 and property section 806 respectively serve to identify a simulation object, identify rules and subroutines for the simulation object, and identify properties of the simulation object. Each of these sections shall now be described in greater detail.

The header section 802 includes visual indicators that identify the simulation object associated with the object viewer window 800. The rules and subroutines represented in the object viewer window 800 determine the simulation behavior of the object identified in the header section 802. Therefore, the simulation object identified in the header section 802 is the "target object" for the rules and subroutines represented in object viewer window 800.

In the illustrated example, the target object for object viewer window 800 is an instance object "Fred" of a class object "Angelfish". To identify the target object, header section 802 includes an image 808 that the user has associated with the target object, an instance indicator 810 that indicates the name of the target object, and a class indicator 812 that indicates the name of the class of the target object The property section 806 includes a section identifier 850 and a property specification region 852. Section identifier 850 serves to identify the property section 806 from the other sections of object viewer window 800. In the preferred embodiment, section identifier 850 is simply a stylized graphic of the word "PROPERTIES". Property specification region 852 contains visual indications of the properties that have been associated with the target object. In the illustrated example, no properties have been associated with the target object, so the property specification region 852 is empty.

The rule section 804 includes a section identifier 814, a rule creation control region 816, a GRR set region 818 and a rule scrollbar 820. The section identifier 814 serves to identify the rule section 804 from the other sections of object viewer window 800. In the preferred embodiment, section identifier 814 is simply a stylized graphic of the word "RULES". The rule creation control region 816 contains controls for creating new rules and/or subroutines for the target object. In the illustrated example, rule creation control region 816 contains a rule creation icon 822 for creating a new rule for the target object and a subroutine creation icon 824 for creating a new subroutine for the target object.

GRR set region 818 includes a visual indicator for each of the rules and subroutines that have been established for the target object. In the present example, one rule and one subroutine have been created for Fred the Angelfish. Therefore, GRR set region 818 includes one visual rule indicator 826 and one visual subroutine indicator 828. If the visual indicators for all of the rules and subroutines associated with the target object do not fit within the GRR set region 818, then as many as can fit are displayed. The user may then operate scroll bar 820 to cause GRR set region 818 to scroll, and thereby determine which rules and subroutines are currently displayed.

Visual Rule Indicators

Each visual rule indicator corresponds to a corresponding rule that applies to the target object. In the preferred embodiment, each visual rule indicator consists of four general components: a tracing light 830, a precondition image 832, a postcondition image 833 and a rule name indicator 834. Precondition image 832 visually depicts a state that must exist in the simulation environment for the corresponding rule to execute. Postcondition image 833 visually depicts the state that will exist after the corresponding rule executes. An arrow 835 points from the precondition image 832 to the postcondition image 833 to visually convey the idea of transformation. Rule name indicator 834 visually depicts a name that the user has associated with the corresponding rule.

The tracing light 830 gives the user visual feedback during the performance of a simulation. Specifically, if during the performance of a simulation the generalized computer steps of the corresponding rule are executed, then tracing light 830 turns green. As explained above, the generalized computer steps are executed when the rule is tested and the preconditions for the role are satisfied. If, on the other hand, the corresponding rule is tested and any precondition to the rule is not satisfied, then the tracing light 830 turns red. If a rule has not yet been tested during a clock tick, tracing light 830 remains white.

Visual Subroutine Indicators

Each visual subroutine indicator corresponds to a subroutine that applies to the target object. As explained above, a subroutine is a grouped set of graphical rewrite rules. Therefore, the subroutine represented by a visual subroutine indicator may contain multiple corresponding rules. A visual subroutine indicator preferably includes a tracing light 836, an open/close control 838, a subroutine symbol 840, a subroutine type indicator 842 and a subroutine name indicator 844. Subroutine symbol 840 indicates that visual subroutine indicator 828 is a subroutine indicator and not a rule indicator. Preferably all visual subroutine indicators include subroutine symbol 840, thereby creating a clear and consistent visual distinction between visual subroutine indicators and visual rule indicators.

Subroutine name indicator 844 identifies the name that the user has given to the subroutine represented by visual subroutine indicator 828. In the present example, the user has given the name "swimming rules" to the subroutine that is represented by visual subroutine indicator 828. Subroutine name indicator 844 differs from rule name indicator 834 in that subroutine name indicator 844 corresponds to a set of rules, while rule name indicator 834 corresponds to a single rule. Each rule in the set of rules will typically have its own name, distinct from the name of the subroutine to which it belongs.

During the performance of a simulation, tracing light 836 functions similar to tracing light 830, with the exception that tracing light 836 turns green if any one of the rules that belong to the subroutine represented by visual subroutine indicator 828 is successfully tested, and turns red only when all the corresponding rules are tested and fail. Open/close control 838 is a user interface control that may be operated by a user to toggle visual subroutine indicator 828 between an open state and a closed state. The operation of open/close control 838 will be described in greater detail below.

Open/Closed Subroutine Indicators States

The open/close state of a visual subroutine indicator determines whether the rule indicators of the rules that belong to the corresponding subroutine are displayed. When the visual subroutine indicator is in an open state, the corresponding rule indicators are displayed. When the visual subroutine indicator of the subroutine is in a closed state, the corresponding role indicators are not displayed.

In FIG. 13, visual subroutine indicator 828 is illustrated in a closed state. In the illustrated example, a closed state is represented by a triangle pointing to the right. Therefore, GRR set region 818 does not include a display of the visual rule indicators of the rules that belong to the "swimming rules" subroutine. By operating open/close control 838, a user may cause visual subroutine indicator 828 to switch to an open state. In the preferred embodiment, a user operates open/close control 838 by clicking on the open/close control 838. In response to a click on the open/close control 838, the orientation of open/close control 838 is altered, and the corresponding rule indicators are displayed.

Figure 14:
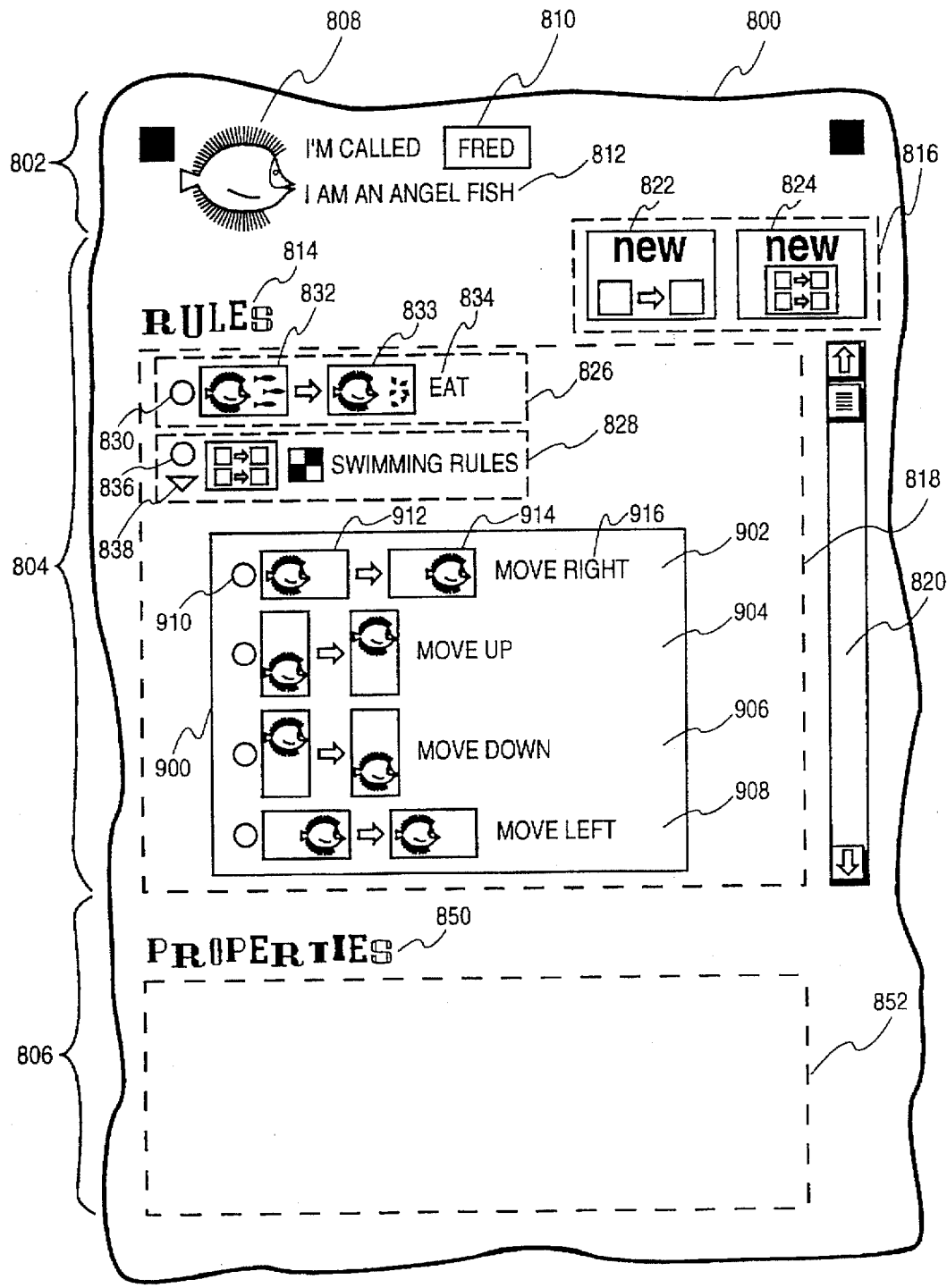
FIG. 14 illustrates the object viewer window of FIG. 13 with a subroutine in an open state.

Referring to FIG. 14, it illustrates open/close control 838 in an open state. In the illustrated example, the open state is indicated by a downward pointing triangle. In response to user input that places open/close control 838 in the open state, a subroutine display region 900 is displayed within GRR set region 818. Subroutine display region 900 is similar to GRR set region 818 in that it contains an ordered list of visual rule indicators. The visual rule indicators displayed within subroutine display region 900 correspond to the rules in the "swimming rules" subroutine represented by visual subroutine indicator 828.

In the illustrated example, the "swimming rules" subroutine includes four rules. The four rules are visually represented within subroutine display region 900 by visual rule indicators 902, 904, 906 and 908. In the preferred embodiment, visual rule indicators that are displayed within a subroutine display region have the same visual components as visual rule indicators that are not displayed in subroutine display regions. For example, visual rule indicator 902 has a tracing light 910, a precondition image 912, a postcondition image 914 and a rule name indicator 916, just as does visual rule indicator 826.

If visual subroutine indicator 828 is open during the performance of a simulation, the tracing lights of the visual rule indicators within subroutine display region 900 function in the same manner as described above. That is, if the generalized computer instructions of the rule corresponding to the visual rule indicator are executed, the visual rule indicator turns green. If the rule corresponding to the visual rule indicator is tested but the preconditions of the rule are not satisfied, then the visual rule indicator turns red.

As is illustrated in FIG. 14, the visual rule indicators within a subroutine display region are separated from rules outside the display region in a visually distinct manner. In the illustrated example, a visible border surrounds subroutine display region 900. In addition, subroutine display region 900 (and the visual rule indicators contained therein) are indented relative to other visual rule indicators within GRR set region 818 (e.g. visual rule indicator 826). This visual separation allows a user to easily distinguish between indicators for rules that belong to a subroutine and indicators for rules that do not.

Subroutine Types

Figure 15:
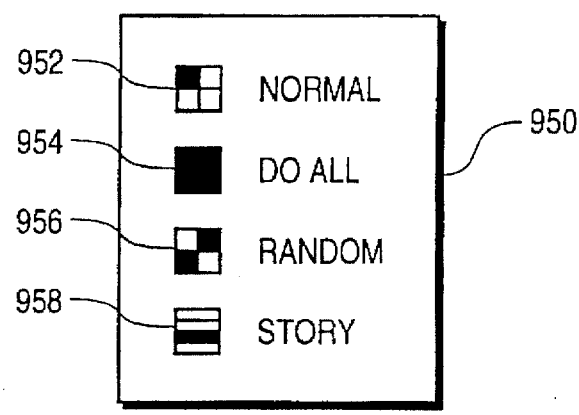
FIG. 15 illustrates a pop-up menu for selecting a "subroutine type" for a subroutine.

Subroutine type indicator 842 identifies the type of subroutine that corresponds to the subroutine rule indicator 828. The type of a subroutine determines how the rules in the subroutine are processed during the performance of a simulation. In the preferred embodiment, four types of subroutines are supported normal, do-all, random, and story. FIG. 15 illustrates the four subroutine rule indicators associated with these four types of subroutines according to one embodiment of the invention.

Referring to FIG. 15, it illustrates a subroutine type select menu 950. In the preferred embodiment, subroutine type select menu 950 is displayed when a user selects (e.g. by a mouse click) the subroutine type indicator 842 of a subroutine. Subroutine type select menu 905 includes a normal subroutine indicator 952, a do-all subroutine indicator 954, a random subroutine indicator 956 and a story subroutine indicator 958. When a user selects one of the subroutine type indicators from subroutine type select menu 950 for a subroutine, the selected subroutine type is established for the subroutine. More specifically, (1) the subroutine type select menu 950 disappears (2) the subroutine type indicator within the visual subroutine display is changed to reflect the symbol associated with the selected type of subroutine, and (3) the generalized computer program instructions for the subroutine are updated to reflect the execution rules associated with the selected type of subroutine. The various types of subroutines, and their associated execution rules, shall now be described in greater detail.

Normal Subroutine

Normal subroutines are subroutines that execute based on the same principles that apply to GRR sets in general. As explained above, the general execution rule is that rules in a GRR set are tested one-by-one in sequential order from the top to the bottom until a rule "matches". A rule matches when the current conditions of the simulation satisfy all of the preconditions for the rule. Once a matching rule is encountered, the generalized computer instructions associated with the rule are executed. The execution of any rule in a GRR set terminates the current round of processing of the GRR set. The next time the GRR set is processed, the rule matching process will begin again with the first rule in the GRR set.

Applying this general execution rule to a subroutine, a "normal" subroutine is processed by testing the rules within the normal subroutine one-by-one in order from the top to the bottom. If a matching rule is encountered within the subroutine, then the generalized program instructions corresponding to the rule are executed and the processing of the subroutine stops. The next time the subroutine is tested, the rule matching process begins again with the first rule in the subroutine.

The execution of any rule within a subroutine constitutes an execution of the subroutine. Within a GRR set, normal subroutines are treated as if they were rules. That is, the execution of a normal subroutine ends the processing of a GRR set just as the execution of any single rule within the GRR set would end the processing of the GRR set.

Returning to the example illustrated in FIG. 14, for the purposes of explanation it shall be assumed that the "swimming rules" subroutine represented by visual subroutine indicator 828 is a normal subroutine. During the performance of a simulation, simulation execution controller 50 determines what to do with the visual object associated with "Fred the Angelfish" by processing the rules represented in GRR set region 818. First, the rule corresponding to visual rule indicator 826 will be processed. If the preconditions associated with the rule are satisfied, then simulation execution controller 50 will cause the visual "Fred" object to behave according to the rule. The execution of the rule associated with visual rule indicator 826 would terminate all processing for "Fred" for the current simulation timer increment. During the next simulation timer increment, processing for "Fred" will begin again with the rule associated with visual rule indicator 826.

If the preconditions for the rule associated with visual rule indicator 826 are not satisfied, then execution control passes to the subroutine associated with visual subroutine indicator 828. The rules associated with visual rule indicators 902, 904, 906 and 908 are processed one-by-one in sequence. If the preconditions for any one of the rules is satisfied, then the generalized computer instructions associated with the rule are executed. The execution of any one of rules within the "swimming rules" subroutine terminates all processing for "Fred" for the current simulation timer increment. During the next simulation timer increment, processing for "Fred" will begin again with the rule associated with visual rule indicator 826.

Random Subroutine

All subroutine types aside from "normal" subroutines deviate from the general execution process described above. Random subroutines deviate from the general rule in that after the execution of one of the rules within a subroutine, the order of the rules within the subroutine is randomly scrambled. This scrambling of the rules within a subroutine has no effect on the sequence in which rules are tested within a simulation timer increment, but will alter the order in which the rules are tested from one simulation timer increment to the next.

For example, assume that the "swimming rules" subroutine shown in FIG. 14 is a random subroutine. During a first simulation timer increment, the rules of the "swimming rules" subroutine may be ordered according to the order of their respective visual rule indicators 902, 904, 906 and 908. That is, the rule corresponding to visual rule indicator 902 will be tested first. If it does not match, then the rule corresponding to visual rule indicator 904 will be tested, etc.

As with normal subroutines, the processing of the "swimming rule" subroutine will cease upon the execution of any of the rules within the "swimming rule" subroutine. Upon the completion of the execution of the "swimming rule" subroutine, the order of the rules within the "swimming rule" subroutine is scrambled. Assume, for example, that during this scrambling, the rule associated with visual rule indicator 906 is assigned the first position, the rule associated with visual rule indicator 904 is assigned the second position, the rule associated with visual rule indicator 908 is assigned the third position, and the rule associated with visual rule indicator 902 is assigned the forth position.

In the preferred embodiment, the visual rule indicators are rearranged within the subroutine display region 900 to reflect the new order of the corresponding rules. Therefore, based on the new rule sequence described above, visual rule indicators 906, 904, 908 and 902 will be respectively displayed at the first, second, third and fourth positions within subroutine display region 900. Consequently, during the subsequent simulation timer increment, the rule associated with visual rule indicator 906 would be tested first. If it did not match, then the rule associated with visual rule indicator 904 would be tested, etc.

By scrambling the order of the rules contained within random subroutines, a random quality is added to the behavior of the target object For example, if during a simulation, the visual object associated with "Fred" is in open water, then the preconditions for all of the swimming rules may be satisfied. Therefore, based on the general execution process, the first rule within the subroutine will always be executed. Under those "open water" conditions, if "swimming rules" is a normal subroutine, "Fred" would 902 during every simulation timer increment. However, if the "swimming rules" subroutine is a random subroutine, then the behavior of "Fred" will vary from simulation timer increment to simulation timer increment based on which of the rules in the "swimming rules" subroutine was assigned to the first position within the subroutine during the most recent scrambling operation.

Do-All Subroutine

Do-all subroutines differ from normal subroutines in that (1) execution of the do-all subroutine does not stop with the first rule that matches, and (2) execution of the GRR set for a particular object does not stop with the execution of a do-all subroutine. Rather, execution of a do-all subroutine continues until every rule within the subroutine that matches has been executed, then testing proceeds to the rule or subroutine that follows the do-all subroutine in the object's GRR set.

For example, assume that the "swimming rules" subroutine shown in FIG. 14 is a do-all subroutine. During simulation timer increments in which the rule associated with visual rule indicator 826 does not match, the rules associated with visual rule indicators 902, 904, 906 and 908 will all be tested. Further, each rule will be tested regardless of the outcome of the other tests. Thus, If the rule corresponding to visual indicator 902 matches and is executed, the rule corresponding to visual rule indicator 904 will still be tested.

Do-all subroutines are particularly useful for rules that a user wants to execute every simulation timer increment ("bookkeeping rules"), but which should not preempt the normal behavior of a simulation object. For example, it may be desirable to have a rule that increases an "age" property of a simulation object. To simulate a uniform aging process, the aging role should be executed at a uniform rate (e.g. once every simulation timer increment. However, under the general execution process, it is not possible to both ensure a constant aging rate and maintain normal object behavior. For example, if the aging role is placed first in an object's GRR set, the general execution process prevents any other rule from executing. Therefore, the simulation object would not be able to do anything but age. On the other hand, if any rules are placed before the aging rule in the GRR set, then the aging rule will not be executed during those intervals in which any one of the rules above the aging rule is performed.

By placing bookkeeping rules in a do-all subroutine, bookkeeping rules may be implemented without otherwise affecting the behavior of a simulation object. Specifically, during each simulation timer increment, zero, some, or all of the bookkeeping rules within the do-all subroutine may execute. Regardless of whether any such bookkeeping rules were executed, execution control will continue to test any other rules within the do-all subroutine, and proceed to test any rules or subroutines that follow the do-all subroutine.

Certain functions may be performed by do-all subroutines that would be difficult or impossible to perform in single rule operations. For example, consider the function of counting the number of objects that are adjacent to a simulation object in the simulation viewer window 54. In the preferred embodiment, there are eight grid locations adjacent to any given object. Each of the grid locations has two possible states: occupied or empty. Therefore, the number of possible object-to-adjacent square combinations is 256. It would be extremely tedious to implement 256 individual rules to determine the number of objects in adjacent squares. However, this same task may be performed by a single do-all subroutine that contains eight rules, each of which tests one of the adjacent squares to determine the presence of an object.

Story Subroutines

Unlike normal subroutines, story subroutines do not always begin testing at the top of the subroutine's list of rules. Rather, a story subroutine starts testing at the rule indicated by a pointer, which is referred to herein as the "current rule". Initially, the pointer points to the first rule within the story subroutine. Thus, the first rule is initially the "current rule". During a simulation timer increment, the only rule in the subroutine that is tested is the current rule. The other rules within the subroutine are ignored, regardless of the outcome of the test. If the preconditions associated with the current rule are satisfied, then the generalized computer instructions associated with the rule are executed and the pointer moves to the next rule within the story subroutine. If the current rule does not match, then the pointer does not move. After the last rule in the story subroutine executes, the pointer wraps around to point again at the first rule in the subroutine.

In the preferred embodiment, a current rule indicator is displayed to identify the visual rule indicator of the current rule. The current rule indicator may be, for example, an arrow or finger. The current rule indicator serves as a bookmark to the user. That is, the current rule indicator indicates the current location in the "story" defined by the behavior rules in the story subroutine.

Story subroutines allow users to set up scenarios to be executed in a simulation. For example, a fish might leave its home, go looking for food, eat food, and then return home. The outcomes of such scenarios may vary significantly based on the behavior of other simulation objects in the simulation.

Subroutine Pretests

As explained above, each graphical rewrite rule may have a number of preconditions. During a simulation, these preconditions are tested to determine whether the behavior defined by the rule should be executed. Within any given list of rules, there may be a number of rules that share the same precondition. For example, a fish may have ten rules about how to behave when a shark is located at the grid position to the right of the fish. Thus, all ten of the rules would include the precondition specifying "GridRight=Shark". Typically, each of the ten rules will include some other precondition as well. For example, one rule may apply if the fish is in open water when the shark approaches and another rule may apply if the fish is surrounded by other sharks when the shark appears.

Normally, a user would have to go through the steps for establishing the "GridRight=Shark" precondition for each of the ten rules. This process may become tedious. To avoid the need to repeatedly specify common preconditions, the presently preferred embodiment of the invention allows users to specify preconditions for subroutines. Once a precondition has been established for a subroutine, then the rules contained in the subroutine need not have the precondition.

During the performance of a simulation, the preconditions that have been established for a subroutine are tested before any of the rules within the subroutine are tested. If the preconditions for the subroutine are satisfied, then the rules within the subroutine are tested according to the rules that apply to that particular type of subroutine. If the preconditions for the subroutine are not satisfied, then the "pretest" of the subroutine fails and none of the rules within the subroutine are tested.

Figure 16:
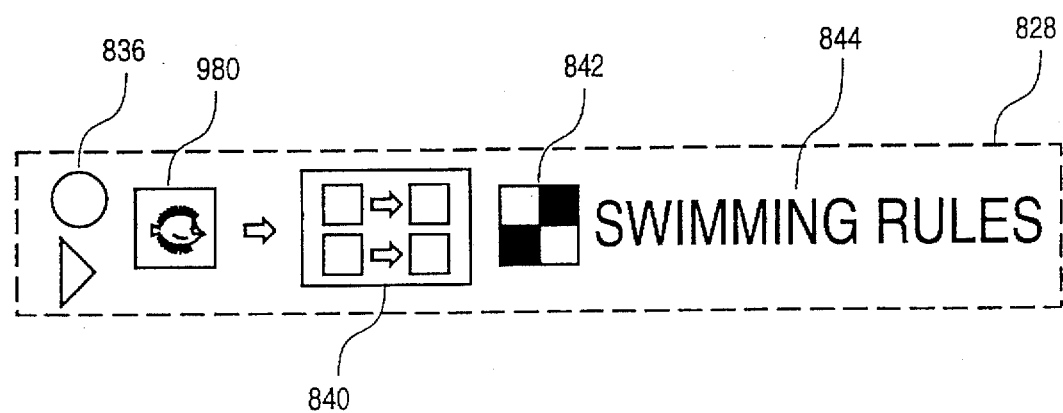
FIG. 16 illustrates a visual subroutine indicator of a subroutine that has a specified pretest.

In the preferred embodiment, visual subroutine indicators visually reflect whether preconditions have been established for their corresponding subroutine. For example, in FIG. 16a, visual subroutine indicator 828 is illustrated with a subroutine precondition indicator 980. In the illustrated example, precondition indicator 980 displays a pretest pattern followed by an arrow, and is located between the tracking light 836 and the subroutine symbol 840.

Subroutine Creations And Manipulation

Using visual object manipulation techniques, users can easily create, modify, copy, move and delete subroutines. In the preferred embodiment, subroutines are created by selecting the subroutine creation icon 824 in rule creation control region 816 of the object viewer window 800.

Figure 17:
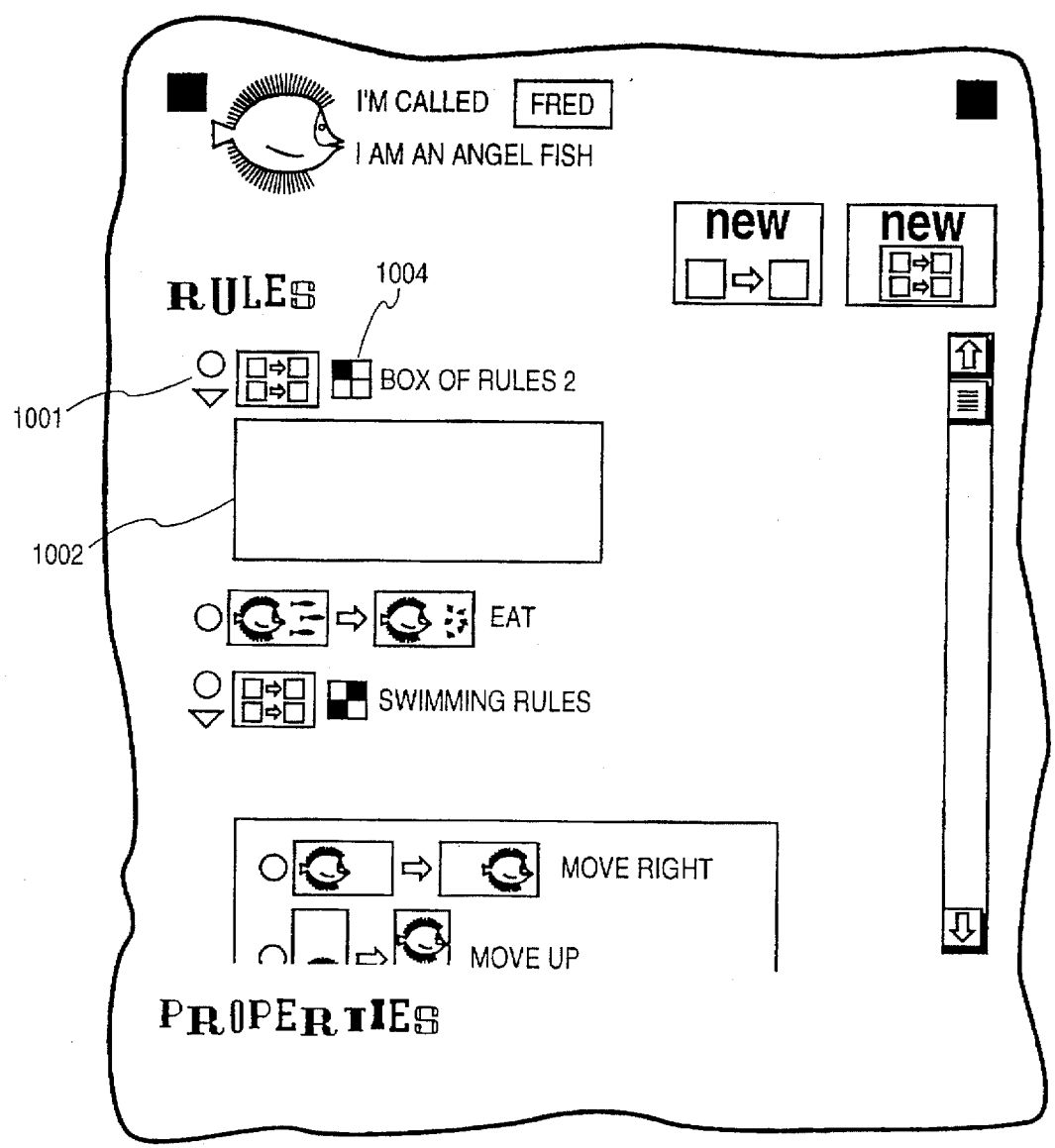
FIG. 17 illustrates an object rule viewer window with a new subroutine.

FIG. 17 illustrates a new visual subroutine indicator 1000 that is displayed in the GRR set region 818 in response to selection of the subroutine creation icon 824. The new visual subroutine indicator 1000 is displayed in the open state, causing an empty subroutine display region to be displayed below the visual subroutine indicator 1000. When the new visual subroutine indicator 1000 and its associated subroutine display region 1002 are displayed, anything already listed in the GRR set region 818 is pushed down to provide the necessary room. By default, the new subroutine is assumed to be a normal subroutine. Consequently, the visual subroutine indicator 1000 includes a subroutine type indicator 1004 that indicates a normal subroutine.

Subroutines may be deleted by dragging the visual representation of the subroutine to the remove icon 97, or into a window associated with the remove icon 97, or by dragging the remove icon 97 to the visual representation of the subroutine. In the preferred embodiment, subroutine representations may be dragged by performing two steps. In the first step, a user presses a mouse button while the cursor is over any portion of the subroutine's visual subroutine indicator other than the subroutine type indicator. Alternatively, if the subroutine is in an open state, the user may press the mouse button when the cursor is over an empty pan of the subroutine's associated subroutine display region. In the second step, the user holds down the mouse button while moving the cursor. The entire subroutine representation follows the mouse motion. These subroutine creation, dragging and deletion processes are analogous to those described above with reference to GRRs.

Subroutines may be moved and copied between GRR sets by the dragging procedure described above. Subroutines may be placed anywhere that rules are placed. For example, subroutines may be moved from one location in the GRR set of one creature to a different location in the same GRR set, to a different creature's GRR set, into another subroutine, and into the GRR set of a creature in a different class.

Figure 18:
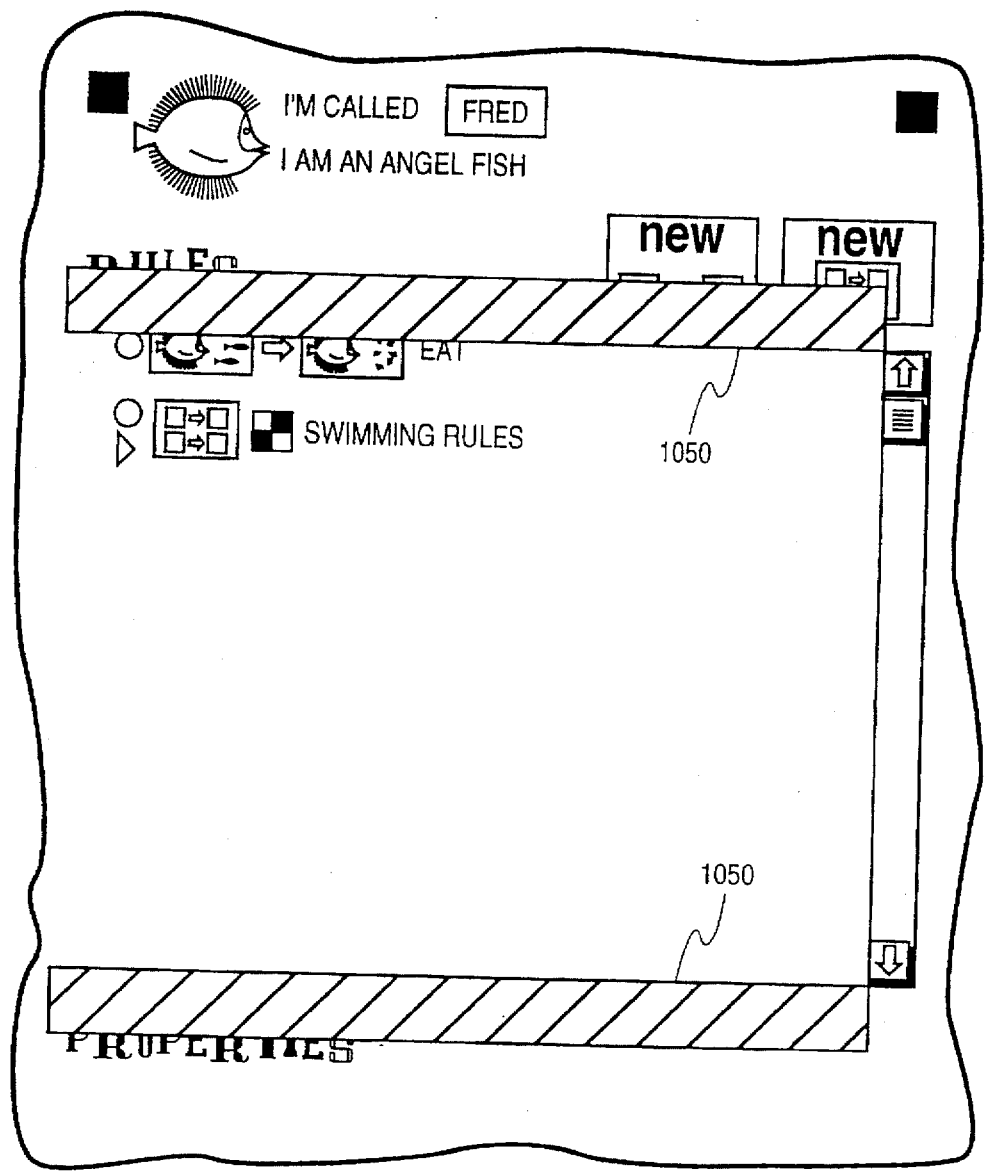
FIG. 18 illustrates auto-scroll regions that border a GRR set region of an object rule viewer window.

Referring to FIG. 18, GRR set regions preferably include relatively small invisible auto-scroll areas 1050 that control automatic scrolling. These auto-scroll areas 1050 facilitate moving rules and subroutines within a GRR set. Specifically, when a rule or subroutine is dragged out of its containing GRR set into an auto scroll area, the GRR set begins scrolling away from the visual indicator that is being dragged. That is, if a subroutine representation is dragged into the lower auto-scroll area, then the GRR set scrolls upward. If the subroutine representation is dragged into the upper auto-scroll area, the GRR set scrolls downward. When the dragged subroutine passes out of the auto-scroll areas, the GRR set region ceases to scroll.

The same drag and drop procedure is used for both moving and copying a subroutine. In the preferred embodiment, whether a subroutine is moved or copied is determined by the destination to which it is dragged. In the preferred embodiment, a rule is moved If it is dragged within the class that owns it, and is copied If it is dragged to a different class.

Figure 19:
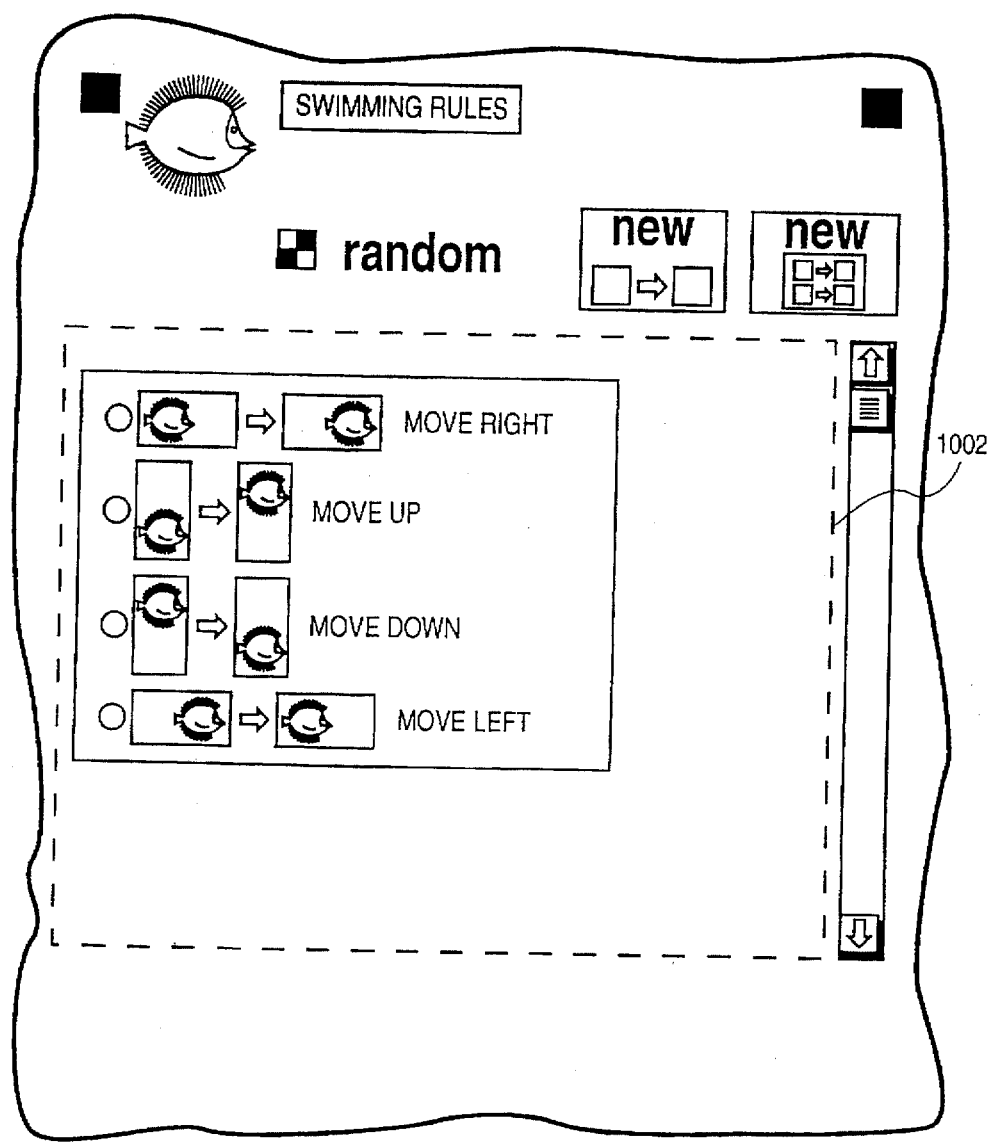
FIG. 19 illustrates a pop-up subroutine display window.

As has already been described above, a subroutine may be opened by selecting the open/close control in the subroutine's visual subroutine indicator. Alternatively, a subroutine may be opened by double-clicking on the subroutine's visual subroutine indicator. However, rather than opening a subroutine display region within a simulation object's GRR set region, double-clicking a subroutine's visual subroutine indicator causes a separate subroutine window to appear. A subroutine window for the "swimming rules" subroutine is illustrated in FIG. 19.

Once a subroutine has been created, the user may establish rules for the subroutine by (1) creating new visual rule indicators within subroutine display region 1002, (2) copying visual rule indicators into subroutine display region 1002, and/or (3) moving visual rule indicators into subroutine display region 1002. The rules that correspond to the visual rule indicators that are created or placed within subroutine display region 1002 are automatically associated with the newly created subroutine.

Figure 20:
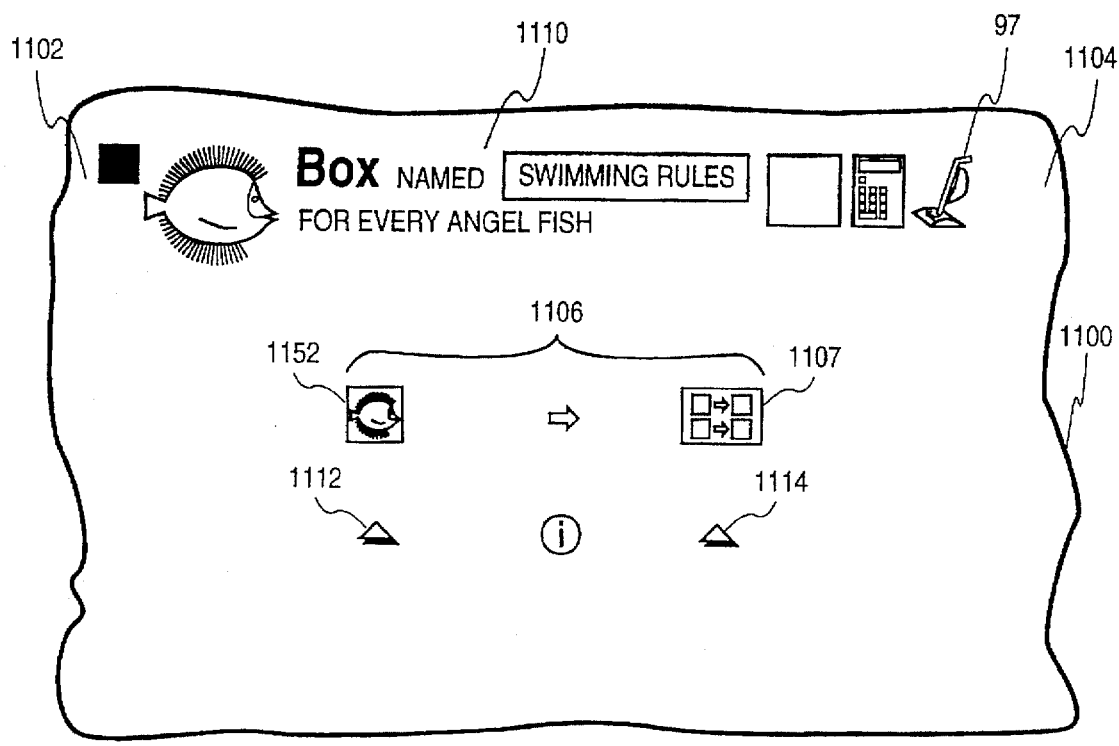
FIG. 20 illustrates a rule editor window for a subroutine.

As mentioned above, users may establish preconditions for subroutines. Preconditions may be established for a subroutine using a GRR editor window 1100 (FIG. 20) that functions similar to GRR editor window 70 described above. A GRR editor window that is editing a subroutine differs from a GRR editor window that is editing a rule in that the rule's "after" image is replaced by a subroutine symbol, and the rule's list of actions is replaced by the subroutine's list of GRRs, as shall be explained below.

The GRR editor window 1100 is displayed when a user clicks once on the visual indicator of the subroutine. GRR editor window 11130 includes simulation object identification indicators 1102, editing tool icons 1104, a subroutine pretest indicator 1106, a pretest open/close control 1112 and a GRR set open/close control 1114. Simulation object identification indicators 1102 identify the object associated with the subroutine. Editing tool icons 1104 represent tools that may be invoked by the user to perform specific functions. Editing tool icons 1104 include, for example, the remove icon 97 used for deleting rules and subroutines. Subroutine pretest indicator 1106 includes an arrow that points from a pretest image 1152 to a subroutine symbol 1107. The subroutine symbol 1107 is used to indicate that the current contents in the GRR editor window 1100 correspond to a subroutine.

Figure 21:
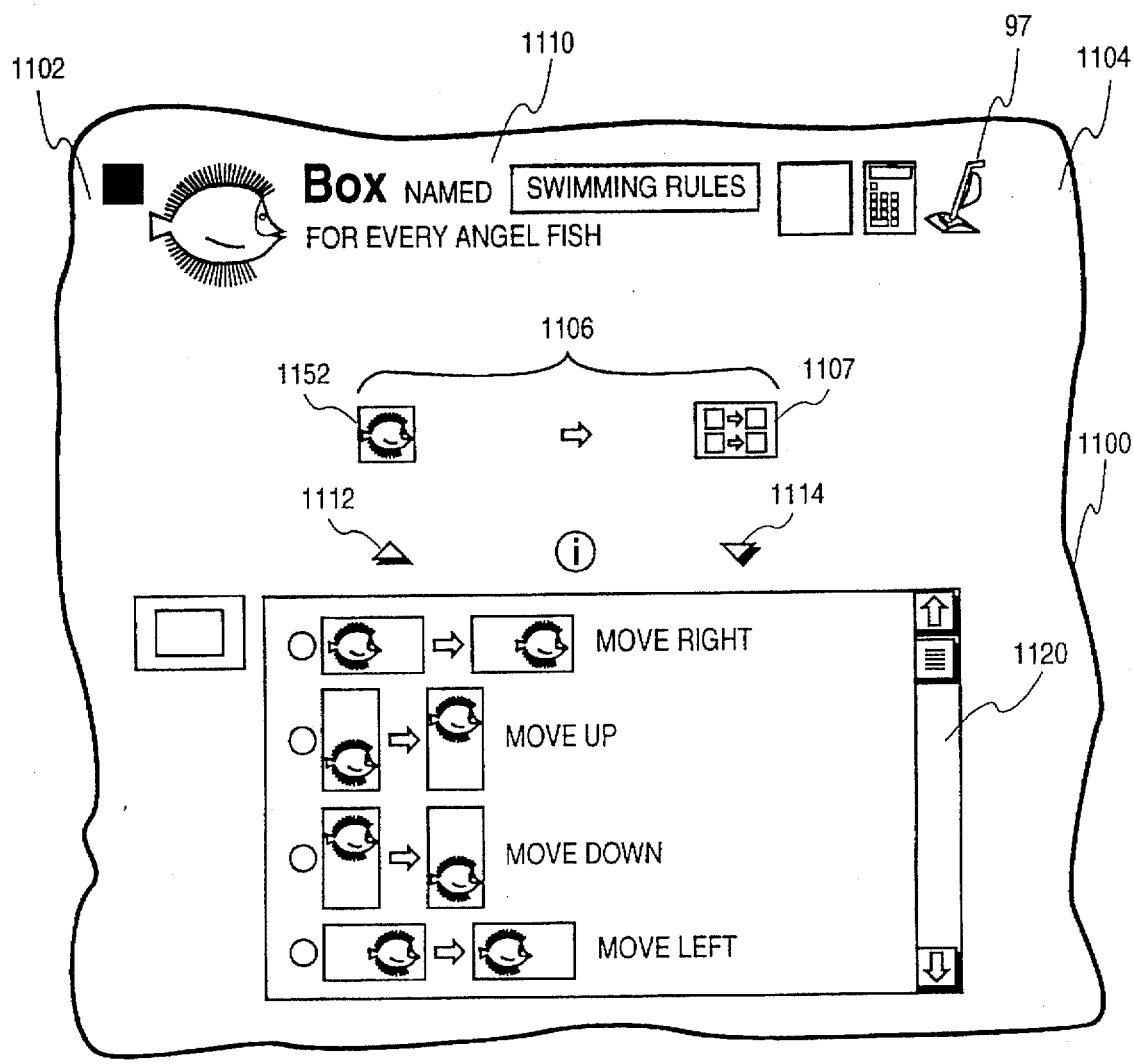
FIG. 21 illustrates the rule editor window of FIG. 20 with an open subroutine GRR set region.

The pretest open/close control 1112 and the GRR set open/close control 1114 may be operated by the user to display additional information about the subroutine. Specifically, by clicking on GRR set open/close control 1114, a user may display a list of the rules associated with the subroutine. FIG. 21 illustrates rule edit window 1100 after a user has operated GRR set open/close control 1114. In response to the operation of GRR set open/close control 1114, a GRR set region 1120 is displayed. A user may edit the rules and the rule sequence by manipulating the rule representations displayed in GRR set region 1120.

Figure 22:
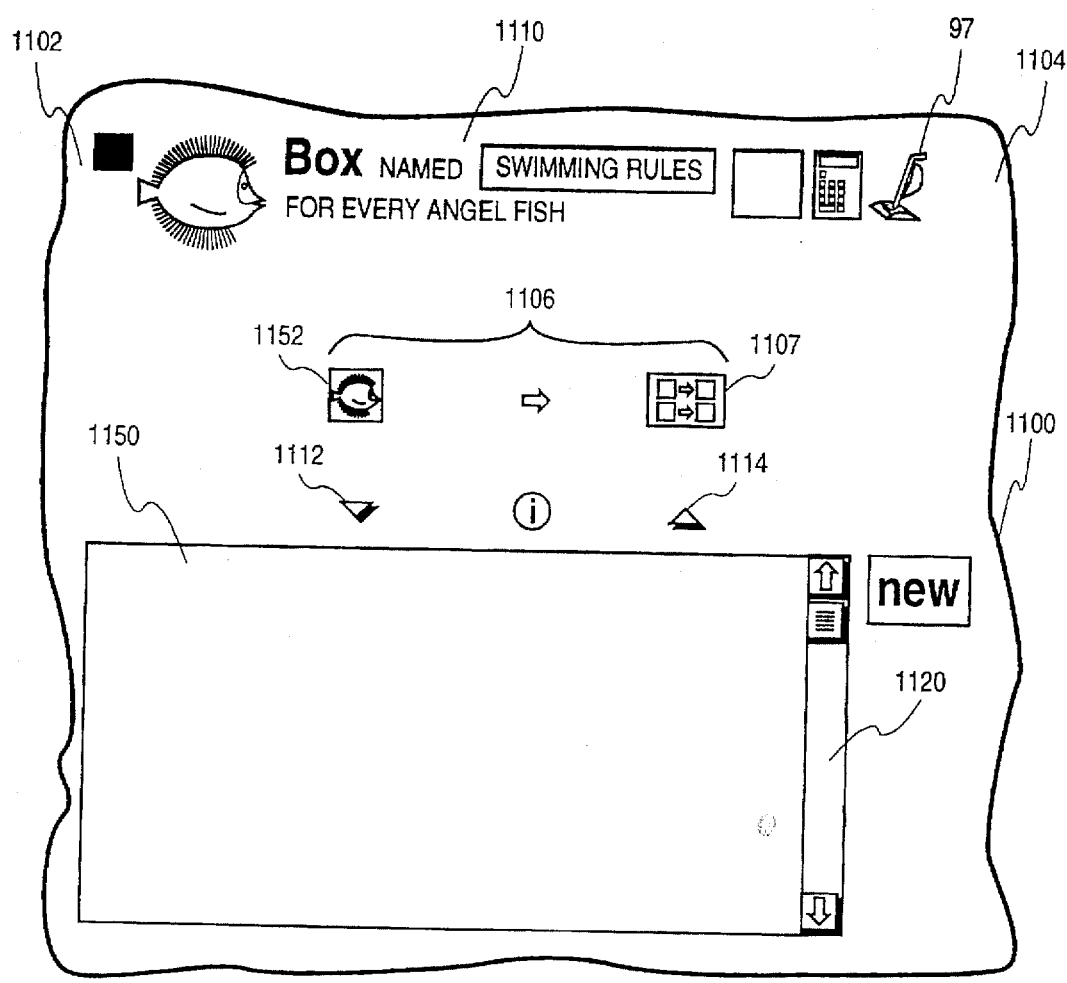
FIG. 22 illustrates the rule editor window of FIG. 20 with an open pretest specification region.

By clicking on the pretest open/close control 1112, a user may display a pretest specification region 1150 (FIG. 22). Initially the pretest specification region 1150 is empty. An empty pretest specification region signifies a "don't care" state, meaning that no preconditions must be met before testing the rules within the subroutine. Preferably, a pretest icon 1152 of subroutine pretest indicator 1106 is shadowed to indicate the "don't care" state. Pretests or preconditions for subroutines are specified in the same manner as they are for rules, as described above.

III. DYNAMIC CLASSES ("JARS")

The present invention provides an information classification mechanism that is referred to as "jars." A jar of the present invention is a graphical representation of a dynamic class or classification for objects. Within this mechanism, any group of objects within different classes can be related within a similar dynamic class. Properties and rules can then be developed by referring to a dynamic class of objects. Unlike a hierarchical structure or classification, the objects of a dynamic class do not necessarily need to have any characteristics or attributes or traits in common in the sense that they are related via some hierarchical leg or branch. That is, a jar within the present invention does not necessarily define the characteristics of its members. A particular dynamic class, within the present invention, is therefore defined purely by its individual membership (e.g., dynamic classes are defined in an extensional rather than an intensional manner). This makes dynamic classification of the present invention very flexible.

The membership of a particular jar is dynamic in that a user can create new jars and modify the membership of existing jars at any time. Further, jars can be placed within other jars. Once a jar is defined by a user, dropping a particular rule or property (as discussed above) onto the graphical representation of the jar has the effect of copying the rule or property to each instance (e.g., member of the jar) of the jar individually (e.g., dropping it on each member of the jar individually. In picture abstraction, use of a jar as the other-than-self object of a rule has the effect of allowing that rule to act upon all of the members of the selected jar (e.g., selected from menu 80). Thus, jars can be used to define sets of objects on which particular actions can be performed.

Further, these sets of objects do not need to be related by any common trait or attribute. Although membership of a jar is dynamic in that members can be added or removed, the removal of a member from the jar will not automatically disassociate the rule or property (assigned to the jar) from the member. This would need to be done manually with respect to the removed member. Further, addition of a member to an existing jar (alone) will not automatically associate any rules or properties of the jar to the member. In such a way, the use of a jar does not become overly complex and confusing. Since the jar does not define the characteristics of its members, membership in a jar is very flexible and does not involve complex hierarchical structures.

Although a dynamic class is defined in an extensional manner, it can also include other classes and subclasses therein that are of a hierarchical structure. This is allowed due to the wide range of items that can be added within a jar. Therefore, it should be noted herein, that while a jar can contain items that have no attributes or characteristics in common, it can also contain a classes of items that are related by attributes and characteristics (e.g., in an intensional manner).

Jar Creation

Figure 23:
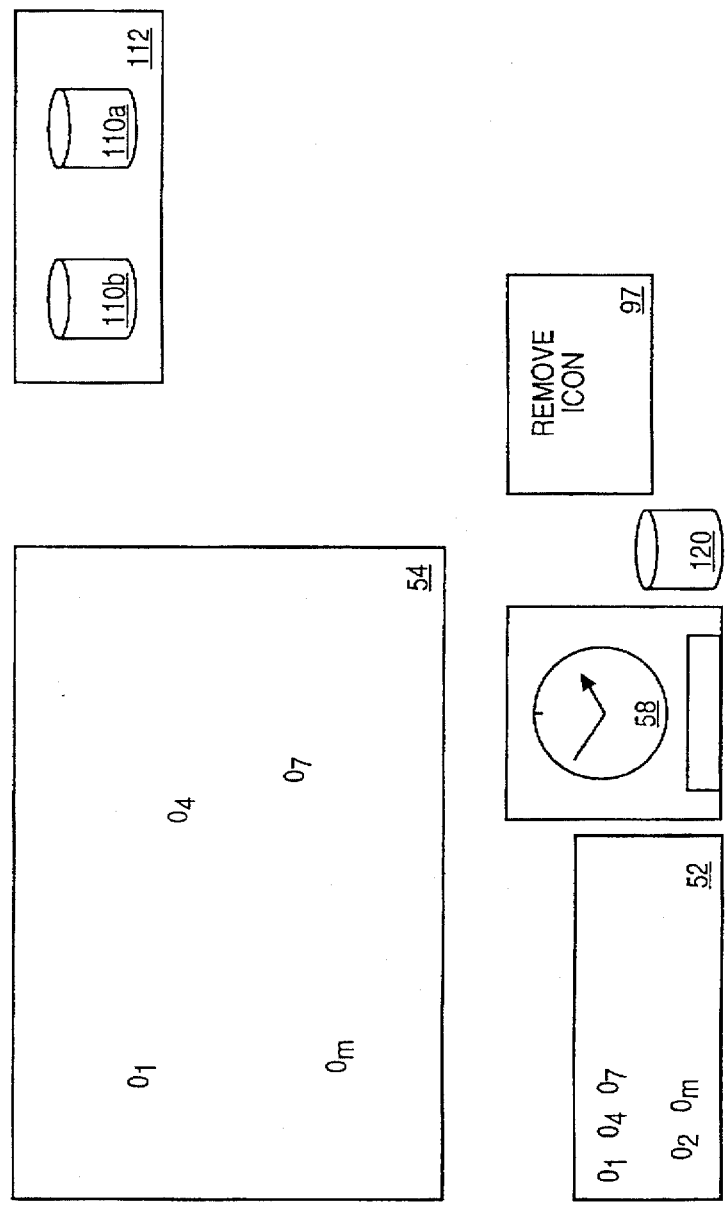
FIG. 23 illustrates the user interface of the present invention including a jar shelf window and a jar prototype selection.

FIG. 23 illustrates pertinent user interface windows used in the creation and modification of dynamic classes (e.g., jars) under the present invention. The simulation viewer window 54 ("game board") is shown along with the object source window 52 ("copy box"). Also shown is a jar shelf window 112. The jar shelf window 112 contains each jar that has been previously user defined in addition to an empty jar 110a. One previously defined jar 110b is illustrated in FIG. 23. A prototype jar icon 120 is also shown outside the copy box 52, however this image can be placed in any readily accessible location within the user interface 31 of the present invention including inside the copy box 52. The jar shelf window 112 does not necessarily need to be constantly displayed on the computer display and can be opened when needed. Specifically, the jar shelf window 112 becomes visible by user selection of the jar prototype image 120. To create a new jar, the user selects the prototype image 120 which displays the jar shelf window 112. Inside the jar shelf window 112, when opened, an empty jar 110a is always displayed. Instances and other items can be placed inside the empty jar 110a.

Figure 24:
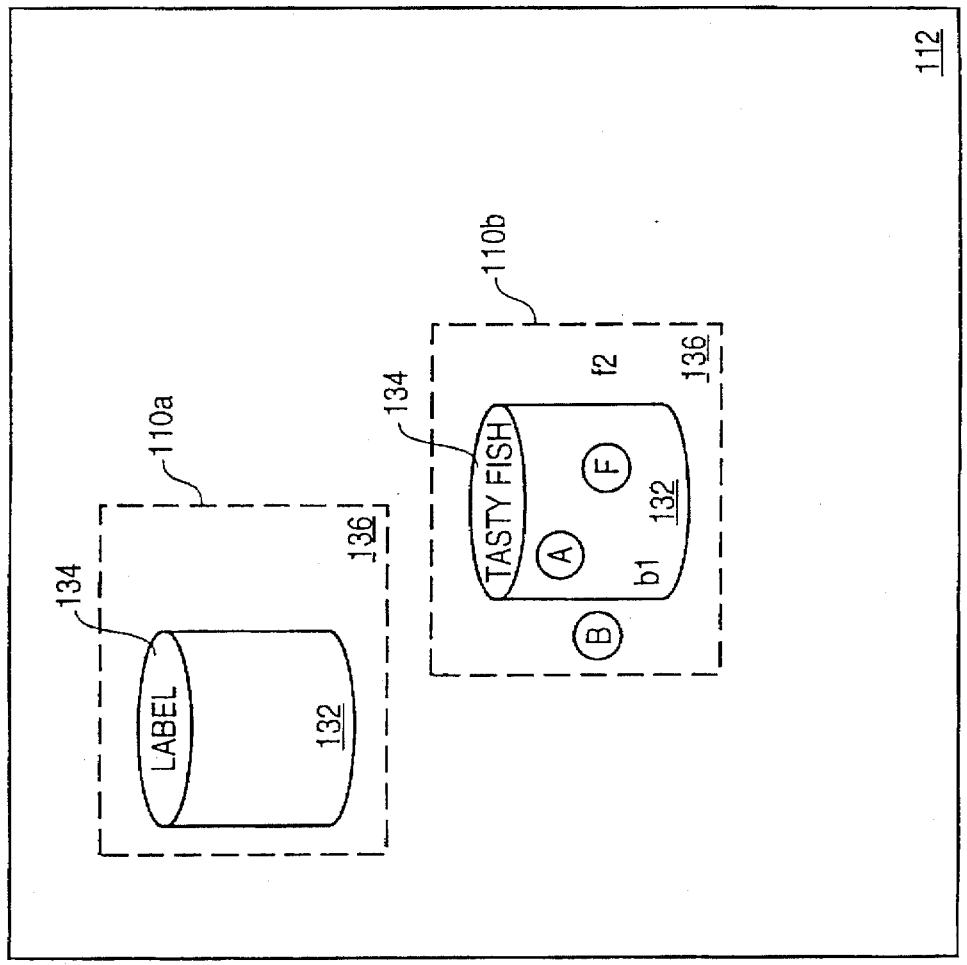
FIG. 24 is an illustration of a jar shelf window and two jars.

FIG. 24 illustrates a more detailed view of the jar shelf window 112 and its exemplary contents. A defined jar 110b labeled "tasty fish" exists and the empty jar 110a is also shown. The graphical representation of a jar is utilized to define a dynamic class of objects. Jar 110a consists of three different regions. A label region 134 contains a user selected jar name or identifier and can be edited in any number of well known fashions for text or label editing. Jar 110a also contains a first region 132 for containing contents. Jar 110a also contains a second region 136 for containing exclusions from the contents. With the present invention, membership of a particular jar 110a is defined by the items placed within the first region (e.g., the contents) 132 and excludes the items placed in the second region (e.g., the exclusions) 136. Items placed within the second region 136 should have a correspondence with an item placed in the contents region 132. In effect, the dynamic class or membership represented by a jar is defined as a union of classes and instances in the first region 132 minus classes and instances in the second region (exceptions) 136. In one embodiment, an instance, I, belongs to the membership J of a jar if two conditions apply: (1) region 132 contains some object, C, such that I equals C, or, I is an instance of C (being a class); and (2) region 136 contains no object, E, such that either E equals I, or, I is an instance of E and E is a subclass of C.

When an empty jar 110a becomes defined, a new empty jar is made available to the user within window 112. To facilitate the creation of a new dynamic class by dropping objects therein, a new empty jar is created automatically on the screen.

In order to add an item to the first region 132 or a second region 136, the user selects the item from the user interface 31 and drags the item to the appropriate region of the jar 110a and releases the item into the jar. For removal, an item in the first region 132 or second region 136 is selected and dragged out of the jar 110a. An item can be defined from a number of various classes. For example, an object instance (e.g., "Charlie the tuna") can be placed into a jar or an object class (e.g., "tuna") or another jar (e.g., "tasty fish"). To place a jar into a jar, an existing jar is selected within the jar shelf window 112 and placed into the appropriate region of another jar. The original jar placed inside will remain in its original position Note that "proxies" of objects are stored in the jar, but the originals remain in their prior location. Hence, an object can be placed into several jars, indicating that it belongs simultaneously to several dynamic classes (e.g., "tasty fish," "swift fish," and "schooling fish").

Figure 25:
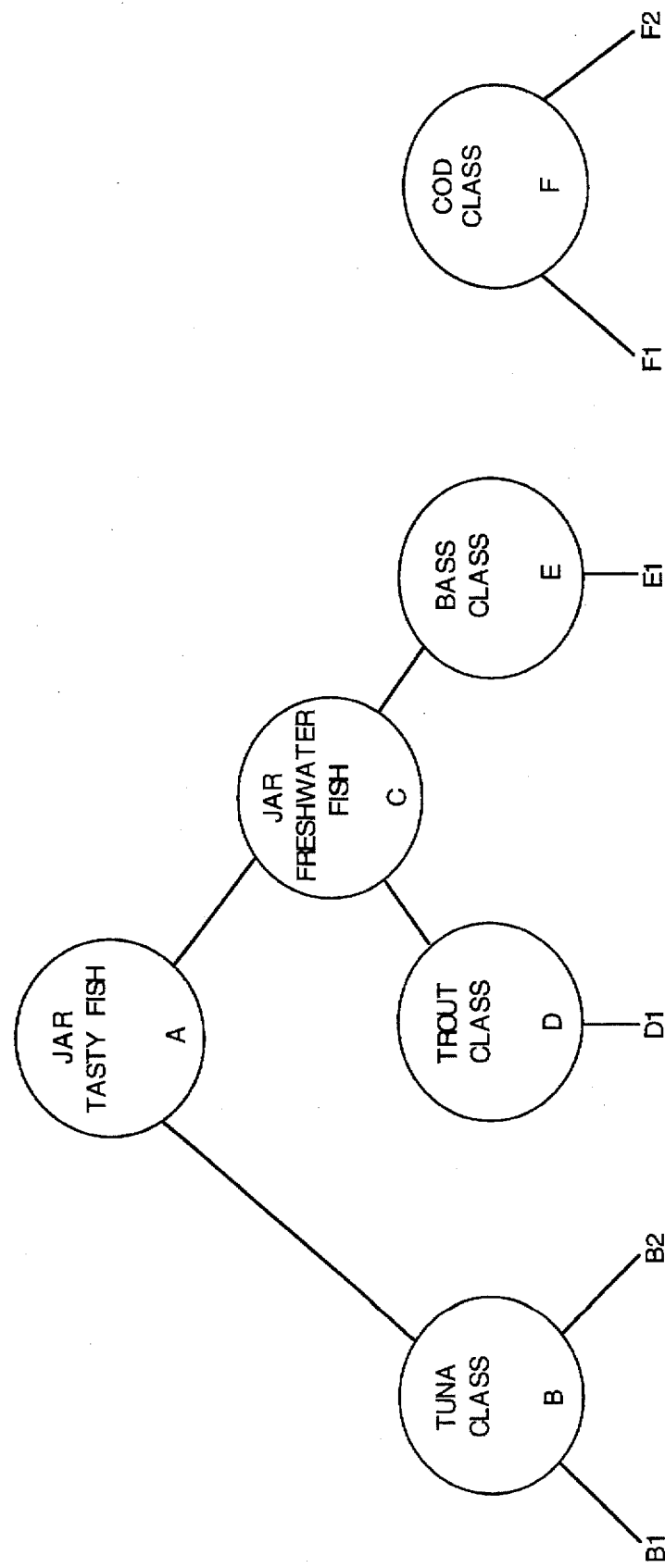
FIG. 25 is a logical diagram of elements covered in the first region of an exemplary jar.

Exemplary jar 110b is entitled "tasty fish" and the first region 132, as user defined, includes a jar "A" and a class "F" and an instance b1. The item b1 is an instance of the class "B." Excluded from the jar 110b within the second region 126, as user defined, is an instance f2 of the class "F" and the class "B." FIG. 25 illustrates the logical relationships between jars, classes and instances that are used by exemplary jar 110b. Jar "A" contains jar "C" and class "B." Class "B" contains instances b1 and b2. Jar "C" contains class "D" and class "E," each of which contain an instance, d1 and e1, respectively. Class "F" contains two instances, f1 and f2. An exemplary definition of these instances might be wherein class "B" refers to tuna and instance b2 is "Charlie the tuna," class "F" refers to cod and jar "C" is entitled "fresh water fish" and includes class "D" (trout) and class "E" (bass).

An instance object is a member of the exemplary jar 110b if it, or some ancestor class, is in the contents area (e.g., first region 132) and neither it nor some ancestor class (such that the ancestor class is subsumed by the first region), is in the exception area (e.g., second region 136). Using multiple parentage, the contents (first region 132) and exceptions (second region 136) can contradict one another. In this embodiment, the excluded item overrides the contents item. For example, if instance object i had parents H and J, where H was in the contents and J was among the exemptions, then i would not be a member of the exemplary jar (unless i was placed as an instance within the first region 132). It is appreciated that a number of various procedures can be utilized to generate a membership between the contents of the first region 132 and the contents of the second region 136.

As shown in FIG. 24, the first region 132 of exemplary jar 110b of FIG. 24 contains jar "A" (which includes instances b1, b2, d1 and e1), contains class F (includes instance f1 and f2), and specifically includes instance b1. The second region 136 of exemplary jar 110b contains class "B" (which includes instances b1 and b2) and also instance f2. The items of the second region 136 are excluded from the contents of the first region 132. In effect, b1 is an exception from the exclusion of Class "B." Therefore, the contents covered by exemplary jar 110b include the instances, b1, d1, e1, and f1. In other words, the user defined dynamic class entitled "tasty fish" includes the instances b1, d1, e1, and f1 and instances f2 and b2 are excluded. Using the above example, the jar "tasty fish" includes classes "tuna," "trout," "bass," and "cod," but excludes from this, "Charlie the tuna," and instance f2.

It is appreciated that many different graphical representations and metaphors can be utilized within the spirit and scope of the present invention to represent a first and second region for defining a dynamic class apart from a "jar". The present invention is therefore not limited to such exemplary representation. Further, many alternative interpretations of contradictory inclusion and exclusion conditions are possible.

Once a jar is created, it can be used a number of various ways within the simulation system as described above. A rule can be dragged and dropped on a jar and this has the effect of dragging and dropping the rule on each member of the jar. The same is true regarding a property. Also, while creating a rule, a jar can be used to perform a picture abstraction regarding an other-than-"self"0 object within the rule. These functions will be described in more detail to follow.

Jar Operation

The following flow diagrams illustrate logic blocks performed by a processor of a computer system 10 (FIG. 1) in response to commands from the present invention for implementing dynamic classes. It is appreciated that reference to the term "logic" and the like, refers to a processor executing or capable of executing instructions within the scope of a computer system for performing specific and recited functions.

Figure 26A:
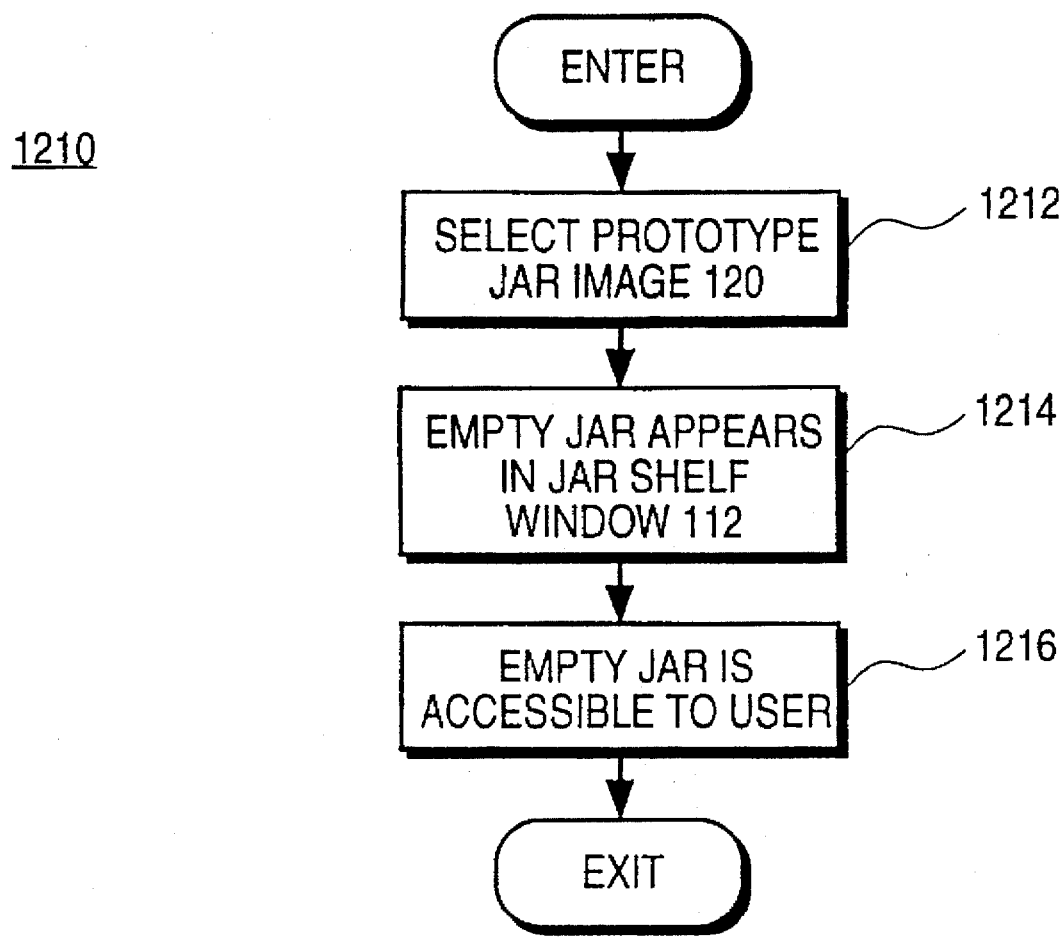
FIG. 26A is a flow diagram of the present invention illustrating jar creation.

FIG. 26A is a flow diagram illustrating logic 1210 for creating a new jar within the user interface 31. Starting at block 1212, the user is allowed to select (e.g., with a mouse or other cursor positioning device) the prototype jar image 120 that is generally always visible within the user interface 31. The prototype jar image 120 is an icon of a jar, but could be any image that visually represents a jar or a dynamic class to a user. At block 1212, if the jar shelf window 112 is not already displayed at the selection of the prototype jar image 120, it will be displayed on the user interface 31. At block 1214, upon the drawer shelf window 112 opening, an image of an empty jar (110a) is automatically displayed and accessible to the user. Block 1214 generates a blank (or otherwise predetermined or initialized) label region 134 for the new jar, a blank first region 132 and a blank second region 136. The new jar is displayed in addition to all other previously defined jars within the jar shelf window 112. At block 1216, once an empty jar is defined, the user is allowed to name the jar at region 134 using standard text editing procedures and the empty jar is otherwise accessible to the user.

Figure 26B:
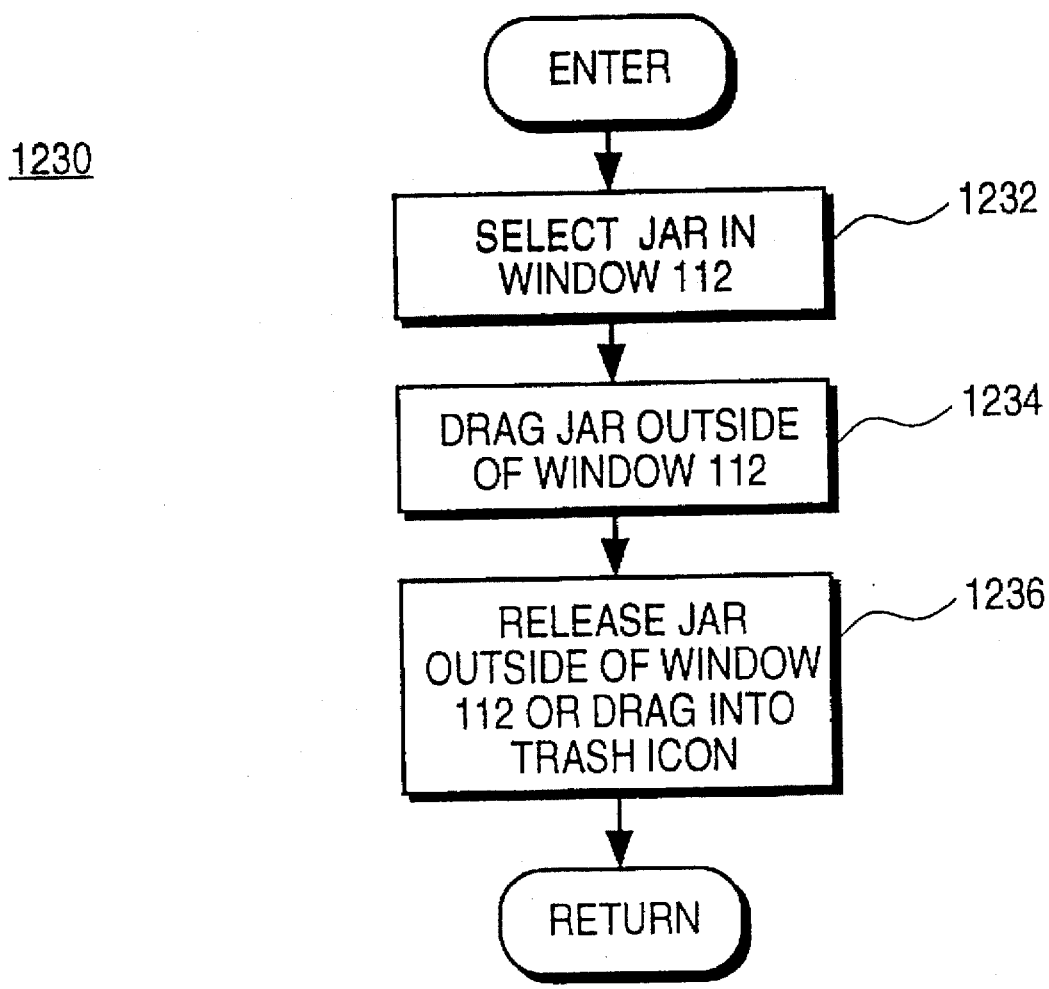
FIG. 26B is a flow diagram of the present invention illustrating jar removal.

FIG. 26B is a flow diagram illustrating logic 1230 for removing a previously created jar from the user interface 31. At block 1232, the user is allowed to select a jar from the jar shelf window 112 and at block 1234 the present invention allows the user to drag the jar outside of the jar shelf window 112 and at block 1236 the user is allowed to release the selected jar at any position outside the jar shelf window 112 to delete the jar. In one embodiment, the user is allowed to drag the selected jar to a remove icon box 97 (FIG. 23) to delete the selected jar. The remove icon box 97 can be implemented as a "trash" icon and therefore the jar to be deleted is essentially dragged to the trash. Once a jar is deleted its membership as associated with the jar is deleted, however, the items themselves remain in their prior locations. At block 1235, if a deleted jar happened to also be defined within a first region 132 or second region 136 of another existing jar, then the dynamic class that makes up the other existing jar is automatically updated to reflect the jar's deletion. This can increase or decrease the membership of the dynamic class of the existing jar, depending on the location (e.g., first or second region) of the deleted jar.

Figure 27A:
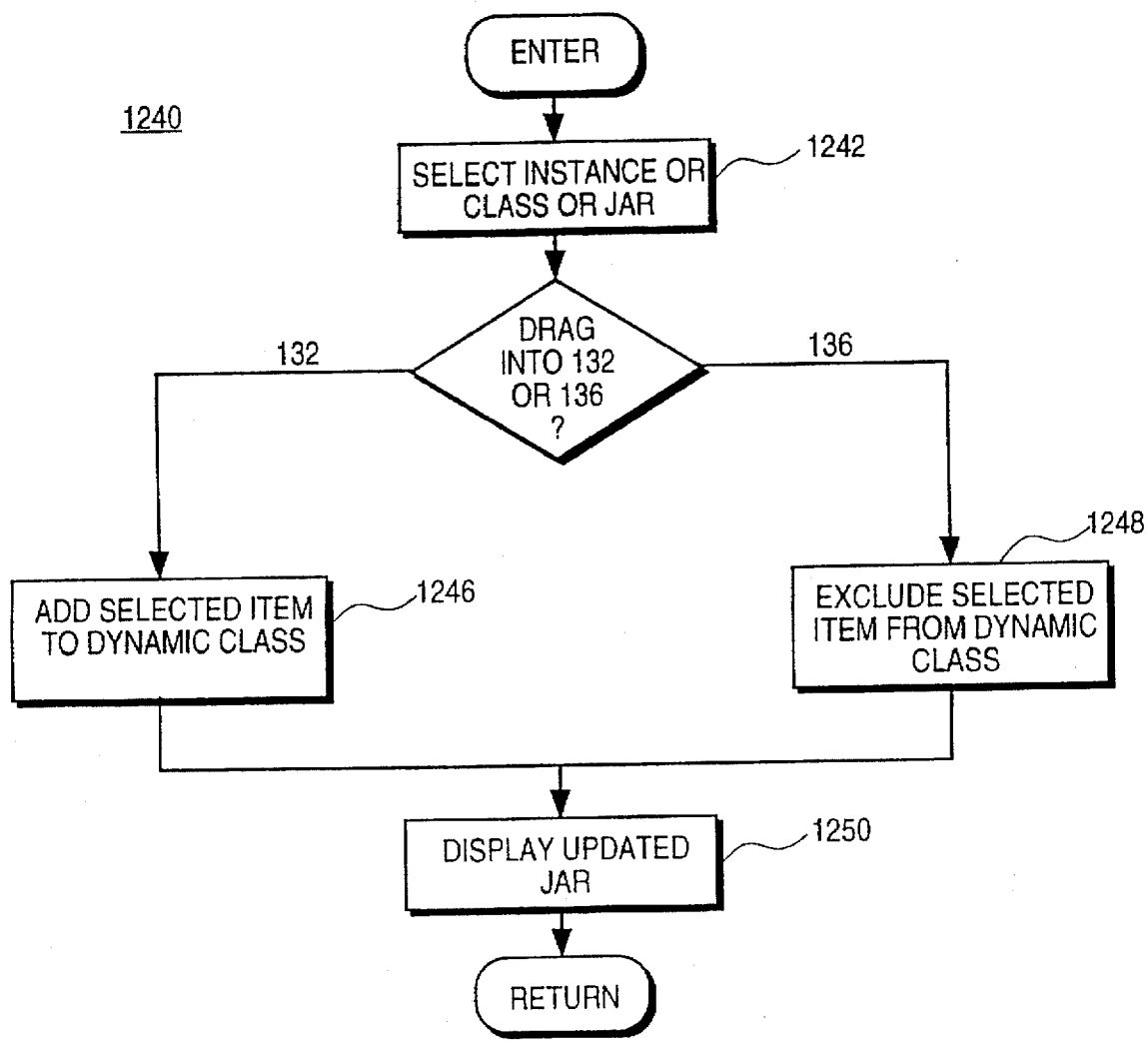
FIG. 27A is a flow diagram of the present invention illustrating the addition of an item into an existing jar.

FIG. 27A is a flow diagram illustrating logic 1240 for adding items to a previously defined jar (e.g., previously defined by logic 1210). At block 1242, the user is allowed to select an item from the user interface 31. This item can be an object instance (e.g., "Charlie the tuna") or an object class (e.g., tuna) or another jar. Instances can be selected by the user from the game board 54 (one area) while object classes can be selected from the copy box 52 (another area). These are exemplary selection techniques. Once selected, at block 1242, the user is allowed to drag the selected item to a particular existing jar of the jar shelf window 112. If the jar shelf window 112 is not already open, at block 1242, the user is allowed to generate the jar shelf window 112. At block 1244, a check is made to determine if the selected item was released into a first region 132 of a jar or into a second region 136 of a jar. If the selected item was dropped into a first region 132 of a jar, then at block 1246, the selected item is added to the contents area of the dynamic class. If the selected item was dropped into a second region 136 of a jar, then at block 1248 the selected item is added to the exclusions area of the dynamic class. From blocks 1246 and 1248, processing flows to block 1250 where the jar is displayed with its updated contents and exclusions, as appropriate. Also, as will be described to follow, the present invention performs processing to determine the membership of the new dynamic class defined by the new items of the jar. This processing can be performed on an "on demand" basis or at the completion of any modifications to the membership of a jar. If membership in the new dynamic class increases as a result of the addition (e.g., the addition was made to the first region 132), then the present invention does not attribute to each new member any rules and/or properties, if any, that are presently assigned to the modified jar. In order to copy rules (properties) to the new members, the role and/or property needs to be m-attributed to the modified jar (e.g., by dragging the rules/properties onto the modified jar or by use of the method of FIG. 12). If membership in the new dynamic class decreases as a result of the addition (e.g., the addition was made to the second region 136), then the present invention will not remove, from each lost member, any rules and/or properties, if any, that are presently assigned to the modified jar. These rules/properties can be removed by directly accessing the item and deleting the role/property. This is done to reduce the complexity of using the jar interface.

Figure 27B:
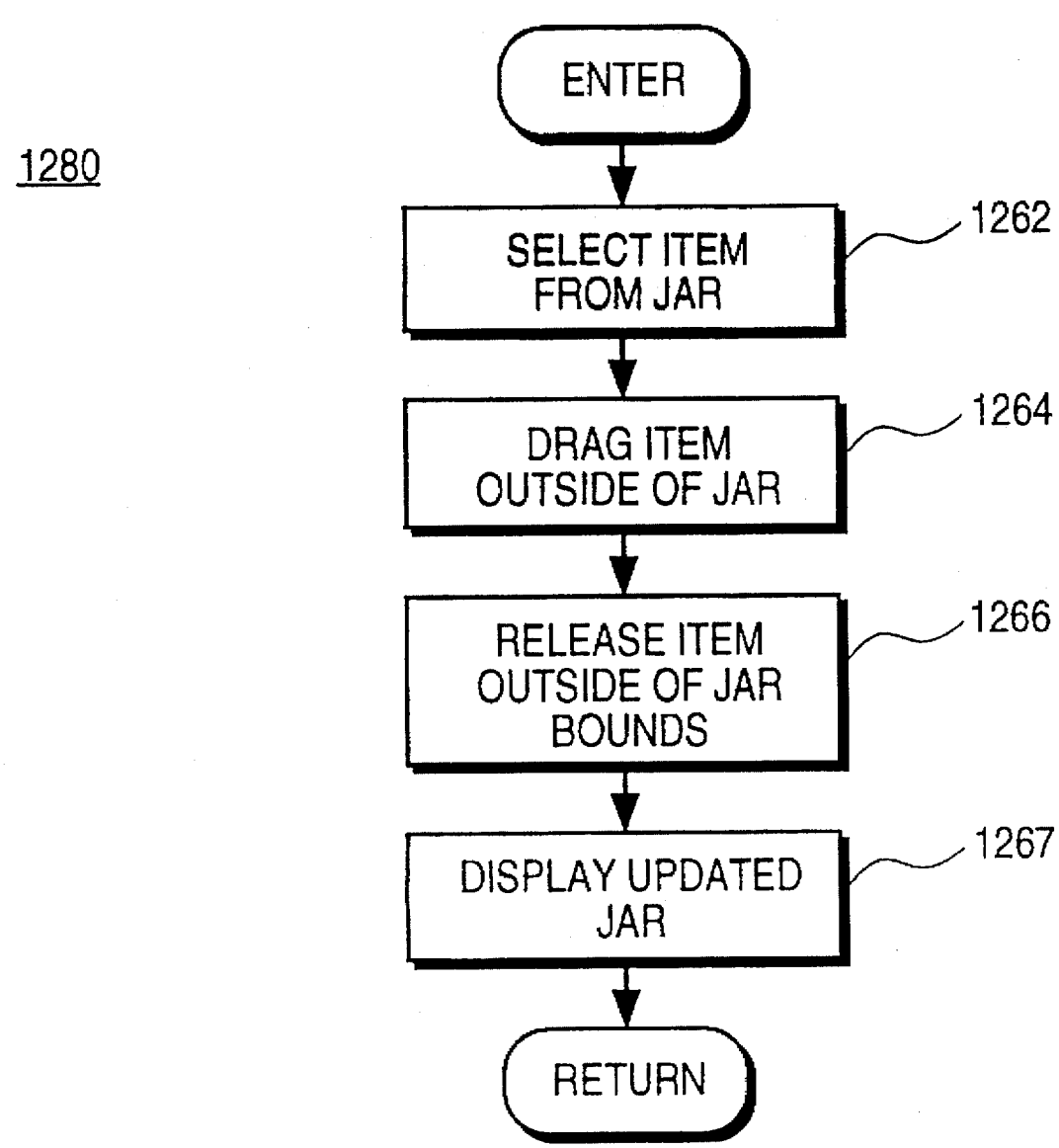
FIG. 27B is a flow diagram of the present invention illustrating the removal of an item from an existing jar.

FIG. 27B is a flow diagram illustrating logic 1260 for removing items from an existing jar. At block 1262, the user is allowed to select an item from a particular jar displayed within the jar shelf window 112. The item can be an object instance, an object class or another jar. The item can come from the fast region 132 or the second region 136 of a jar. At block 1264, the present invention allows a user to drag the selected item outside the jar. At block 1266, the item is removed from the jar when released outside of the jar's graphic image. In one embodiment, the selected item is dropped into the remove icon window 97 (FIG. 23). At block 1267, the updated image of the jar is displayed within the jar shelf window 122 with the appropriate items missing. Also, as will be described to follow, the present invention performs processing to determine the new membership of the dynamic class defined by the new set of items of the jar. If membership in the dynamic class of the modified jar increases as a result of the removal (e.g., the removal was made to the second region 136), then the present invention will not attribute to each new member any rules and/or properties, if any, that are presently assigned to the modified jar. In order to copy rules (properties) to the new members, the rule and/or property needs to be re-attributed to the modified jar (e.g., by dragging the rules/properties onto the modified jar or by use of the method of FIG. 12). If membership in this dynamic class decreases as a result of the removal (e.g., the removal was made to the first region 132), then the present invention will not remove, from each lost member, any rules and/or properties, if any, that are presently assigned to the modified jar. These roles/properties can be removed by directly accessing the item. As before, this is done to reduce the complexity in utilizing the jar.

Figure 28:
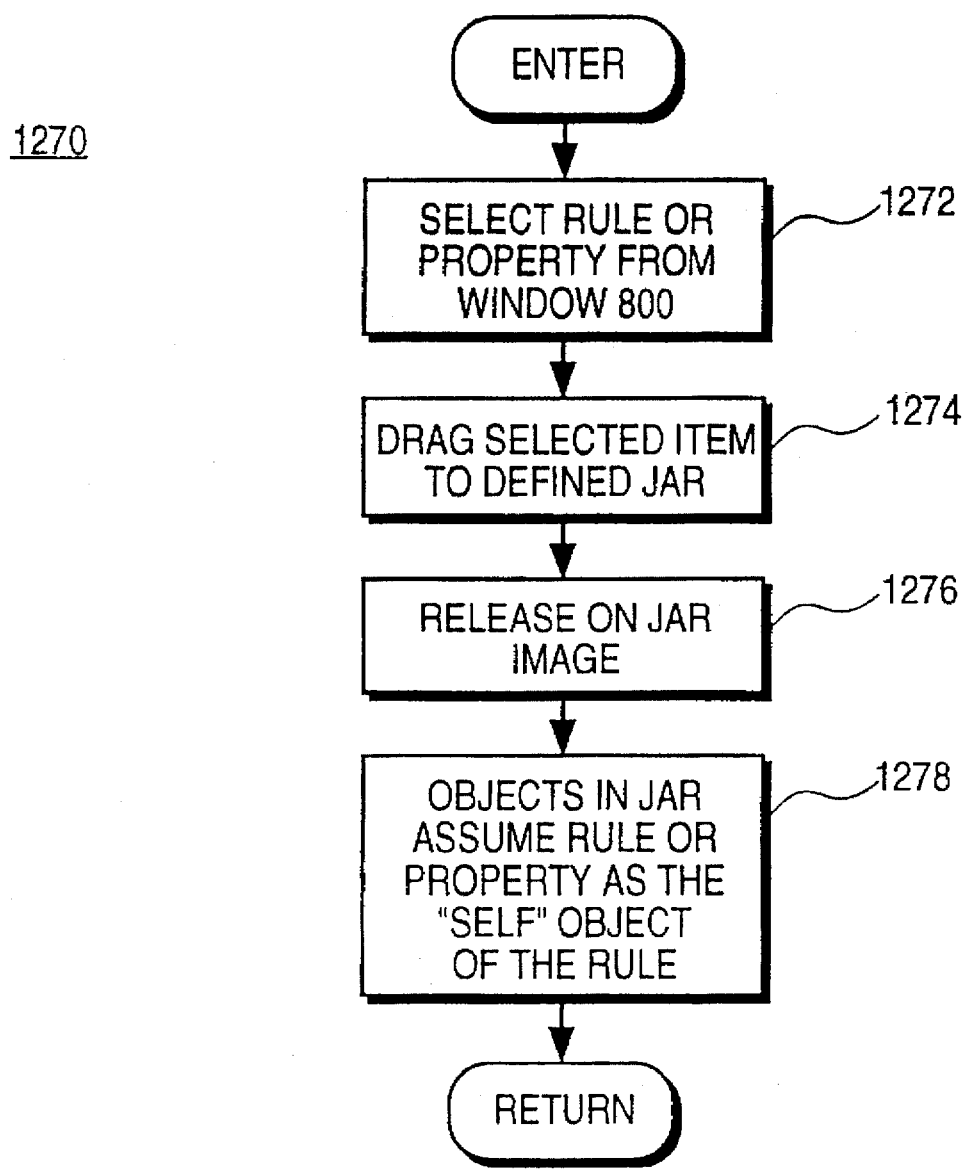
FIG. 28 is a flow diagram illustrating one method for adding a role or a property to an existing jar.

FIG. 28 is a flow diagram illustrating logic 1270 of the present invention for adding rules and properties to existing jars wherein the members of the jar are assigned as the "self" of the rule. This has the same effect as dropping the rule or property on each instance of the jar individually. It is appreciated that logic 1270 is one process for performing the above. At block 1272, the user is allowed to select a graphic representation of a rule or property. These graphic representations of the rules and properties can originate from a previously described object viewer window 800 (FIG. 13). The user is allowed to select a particular visual rule indicator 828 or a particular visual property indicator 98 (e.g., FIG. 6) at block 1272. At block 1274, the users is allowed to drag the selected item to an existing jar (e.g., exemplary jar 110b) within the jar shelf window 112. At block 1276, the user is allowed to release the selected item over the graphical representation of a particular jar. At block 1278, in response, the present invention copies the selected rule or property to each member of the jar. The result is analogous to copying the selected item or property to each member of the jar individually. For a rule, the process 1270 copies the rule to each member of the jar with the member being the "self" of the rule. In one embodiment, at block 1278, the jar is displayed with a small graphical representation of the rule or property so that the user can acknowledge that rules and properties have been assigned to the dynamic class represented by the jar.

For example, assume a jar exists for large fish and contains the classes tuna and cod. In the rule, the "self" is programmed to eat guppies. By following the above procedure of FIG. 28, the rule for eating small fish can be dragged and dropped onto the jar for large fish and this rule will be copied into each class of tuna and cod as the "self." The result in a simulation is that both tuna and cod will eat guppies as the simulation progresses.

FIG. 5A illustrates another procedure of the present invention for attributing rules to an existing jar wherein the membership is associated with a rule as an abstraction (e.g., not as the "self" of the rule but as the one action is taken onto). Within the GRR editor window 70, the user is allowed to select the set of members to which a particular rule is attributed (other than the "self"). For example, a defined rule can be effective to act on a given instance of an object, a class of objects, or pertinent jars. When class menu 80 appears, the user is allowed to select a particular class to which a defined rule will act upon. In order to generate the GRR editor window 70, a particular class of objects or a particular object instance is already selected by the user. Therefore, upon generation of class menu 80, the present invention interrogates each defined jar to determine which jars (e.g., pertinent jars) contain the selected object instance or selected class of objects. These pertinent jars, if any, are then automatically displayed as selections within class menu 80 (e.g. as jar "A" and jar "B" in this example). Once a user selects a particular pertinent jar, the defined rule (e.g., rule k) will act upon to each member of the pertinent jar (e.g., all members of the dynamic class defined by the selected pertinent jar will then contain rule k).

For example, assume a jar exists for small fish and contains the classes guppies and minnows. By following the above procedure of FIG. 5A, a rule for eating small fish can be defined wherein the "self" object is defined as tuna and the jar small fish can be abstracted to be the item that interacts with the tuna (e.g., the item that action is taken onto). The result is simulation wherein tuna will eat both minnows and guppies.

Figure 29:
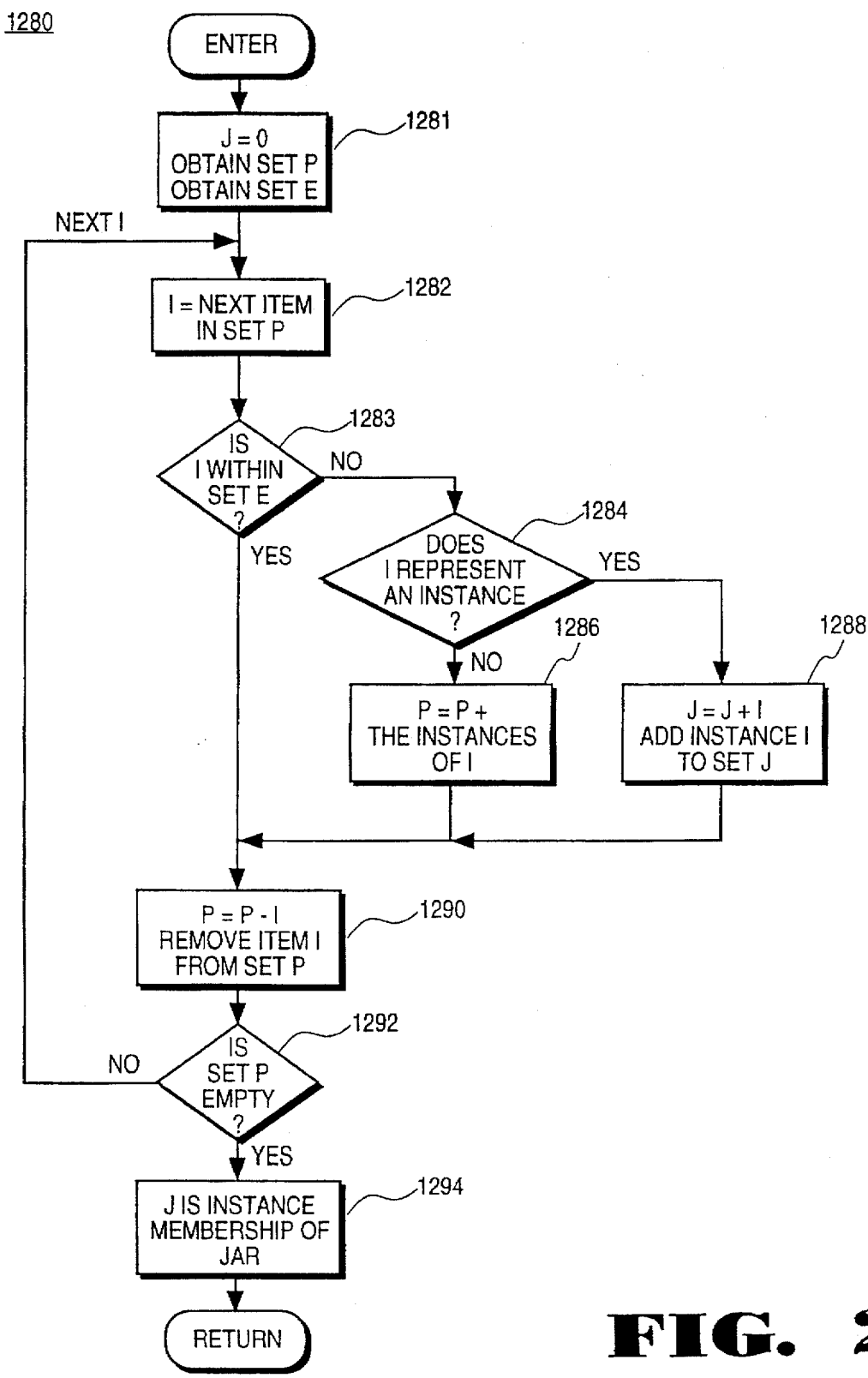
FIG. 29 is a flow diagram of the present invention illustrating a method of assimilating the membership of a jar based on items in the first and second jar regions.

FIG. 29 illustrates exemplary logic 1280 of the present invention for determining the membership of a jar based on items placed in the first region 132 and items placed in the second region 136. The present invention will process logic 1280 for a particular jar each time a modification is made to the jar (e.g., after logic 1240 or logic 1260) to arrive at the new membership of the jar, or, logic 1280 can be processed at any time needed (e.g., using an "on demand" process). Logic 1280 begins at block 1281 where set J, the membership of the jar, is initially set to zero. P is initially set to the set of items (e.g., jars, classes or instances) in region 132. E is initially set to the set of items (jar, classes or instances) in region 136. At block 1282, the present invention processes a first item within the contents area (e.g., the fist region 132) of the particular jar. At block 1283, the present invention determines if item I is within the second region 136 which is set E. If not, then at block 1284 the present invention determines if I represents an instance or a class or a jar. If I does represent an instance, that at block 1288, the instance of I is added to the membership of the jar, J. Flow then returns to block 1290 where I is subtracted from the set P. Processing then flows to block 1292.

At block 1284, if I represents a class or a jar, then at block 1286 all of the instances of the class or of the jar are added to P. At block 1290, the class or jar object is then subtracted from P, however, the instances of the class or object remain within the set P. Processing then flows to block 1292. At block 1283, if it was determined that I was within set E, then processing flows to block 1290 where I is removed from set P. Processing then flows to block 1292.

At block 1292, the present invention determines if the set P is empty. If not, then processing flows to block 1282 to process the next item, I, in set P. At block 1292, if P is empty, then at block 1294 contains a complete set J, representing all of the instances of the items belonging to the particular jar. This membership is then stored in computer memory (e.g., RAM 22). At the completion of logic 1280, J will represent the current membership of the dynamic class associated with the particular jar, In one embodiment, If an instance is listed in both the first region 132 and the second region 136, it will be excluded. However, in other embodiments within the scope of the present invention, membership in the first region 132 can take priority if the member in the first region 132 is listed as an instance. For example, under this embodiment, block 1290 would not subtract instance E from instance A if instance A corresponds to an item that was an instance itself. For example, if the processed item was an instance, b2, placed directly in the first region 132 (see exemplary jar 110b of FIG. 24), and the class "B" was in the second region 136. Although a match would occur, b2 would not be excluded by process 1290 because b2 (as an instance) is also an item within the first region 132.

It is appreciated that once a new dynamic class is formulated by processing of logic 1280, the present invention does not update any new member of the dynamic class with any rules and properties that are attributed to the jar as a whole.

As discussed further above, although an advantage of dynamic classes under the present invention is that membership is extensional in nature, in one embodiment of the present invention, a jar can contain classes that are also hierarchical in nature. In other words, a jar can contain (1) a group of some object classes that are unrelated in attribute and characteristic and, in addition, can include (2) a class of objects that is hierarchical in that the class includes other subclasses that are related in some attribute or character. Alternatively, a jar can contain only a class of objects that is hierarchical in that the class includes other subclasses that are related in some attribute or character. Mechanisms and methods for defining hierarchical data structures within the context of the present invention simulator environment are described in more detail within U.S. patent application Ser. No. 08/187,682, entitled Extensible Simulation System and Graphical Programming Method, which was filed on Jan. 25, 1994, and assigned to the assignee of the present invention.

Exemplary Situations

Some exemplary situations that can be realized using dynamic classes are presented. First, a user might define a rule stating that an object or object class is to avoid certain items. Predefined object classes might be fences, rocks and logs. A jar can be created called "obstacles" and can contain the object classes fences, rocks and logs. A rule can be developed so that certain objects then avoid "obstacles". The jar "obstacles" becomes abstracted to represent the other-than-"self" object of the rule. In the simulation, all instances of rocks, fences and logs will be avoided under the role. Alternatively, an exemplary dynamic class can be created called "big fish" and can include several classes of large fish (e.g., sharks, ling cod, and tuna). Another exemplary dynamic class can be made called "small fish" including many classes of small fish (e.g., goldfish, trout, and catfish). A rule can then be formulated wherein the dynamic class "big fish" is able to eat the dynamic class "small fish." This can be done in the GRR editor 36 after creating the two above named dynamic classes instead of teaching each class of big fish to eat each other class of small fish. To perform the above, the rule is abstracted within the GRR Editor 36 so that "small fish" is the other-than-"self object". Then, this defined rule is dragged and dropped onto the jar "large fish".

As shown above, the present invention provides a mechanism and system for allowing dynamic classes to be generated that do not require any adherence to a rigid hierarchical data structure and wherein membership of a dynamic class does not necessarily require any common trait or characteristic or attribute among members. Classes and instances and jars can be combined within a jar even though the individual members of the resultant jar do not share any common attributes or functions. Further, once rules and properties are defined with respect to a jar, those behaviors can be attributed to a dynamic class of members because the jar membership is very flexible and easily modified.

While specific embodiments of the present invention have been described, various modifications and substitutions will become apparent to one skilled in the art by this disclose. Such modifications and substitutions are within the scope of the present invention, and are intended to be covered by the following claims.

We claim:

1. A method of creating and updating a dynamic class within a computer controlled system, said method comprising the steps of:

placing a first set of items into a first region of said dynamic class, wherein said first set of items, individually, do not necessarily have any hierarchical attributes or characteristics in common;

placing a second set of items into a second region of said dynamic class;

generating a membership of said dynamic class by including said first set of items and excluding those items of said second set of items that match with corresponding items of said first set of items; and updating said membership of said dynamic class under user control during execution of said computer controlled system.

2. A method as described in claim 1 wherein said step of updating said membership of said dynamic class comprises the step of:

removing items of said first set of items from said first region; and removing items of said second set of items from said second region.

3. A method as described in claim 1 wherein said step of updating said membership of said dynamic class comprises the step of:

adding items to said first set of items of said fast region; and adding items to said second set of items of said second region.

4. A method as described in claim 1 wherein said fast region and said second region comprise a graphical representation of a said dynamic class and wherein said fast set of items and said second set of items are graphically displayed with said graphical representation.

5. In a computer controlled simulation system, a method of defining a dynamic object class, said method comprising the computer implemented steps of:

displaying a first region for storing contents included within said dynamic object class;

displaying a second region for storing exclusions from said contents of said dynamic object class;

displaying a label region for identifying said dynamic object class selecting and dragging items from a given area of said simulation system into said first region to add items into said contents;

selecting and dragging items from a given area of said simulation system into said second region to exclude items from said contents; and generating a membership of said dynamic object class based on said items within said first region and excluding said items within said second region wherein said membership does not necessarily contain any attributes or characteristics in common between individual members.

6. A method as described in claim 5 wherein said items include object instances, object classes or other defined dynamic object classes.

7. A method as described in claim 5 wherein said label region and said first region, in union, comprise a graphical representation of a jar.

8. A method as described in claim 5 further comprising the steps of:

selecting and removing a particular item of said first region; and updating said membership of said dynamic object class based on items remaining in said fast region and said items within said second region.

9. A method as described in claim 5 further comprising the steps of:
- selecting and removing a particular item of said second region; and
- updating said membership of said dynamic object class based on said items within said first region and items remaining in said second region.

10. A method as described in claim 5 further comprising the steps of:
- selecting and adding a particular item to said fast region; and
- updating said membership of said dynamic object class based on items within in said first region and said items within said second region.

11. A method as described in claim 5 further comprising the steps of:
- selecting and adding a particular item to said second region; and
- updating said membership of said dynamic object class based on said items within said first region and items within said second region.

12. In a computer controlled simulation system, a method of attributing a rule of behavior to a dynamic object class, said method comprising the computer implemented steps of:
- displaying a first region for storing contents included within said dynamic object class;
- displaying a second region for storing exclusions from said contents of said dynamic object class;
- adding items from a given area within said simulation system into said first region to add items into said contents;
- adding items from a given area within said simulation system into said second region to exclude items from said contents;
- generating a membership of said dynamic object class based on said items within said first region and excluding items within said second region wherein said membership does not necessarily contain any attributes or characteristics in common between individual members;
- generating a graphical representation of a simulated environment and graphical representations of objects for placement therein;
- defining a rule of behavior by user interaction with said graphical representation of said simulated environment and with said graphical representations of said objects; and
- copying said rule of behavior to each member of said membership of said dynamic object class.

13. A method as described in claim 12 wherein said step of adding items from a given area of said simulation system into said first region comprises the step of selecting and dragging said items into said first region and wherein said step of adding items from a given area of said simulation system to said second region comprises the step of selecting and dragging said items into said second region.

14. A method as described in claim 13 wherein said items include object instances, object classes or other defined dynamic object classes.

15. A method as described in claim 13 wherein said label region and said first region, in union, comprise a graphical representation of a jar.

16. A method as described in claim 13 further comprising the steps off
- selecting and removing a particular item of said first region;
- generating an updated membership said membership of said dynamic object class based on items remaining in said first region and said items within said second region; and
- copying said rule of behavior to each member of said updated membership.

17. A method as described in claim 13 further comprising the steps of:
- selecting and removing a particular item of said second region;
- generating an updated membership of said dynamic object class based on said items within said first region and items remaining in said second region; and
- copying said rule of behavior to each member of said updated membership.

18. A method as described in claim 13 further comprising the steps of:
- selecting and adding a particular item to said fast region;
- selecting and adding a particular item to said second region;
- generating an updated membership of said dynamic object class based on items within said first region and items within in said second region; and
- copying said rule of behavior to each member of said updated membership.

19. A method as described in claim 13 further comprising the steps of:
- animating a graphical representation of each member of said membership according to said rule of behavior assigned to said membership of said dynamic object class;
- altering said items of said first region of said dynamic object class;
- altering said items of said second region of said dynamic object class;
- generating a updated membership based on items within said first region and items within said second region; and
- animating a graphical representation of each member of said updated membership according to said rule of behavior assigned to said dynamic object class.

20. A computer system comprising:
- a processor coupled to said bus for executing instructions and processing information;
- a display unit coupled to said bus for displaying information;
- a user interface coupled to said bus for receiving user input;
- a memory coupled to said bus for storing instructions and information;
- wherein said memory in combination with said processor further comprises:
  - logic for displaying a first region for storing contents included within said dynamic object class;
  - logic for displaying a second region for storing exclusions from said contents of said dynamic object class;
  - logic for displaying a label region for identifying said dynamic object class;
  - logic for selecting and dragging items from a given area into said first region to add items into said contents;
  - logic for selecting and dragging items from a given area into said second region to exclude items from said contents; and logic for generating a membership of said dynamic object class based on said items within said fast region and excluding said items within said second region wherein said membership does not necessarily contain any attributes or characteristics in common between individual members.

21. A computer system as described in claim 20 wherein said items include object instances, object classes or other defined dynamic object classes.

22. A computer system as described in claim 20 wherein said label region and said first region, in union, comprise a graphical representation of a jar.

23. A computer system as described in claim 20 wherein said memory in combination with said processor further comprises:

logic for selecting and removing a particular item of said contents of said first region;

logic for selecting and removing a particular item of said second region; and logic for updating said membership of said dynamic object class based on items remaining within said fast region and items remaining within said second region.

24. A computer system as described in claim 20 wherein said memory in combination with said processor further comprises:

logic for selecting and adding a particular item to said contents of said first region;

logic for selecting and adding a particular item to said second region; and logic for updating said membership of said dynamic object class based on items within said first region and items within said second region.

25. A computer system comprising:

a processor coupled to said bus for executing instructions and processing information;

a display unit coupled to said bus for displaying information;

a user interface coupled to said bus for receiving user input;

a memory coupled to said bus for storing instructions and information;

wherein said memory in combination with said processor further comprises:

logic for displaying a first region for storing contents included within said dynamic object class;

logic for displaying a second region for storing exclusions from said contents of said dynamic object class;

logic for allowing items from a given area to be added within said first region to increase contents of said dynamic object class;

logic for allowing items from a given area to be added within said second region to exclude items from said contents;

logic for generating a membership of said dynamic object class based on said items within said first region and excluding said items within said second region wherein said membership does not necessarily contain any attributes or characteristics in common between individual members;

logic for generating a graphical representation of a simulated environment and graphical representations of objects for placement therein;

logic for defining a role of behavior by user interaction with said graphical representation of said simulated environment and with said graphical representations of said objects; and logic for copying said role of behavior to each member of said membership of said dynamic object class.

26. A computer system as described in claim 25 wherein said items include object instances, object classes or other defined dynamic object classes and wherein said label region and said fast region, in union, comprise a graphical representation of a jar.

27. A computer system as described in claim 25 wherein said memory in combination with said processor further comprises:

logic for selecting and removing a particular item of said first region;

logic for selecting and removing a particular item of said second region;

logic for generating an updated membership of said dynamic object class based on items remaining within said fast region and items remaining within said second region; and logic for copying said rule of behavior to each member of said updated membership.

28. A computer system as described in claim 25 wherein said memory in combination with said processor farther comprises:

logic for selecting and adding a particular item to said fast region;

logic for selecting and adding a particular item to said second region;

logic for generating an updated membership of said dynamic object class based on items within said first region and items within in said second region; and logic for copying said rule of behavior to each member of said updated membership.

29. A computer system as described in claim 25 wherein said memory in combination with said processor further comprises:

logic for animating a graphical representation of each member of said membership according to said rule of behavior assigned to said membership of said dynamic object class;

logic for altering said items of said first region of said dynamic object class;

logic for altering said items of said second region of said dynamic object class;

logic for generating a updated membership based on items within said first region and items within said second region; and logic for animating a graphical representation of each member of said updated membership according to said rule of behavior assigned to said dynamic object class.

30. A computer system comprising:

a processor coupled to said bus for executing instructions and processing information;

a display unit coupled to said bus for displaying processed information;

a user interface coupled to said bus for receiving user input;

a memory coupled to said bus for storing instructions and information;

said processor for displaying a first region for storing contents included within said dynamic object class;

said processor also for displaying a second region for storing exclusions from said contents of said dynamic object class;

said processor also for allowing items from a given area to be added within said first region to increase contents of said dynamic object class;

said processor also for allowing items from a given area to be added within said second region to exclude items from said contents;

said processor also for generating a membership of said dynamic object class based on said items within said first region and excluding said items within said second region wherein said membership does not necessarily contain any attributes or characteristics in common between individual members;

said processor also for generating a graphical representation of a simulated environment and graphical representations of objects for placement therein;

said processor also for defining a rule of behavior by user interaction with said graphical representation of said simulated environment and with said graphical representations of said objects; and said processor also for copying said rule of behavior to each member of said membership of said dynamic object class.

31. A computer system as described in claim 30 wherein:

said processor also for animating a graphical representation of each member of said membership on said display unit according to said rule of behavior assigned to said membership of said dynamic object class;

said processor also for altering said items of said first region of said dynamic class based on input from user interface;

said processor also for altering said items of said second region of said dynamic class based on input from user interface;

said processor also for generating a updated membership based on items within said first region and items within said second region; and said processor also for animating a graphical representation of each member of said updated membership on said display unit according to said rule of behavior assigned to said dynamic object class.

\* \* \* \* \*